US006674955B2

(12) United States Patent
Matsui et al.

(10) Patent No.: US 6,674,955 B2
(45) Date of Patent: Jan. 6, 2004

(54) EDITING DEVICE AND EDITING METHOD

(75) Inventors: Masafumi Matsui, Kanagawa (JP);
Naomi Egashira, Kanagawa (JP);
Tetsuro Nakata, Kanagawa (JP);
Toshiyuki Tanaka, Kanagawa (JP);
Motomu Ueta, Kanagawa (JP);
Yoshiyuki Nakamura, Tokyo (JP);
Kosei Yamashita, Nakagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/202,232

(22) PCT Filed: Apr. 13, 1998

(86) PCT No.: PCT/JP98/01685
§ 371 (c)(1),
(2), (4) Date: Dec. 10, 1998

(87) PCT Pub. No.: WO98/47146
PCT Pub. Date: Oct. 22, 1998

(65) Prior Publication Data
US 2003/0086686 A1 May 8, 2003

(30) Foreign Application Priority Data

Apr. 12, 1997 (JP) ............................................. 9-110307

(51) Int. Cl.[7] ................................................. H04N 5/76
(52) U.S. Cl. ............................ 386/52; 386/55; 345/723
(58) Field of Search ................................. 386/4, 52, 55, 386/64; 360/13; 369/83; 345/723, 724, 725, 726, 727, 728, 729

(56) References Cited

U.S. PATENT DOCUMENTS

| | | | | |
|---|---|---|---|---|
| 5,206,929 A | * | 4/1993 | Langford et al. | 345/723 |
| 5,519,828 A | * | 5/1996 | Rayner | 345/723 |
| 5,732,184 A | * | 3/1998 | Chao et al. | 386/55 |
| 5,760,767 A | * | 6/1998 | Shore et al. | 345/723 |
| 5,877,781 A | * | 3/1999 | Tomizawa et al. | 345/723 |
| 5,889,519 A | * | 3/1999 | Boezeman et al. | 345/723 |
| 6,154,207 A | * | 11/2000 | Farris et al. | 345/723 |
| 6,154,601 A | * | 11/2000 | Yaegashi et al. | 386/52 |
| 6,198,873 B1 | * | 3/2001 | Takano | 386/55 |
| 6,292,619 B1 | * | 9/2001 | Fujita et al. | 386/52 |

* cited by examiner

*Primary Examiner*—Thai Tran
(74) *Attorney, Agent, or Firm*—Frommer Lawrence & Haug LLP; William S. Frommer; Darren M. Simon

(57) ABSTRACT

An editing apparatus comprises an editing processing unit for processing a video signal and an audio signal supplied as source materials, and a computer for controlling the editing processing unit, wherein the computer comprises a controlling means for displaying a viewer window, a log window, and a program window on a display of the computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, and wherein the controlling means displays an icon that represents by what source device each event arranged on the time line is produced.

24 Claims, 35 Drawing Sheets

Fig. 10A
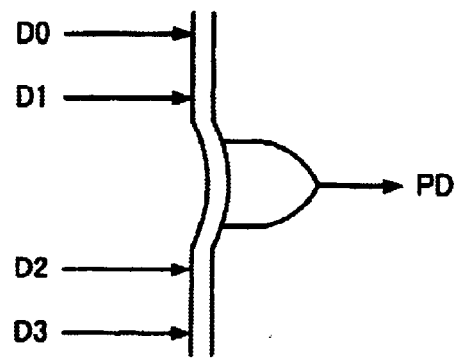
Fig. 10B
| D0 | 0 | 0 | 0 | 0 | 0 | 0 | 0 | 0 | 1 | 1 | 1 | 1 | 1 | 1 | 1 | 1 |
|----|---|---|---|---|---|---|---|---|---|---|---|---|---|---|---|---|
| D1 | 0 | 0 | 0 | 0 | 1 | 1 | 1 | 1 | 0 | 0 | 0 | 0 | 1 | 1 | 1 | 1 |
| D2 | 0 | 0 | 1 | 1 | 0 | 0 | 1 | 1 | 0 | 0 | 1 | 1 | 0 | 0 | 1 | 1 |
| D3 | 0 | 1 | 0 | 1 | 0 | 1 | 0 | 1 | 0 | 1 | 0 | 1 | 0 | 1 | 0 | 1 |
| PD | 1 | 0 | 0 | 1 | 0 | 1 | 1 | 0 | 0 | 1 | 1 | 0 | 1 | 0 | 0 | 1 |
Fig. 11A
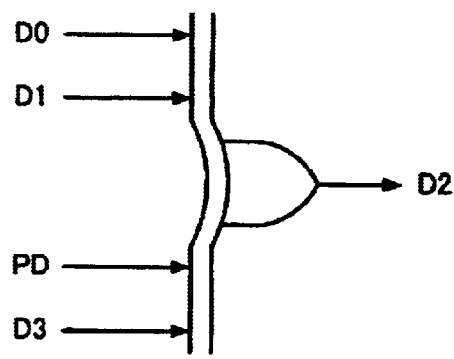
Fig. 11B
| D0 | 0 | 0 | 0 | 0 | 0 | 0 | 0 | 0 | 1 | 1 | 1 | 1 | 1 | 1 | 1 | 1 |
|----|---|---|---|---|---|---|---|---|---|---|---|---|---|---|---|---|---|
| D1 | 0 | 0 | 0 | 0 | 1 | 1 | 1 | 1 | 0 | 0 | 0 | 0 | 1 | 1 | 1 | 1 |
| PD | 1 | 0 | 0 | 1 | 0 | 1 | 1 | 0 | 0 | 1 | 1 | 0 | 1 | 0 | 0 | 1 |
| D3 | 0 | 1 | 0 | 1 | 0 | 1 | 0 | 1 | 0 | 1 | 0 | 1 | 0 | 1 | 0 | 1 |
| D2 | 0 | 0 | 1 | 1 | 0 | 0 | 1 | 1 | 0 | 0 | 1 | 1 | 0 | 0 | 1 | 1 |

Fig. 19

|  | DATA FORMAT |
|---|---|
| 331 FILE NAME | #AAAA001 |
| 332 EVENT NAME (CLIP NAME) | AAAA001 |
| 333 IN-POINT TIME CODE | HH:MM:SS:FF |
| 334 IN-POINT CLIP ADDRESS | |
| 335 OUT-POINT TIME CODE | HH:MM:SS:FF |
| 336 OUT-POINT CLIP ADDRESS | |
| 337 DURATION | HH:MM:SS:FF |
| 338 FILE TYPE INFORMATION | Log/EDL/Material/Master |
| 339 FILE POSITION INFORMATION | C/L |
| 340 SOURCE DEVICE ID INFORMATION | S/L/V/A/I |
| 341 PRODUCED DATE AND TIME | |
| 342 VIDEO ADJUSTMENT INFORMATION | |
| 343 AUDIO ADJUSTMENT INFORMATION | |
| 344 TEXT DATA | |
| 345 PROGRAM LIST NAME | |

Fig. 22

| File Name 1 | | |
|---|---|---|
| File Name | File Type | Create Date |
| File Name 1 | Material | 96/01/20 10:23 |
| File Name 2 | Log | 97/02/16 15:14 |
| File Name 3 | Log | 97/02/16 16:20 |
| File Name 4 | Material | 97/01/5 20:10 |
| File Name 5 | Material | 96/12/10 13:51 |
| File Name 6 | Master | 97/03/25 11:42 |
| File Name 7 | Log | 97/02/24 21:37 |

OK    Cancel

310

Fig. 32A
Fig. 32B
Fig. 33A
Fig. 33B

EDITING DEVICE AND EDITING METHOD

TECHNICAL FIELD

The present invention relates an editing apparatus, in particular, to an editing apparatus and an editing method for editing for example a news material used in a broadcasting station.

RELATED ART

In a post-production field in which a material is edited in a broadcasting station or the like, a tape editing operation that uses a recording unit with a magnetic tape has been widely used for recording a material. In the tape editing operation, the editing operator searches a material tape and decides edit points so as to select desired scenes. The editing operator dubs the selected scenes to a master tape so as to make a story of a program. However, in the tape editing operation, the editing operator should repeat a cue up operation on trial and error basis so as to access desired frames of the material recorded on the tape. Thus, the editing operator should spend a long time to decide edit points. In addition, the editing operator should dub a material tape to a master tape for each cut corresponding to each edit point. Consequently, the editing operator should control both the VTR for the material tape and the VTR for the master tape. In other words, the edit operator should spend a very long time for the tape editing operation. Thus, the editing operator should concentrate his or her mind on the tape editing operation for a long time.

When a news program, a reporting program, and a sports program are edited in a broadcasting station, events that take place in each area should be promptly provided to audiences. In other words, such programs require promptness. When such programs are edited, effects such as a mosaic effect and A/B roll may be added to images of editing scenes instead of an assemble editing operation of which edited scenes are simply connected. In addition, other effects such as a tone change of speakers and background noise removal should be added to audio data of edited scenes.

To add effects, in addition to the editing operations of the source VTR and the master VTR, other editing operations for a video switcher unit and a special effect unit are required.

Thus, in the conventional editing apparatus, video programs for a news program, a reporting program, and a sports program cannot be promptly produced.

DISCLOSURE OF THE INVENTION

The present invention is made from the above-described point of view. An object of the present invention is to provide an editing apparatus and an editing method that allow video programs for a news program, a reporting program, sports program, and so forth to be promptly and user-friendlily produced.

The editing apparatus of the present invention comprises a computer having a controlling means for displaying a viewer window, a log window, and a program window on a display of the computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, wherein the controlling means displays an icon that represents by what source device each event arranged on the time line is produced.

Thus, since the editing operator can easily and visually know by what source device each event was produced, he or she can securely perform the editing operation.

The editing apparatus of the present invention comprises a computer having a controlling means for displaying a viewer window, a log window, and a program window on a display of the computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, wherein the controlling means displays an effect setting dialog for setting an effect to each event arranged on the time line corresponding to the operation of the editing operator and places an icon corresponding to a desired effect selected on the effect setting dialog on the time line so as to produce a program list for performing the effect for the event.

Thus, with the editing apparatus according to the present invention, the editing operator can promptly and easily select an effect and set the selected effect to each event. In addition, with the editing system according to the present invention, the editing operator can browse clip images of all edit cuts, input images, a time line, and so forth on the GUI. In addition, the editing operator can decide the editing order and easily change the editing order while viewing arranged clips.

In the editing apparatus of the present invention, the controlling means displays a fader assignment dialog for allowing the editing operator to assign audio faders of a dedicated audio controller to audio tracks of individual events arranged on the time line and controls levels of the audio tracks of the events corresponding to information that is set on the fader assignment dialog.

Thus, with the editing apparatus according to the present invention, the editing operator can control individual audio tracks of individual events with the dedicated controller. In addition, the editing operator can freely change the assignment of individual tracks and fader levers for each event.

In the editing apparatus of the present invention, the controlling means has a first mode and a second mode, the first mode allowing the editing operator to drag and drop each of the plurality of events displayed as clip images on the log window to the time line, the second mode causing the plurality of events displayed as clip images on the log window to be automatically and successively arranged in a designated order on the time line without need to drag and drop the plurality of events.

In the editing apparatus of the present invention, the controlling means allows the editing operator to set an effect insertion area on the time line while viewing a plurality of events arranged on the time line and set a selected effect to the effect insertion area that is set on the time line.

In the editing apparatus of the present invention, the controlling means allows the editing operator to set an event insertion area overlaid with a plurality of events on a time line while viewing the plurality of events arranged on the time line and insert an event selected on the log window into the event insertion area that is set on the time line.

The editing method of the present invention comprises the steps of displaying a viewer window, a log window, and a program window on a display of a computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, and displaying an icon that represents by what source device each event arranged on the time line is produced.

Thus, since the editing operator can easily and visually know by what source device each event is produced, he or she can securely perform the editing operation.

The editing method of the present invention comprises the steps of displaying a viewer window, a log window, and a program window on a display of a computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, displaying an effect setting dialog for setting an effect to each event arranged on the time line corresponding to the operation of the editing operator, and placing an icon corresponding to a desired effect selected on the effect setting dialog on the time line so as to produce a program list for performing the effect for the event.

Thus, in the editing method according to the present invention, the editing operator can promptly and easily select an effect and set the selected effect to each event. In addition, with the editing system according to the present invention, the editing operator can browse clip images of all edit cuts, input images, a time line, and so forth on the GUI. In addition, the editing operator can decide the editing order and easily change the editing order while viewing arranged clips.

The editing method of the present invention comprises the steps of displaying a fader assignment dialog for allowing the editing operator to assign audio faders of a dedicated audio controller to audio tracks of individual events arranged on the time line, and controlling levels of the audio tracks of the events corresponding to information that is set on the fader assignment dialog.

Thus, in the editing apparatus according to the present invention, the editing operator can control individual audio tracks of individual events with the dedicated controller. In addition, the editing operator can freely change the assignment of individual tracks and fader levers for each event.

The editing method of the present invention comprises the steps of displaying a viewer window, a log window, and a program window on a display of a computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, and arranging the plurality of events displayed as the clip images on the log window on the time line corresponding to a first mode and a second mode, the first mode allowing the editing operator to drag and drop each of the plurality of events displayed as clip images on the log window to the time line, the second mode causing the plurality of events displayed as clip images on the log window to be automatically and successively arranged in a designated order on the time line without need to drag and drop the plurality of events.

In the editing method according to the present invention, the editing operator can set an effect insertion area on a time line and place a selected effect in the effect insertion area while viewing a plurality of events arranged on the time line.

The editing method of the present invention comprises the steps of setting an effect insertion area on the time line while viewing a plurality of events arranged on the time line, and setting a selected effect to the effect insertion area that is set on the time line.

In other words, with the editing apparatus and the editing method according to the present invention, the editing operator can promptly edit materials with a random access property that is a non-linear property to produce a news program. Thus, with the editing apparatus and the editing method according to the present invention, the editing operator can promptly and easily select an effect and set the selected effect to each event. In addition, with the editing system according to the present invention, the editing operator can browse clip images of all edit cuts, input images, a time line, and so forth on the GUI. In addition, the editing operator can decide the editing order and easily change the editing order while viewing arranged clips. In addition, with the editing apparatus and editing method according to the present invention, since the editing operator can set various effect functions, he or she can promptly produce a video program with enriched expression.

With the editing apparatus and the editing method according to the present invention, when the editing operator produces a news program or a reporting program, he or she can add a mosaic effect, change the sound tone of a speaker, and remove the background noise on site by himself or herself. In addition, with the editing apparatus and the editing method according to the present invention, to accomplish various effects, the editing operator can optically use a software process and hardware of a computer so as to edit digital image data and audio data on real time base.

BRIEF DESCRIPTION OF DRAWINGS

FIGS. 10A–10B are a schematic diagram for explaining the operation of the disc array block;

FIGS. 11A–11B are a schematic diagram for explaining the operation of the disc array block;

FIG. 19 is a schematic diagram for explaining file information;

FIG. 22 is a schematic diagram for explaining a file list displaying dialog;

FIGS. 32A–32B are a schematic diagram for explaining an effect setting operation on a time line;

FIGS. 33A–33B are a schematic diagram for explaining an effect setting operation on a time line;

FIGS. 34A–34B are a schematic diagram for explaining an effect setting operation on a time line;

FIGS. 35A–35B are a schematic diagram for explaining an effect setting operation on a time line;

BEST MODES FOR CARRYING OUT THE INVENTION

Next, preferred embodiments of the present invention will be described.

1. Structure of Editing Apparatus 1-1 Overall Structure of Editing Apparatus

Figure 1:
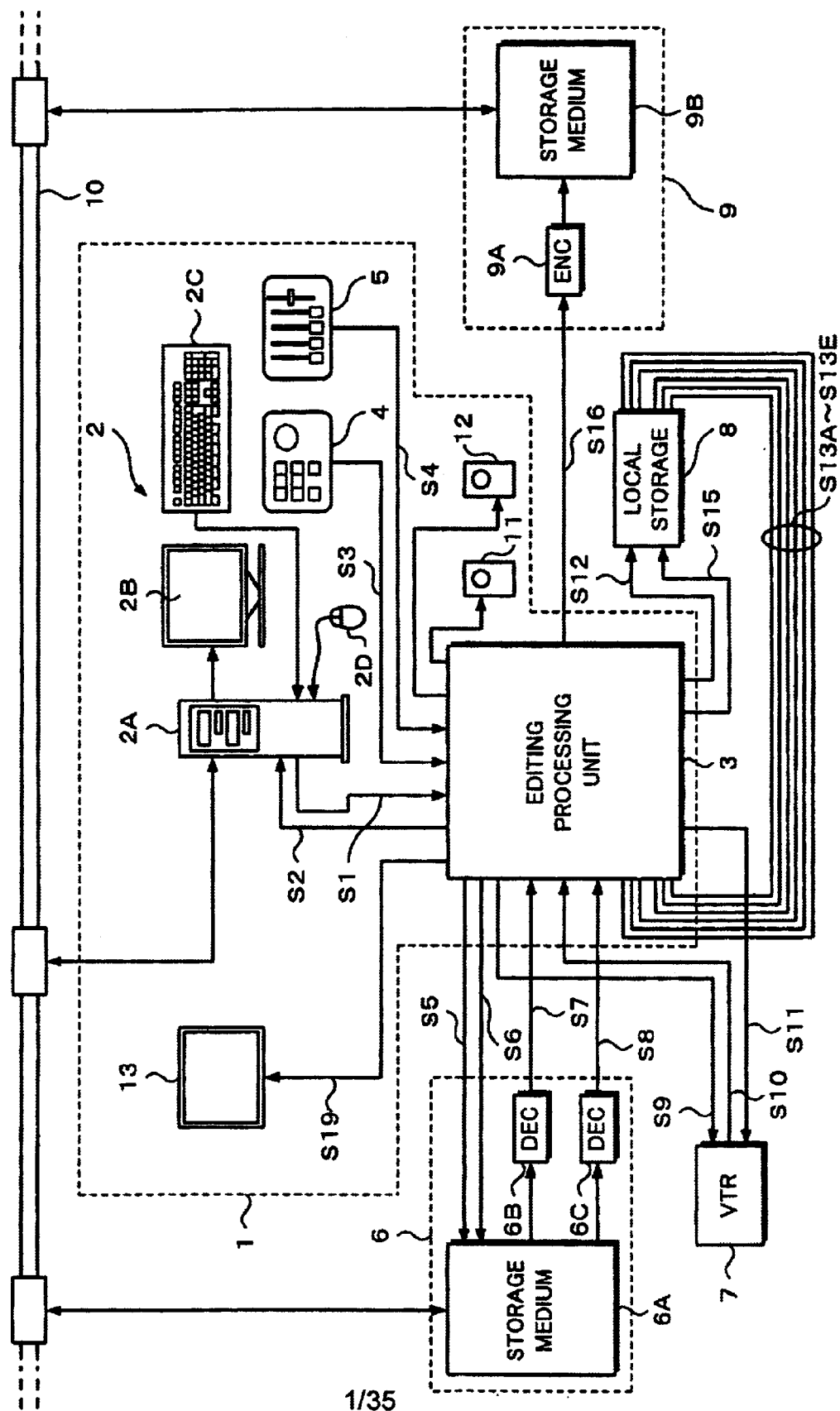
FIG. 1 is a block diagram showing an editing apparatus according to the present invention.

In FIG. 1, reference numeral 1 is an editing apparatus according to the present invention. The editing apparatus 1 mainly comprises a computer 2 and an editing processing unit 3.

The computer 2 that is a controlling means comprises a main unit 2A, a monitor 2B, a keyboard 2C, and a mouse 2D. The main unit comprises a CPU (Central Processing Unit), various processing circuits, a floppy disk drive, a hard disk drive. The monitor 2B that is a displaying means is connected to the main unit 2A. The keyboard 2C and the mouse are inputting means. Application software for an editing process has been pre-installed in the hard disk drive. The application software is operated under the control of an operating system so that the computer 2 operates for the editing apparatus.

When the application software is operated, a graphic image for an editing GUI (Graphical User Interface) is displayed on the monitor 2B. In the editing apparatus 1, the graphic display and the inputting means compose a user interface. With for example the mouse 2D, the editing operator selects a desired graphic display element that represents a control command button on the monitor 2B so as to input a control command that represents a process content of an editing process. When the input control command causes the editing process of the editing processing unit 3 to be controlled, the computer 2 generates a control signal S1 corresponding to the input control command and supplies the control signal S1 to the editing processing unit 3.

A video signal S2 is input to the computer 2 through the editing processing unit 3. Thus, the editing operator can mark an in-point (an event start point) and an out-point (an event end point) while viewing an image of each material on the monitor 2B. An event is an edit area that is set with an in-point and an out-point. An event is an edit material arranged on a time line. There are an audio event, a video event, a DSK (Down Stream Key) event, and so forth.

The computer 2 causes the monitor to display an event that is set with an in-point and an out-point and an image of an edited final program. Thus, the editing operator can check the resultant images. (Hereinafter, operations for displaying an event that has been cut from an edit material and a program that has been edited are referred to as preview operations.)

The editing processing unit 3 comprises a matrix switcher portion, an image processing portion, and an audio processing portion that are disposed therein. The editing processing unit 3 is an editing executing unit that performs a material cutting/pasting operation, an effect process for a video signal and an audio signal, and a real editing operation.

In addition to the computer 2, the editing processing unit 3 is connected to dedicated controllers 4 and 5 as other inputting means. With the dedicated controllers 4 and 5, the editing operator can input control commands for editing operations.

The dedicated controller 4 has button switches for setting an in-point and an out-point of a material, a button switch for performing a reproducing operation of a material, and a button switch for performing a recording operation of an edited program. In addition, the dedicated controller 4 has dial switches for performing a variable speed reproducing operation (so-called shuttle reproducing operation) and a frame-by-frame reproducing operation (so-called jog reproducing operation), and so forth. A control signal S3 corresponding to command information that is input with such button switches and dial switches is supplied to the editing processing unit 3.

The dedicated controller 5 has four audio fader levers and a video fader lever. With the audio fader levers, the editing operator can set signal levels of individual audio signals.

Likewise, with the video fader lever, the editing operator can set a switching ratio of two images. A control signal S4 corresponding to command information that is input through the fader levers (set values of the fader levers) is supplied to the editing processing unit 3.

A daily server 6 (that is a storing means that stores edit materials such as video and audio materials and that is used in a broadcasting station) is connected to the editing processing unit 3. The editing processing unit 3 can capture a video signal and an audio signal stored in the daily server 6. The daily server 6 has two output ports for two channels. A desired video signal S7 and a desired audio signal S8 are read from a storage medium 6A corresponding to control signals S5 and S6 on each channel. A video signal and an audio signal that have been compressed with a compression ratio of 1/10 in the MPEG (Moving Picture coding Experts Group) format are stored in the storage medium 6A. A video signal and an audio signal that are read from the storage medium 6A are decoded by decoders 6B and 6C, respectively. Thereafter, the resultant signals are converted into a serial-to-digital interface (SDI) format. (Hereinafter, this interface is referred to as SDI). The resultant video signal S7 and the resultant audio signal S8 are supplied to the editing processing unit 3.

A VTR 7 is also connected to the editing processing unit 3. The editing processing unit 3 can also capture a video signal and an audio signal from the VTR 7. The VTR 7 has an input/output interface corresponding to the SDI standard. A desired video/audio signal S10 is read from the VTR 7 corresponding to a control signal S9 received from the editing and processing unit 3. The VTR 7 can receive video/audio signals that have been edited and the video/audio signals S7 and S8 that have been read from the daily server as a video/audio signal S11 from the editing processing unit 3. The VTR 7 can record the video/audio signal S11 to a video tape corresponding to the control signal S9.

A local storage 8 is connected as a storing means to the editing processing unit 3. The local storage 8 has a plurality of hard disks. The editing processing unit 3 can capture a video signal and an audio signal from the local storage 8. The local storage 8 has an input/output interface corresponding to the SDI standard. In addition, the local storage 8 has two output ports for two channels. The local storage 8 reads and outputs desired video and audio signals S13A to S13E corresponding to a control signal S12 received from the editing processing unit 3. The local storage 8 can receives a video signal and an audio signal that have been edited and a video signal and an audio signal that have been read from the daily server 6 or the VTR 7 from the editing processing unit 3 as a video/audio signal S15 to be recorded. The video/audio signal S15 is recorded to a hard disk of the local storage 8 corresponding to the control signal S9.

An on-air buffer 9 (a storing means that temporarily stores a program to be broadcast) is connected to the editing processing unit 3. A video/audio signal S16 of a program that has been edited by the editing processing unit 3 is stored in the on-air buffer 9. The on-air buffer 9 has an input interface corresponding to the SDI standard. Thus, the video/audio signal S16 to be broadcast has a signal format corresponding to the SDI standard. The video/audio signal S16 stored in the on-air buffer 9 has been compressed with a compression ratio of 1/10 corresponding to the MPEG standard by the encoder 9A. The video/audio signal S16 is stored in a storage medium 9B of the on-air buffer 9.

The on-air buffer 9 and the computer 2 of the editing apparatus 1 are connected through a local area network 10 such as Ethernet (hereinafter, the local area network is referred to as LAN). A control command is supplied to the on-air buffer 9 through the computer 2 and the LAN 10. In addition, an edit list representing from what material an edited program is produced (hereinafter, the edit list is referred to as edit decision list) is supplied to the on-air buffer 9 through the LAN 10.

The computer 2 of the editing apparatus 1 and the daily server 6 are connected through the LAN 10. The computer 2 can reference file names of individual materials stored in the daily server 6 through the LAN 10.

Speakers 11 and 12 are optionally connected to the editing processing unit 3. Audio signals S17 and S18 that have been edited by the editing processing unit 3 are output from the speakers 11 and 12 so that the editing operator can check the edited results of the audio data.

In addition, a pre-view monitor 13 is optionally connected the editing processing unit 3. A video signal S19 that has been edited by the editing processing unit 3 is displayed on the monitor 13 so that the editing operator can check the edited results of video data on the monitor 13. Since the size of a pre-view screen on the monitor 13 is larger than a pre-view screen on the monitor 2B of the computer 2, with the monitor 13, the editing operator can check edited results more clearly.

Next, the editing method of the editing apparatus 1 will be briefly described. When the application software gets started in the editing apparatus 1, graphic data is displayed as the GUI on the monitor 2B. The graphic data includes a viewer window screen, a log window screen, a program window screen, control command buttons, and so forth. As will be described later, on the viewer window screen, the editing operator sets an in-point and an out-point while viewing an image of a material so as to generate an event. The log window screen displays a clip image of an event generated on the viewer window. On the program window screen, the editing operator selects an editing process that the editing apparatus 1 performs and causes the results of the selected editing process to be graphically displayed. With the control command buttons, the editing operator inputs control commands.

The editing operator clicks a particular control command button displayed as a button or an icon on the monitor 2B with the mouse 2D so as to select a device (such as the daily server 6, the VTR 7, or the local storage 8) that has stored a particular edit material and cause the selected device to reproduce the particular edit material. In addition, the editing operator issues a reproduction command for the material. Thus, the video signal S2 corresponding to the selected material is supplied to the computer 2 through the editing processing unit 3. The image of the material is displayed on the monitor 2B. While viewing the image of the material, the editing operator sets an in-point and an out-point so as to generate an event necessary to produce a program. By repeating such an operation, the editing operator prepares required events and registers them to the log window.

Thereafter, the editing operator clicks a desired clip image displayed on the log window with the mouse 2D so as to select a desired event. Thus, a belt shaped graphic image is displayed. The editing operator places the belt shaped graphic image that represents the selected event at a desired position on a time line (that will be described later) on the program window. By repeating such an operation, the editing operator arranges the bel shaped graphic images that represent events in a desired order so as to designate the order of the events of the program. When the editing operator wants to add a video effect to a desired event, he or she clicks a predetermined control command button so as to display a dialog for setting a video effect. On the dialog, the editing operator selects a video effect to be added. Thus, a belt shaped graphic image that represents the selected video effect is displayed. The editing operator places the belt shaped graphic image at a desired position on the time line.

When the editing operator has decided a plan for the program, he or she clicks a predetermined control command button so as to input a pre-view command. Thus, the editing apparatus 1 controls the editing processing unit 3 so as to reproduce individual events of the program in the order designated on the program window. In addition, the editing apparatus 1 controls the editing processing unit 3 so as to add the designated video effect to the designated event and thereby generates the video signal S2. The video signal S2 is supplied to the computer 2. An image corresponding to the video signal S2 is displayed on the monitor 2B. Thus, the editing operator can check the contents of the program with the program window.

As the results of the pre-view operation, when the editing operator does not need to change the contents of the program, he or she clicks a predetermined control command button so as to input a record command. Thus, the editing apparatus 1 controls the editing processing unit 3 so as to generate video/audio signals S15$a$ and S15$b$ that represent the designated program. The video/audio signals S15$a$ and S15$b$ are supplied to the local storage 8. The local storage 8 records the video/audio signals S15$a$ and S15$b$. Thus, the program designated on the program window is completed and stored in the local storage. To broadcast the produced program, the editing operator inputs a transfer command through the GUI. Thus, the video/audio signals are read from the local storage and transferred to the on-air buffer 9 through the editing processing unit 3.

Thus, in the editing apparatus 1, while viewing an image of each material and images of a program on the monitor 2B, the editing operator can produce the program. Thus, the editing operator can user-friendly edit a program. In addition, in the editing apparatus 1, the editing operator can edit a program without need to operate a switcher and a special effect unit. Thus, the editing operator can easily edit a program. Consequently, the editing time can be shortened.

1-2. Structure of Computer

Figure 2:
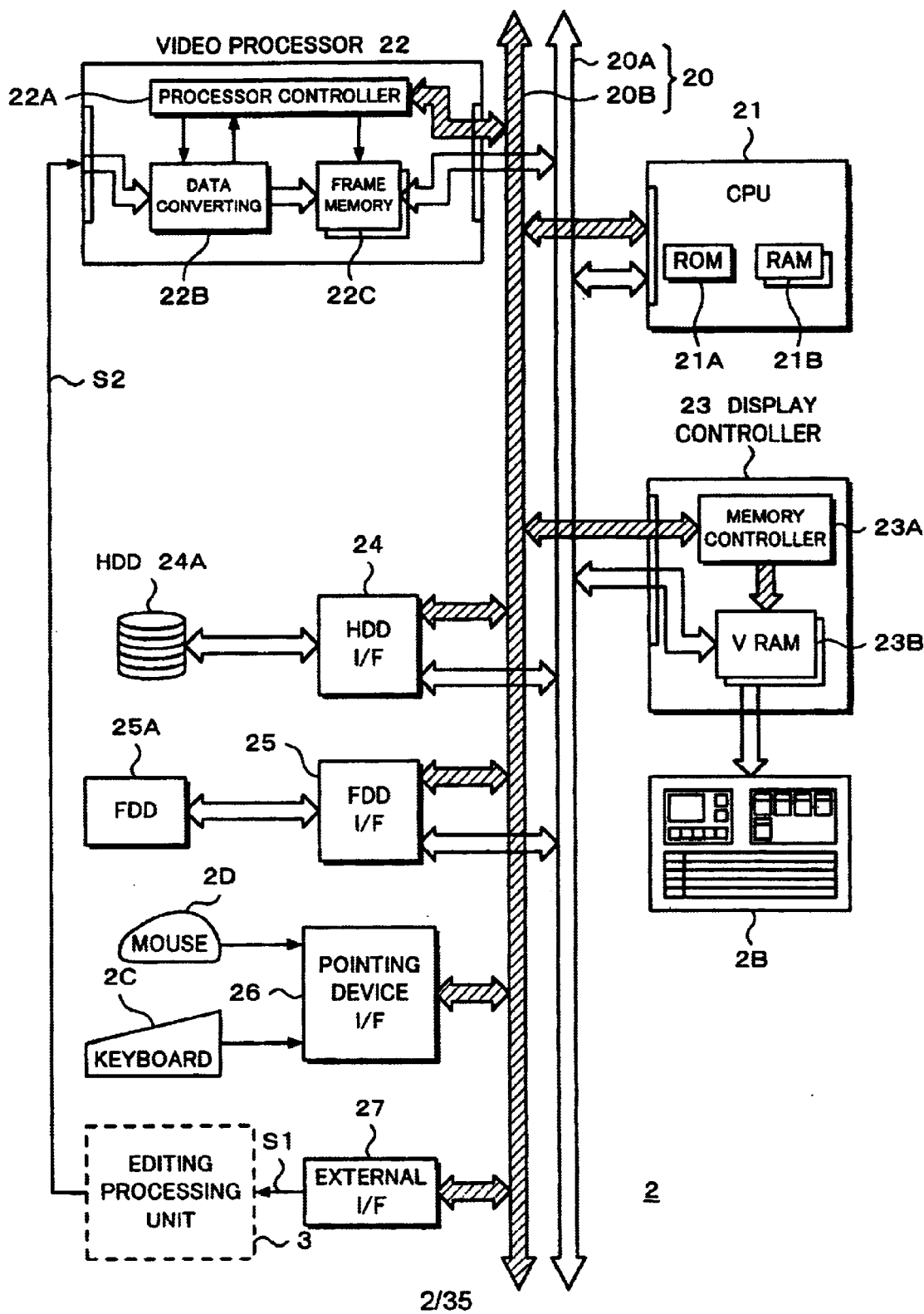
FIG. 2 is a block diagram showing the internal structure of a computer that composes the editing apparatus.

In this section, the internal structure of the computer 2 will be practically described. As shown in FIG. 2, the computer 2 comprises a system bus 20, a CPU 21, a video processor 22, a display controller 23, a HDD interface 24, a FDD interface 25, a pointing device interface 26, and an external interface 27. The system bus 20 transmits command data and video data. The CPU 21 controls the entire portions of the computer 2. The video processor 22 performs a video process and so forth for the input video signal S2. The display controller 23 manages video data and graphic data for the GUI displayed on the monitor 2B. The HDD interface 24 controls a local hard disk drive (local HDD) 24A. The FDD interface 25 controls a floppy disc drive (FDD) 25A. The pointing device interface 26 generates a control command corresponding to a command received from pointing devices such as the mouse 2D, the keyboard 2C, and so forth. The external interface 27 has a software driver that supplies the control signal S1 to the editing processing unit 3.

The system bus 20 is a bus that transmits video data, command data, address data, and so forth in the computer 2. The system bus 20 has a video data bus 20A and a command data bus 20B. The video data bus 20A transmits video data. The command data bus 20B transmits command data and address data.

The CPU 21, the video processor 22, the display controller 23, the HDD interface 24, and the FDD interface 25 are connected to the video data bus 20A. The CPU 21, the video processor 22, the display controller 23, the HDD interface 24, and the FDD interface 25 transmit video data through the video data bus 20A.

On the other hand, the CPU 21, the video processor 22, the display controller 23, the HDD interface 24, the FDD interface 25, the pointing device interface 26, and the external interface 27 are connected to the command data bus 20B (in other words, all blocks of the computer 2 are connected to the command data bus 20B). The CPU 21, the video processor 22, the display controller 23, the HDD interface 24, the FDD interface 25, the pointing device interface 26, and the external interface 27 transmit command data and address data through the command data bus 20B.

The CPU 21 is a block that controls the entire portions of the computer 2. The CPU 21 has a ROM 21A and a RAM 21B. The ROM 21A stores an operating system of the computer 2. The RAM 21B stores application software and so forth that have been uploaded. When the computer 2 gets started, the CPU 21 executes the software under the control of the operating system stored in the ROM 21A. When the application software is executed under the control of the operating system that is running, the CPU 21 reads the application software recorded on a hard disk of the hard disk drive 24A, uploads the application software to the RAM 21B, and executes the application software.

The video processor 22 is a block that receives the SDI format video signal S2 from the computer 2, converts the data of the video signal S2, and temporarily buffers the resultant video data. In reality, the video processor 22 comprises a processor controller 22A, a data converting portion 22B, and a frame memory 22C. The processor controller 22A controls the entire portions of the video processor 22. The data converting portion 22B extracts a composite video signal from a payload portion of the received video signal S2 and converts the composite video signal into a digital component video signal. The frame memory 22C temporarily stores several frames of video data received from the data converting portion 22B.

The processor controller 22A supplies a control signal to the data converting portion 22B so as to control the data converting operation of the data converting portion 22B and cause the data converting portion 22B to extract a time code from the video signal S2. The processor controller 22A supplies a control signal to the frame memory 22C so as to control read/write timings and read/write addresses of the frame memory 22C. The processor controller 22A controls the read timing of the frame memory 22C so that the time code supplied to the display controller 23 corresponds to video data (frame data).

The data converting portion 22 converts a composite video signal into a digital component video signal corresponding to a control signal received from the processor controller 22A. The time code is extracted in the converting process. As described above, the resultant video data is supplied to the frame memory 22C. The extracted time code is supplied to the processor controller 22A.

The frame memory 22C temporarily stores the video data received from the data converting portion 22B. As described above, the read/write timings of the frame memory 22C are controlled by the processor controller 22A. The frame memory 22C is composed of two frame memory portions that store two frames of video data.

The video data stored in the frame memory 22A is read under the read control of the processor controller 22A. At this point, all pixels of the video data stored in the frame memory 22C are not read. Instead, pixels of the video data are thinned out so that the picture size becomes smaller than the original picture. The resultant video data is supplied to the display controller 23 through the video data bus 20A so as to display the video data on the viewer window (that will be described later) of the monitor 2B.

The display controller 23 is a control block that controls data displayed on the monitor 2B. The display controller 23 has a memory controller 23A and a VRAM (Video Random Access Memory) 23B. The memory controller 23A controls read/write timings of the VARM 23B corresponding to an internal synchronization of the computer 2. The VRAM 23B stores video data received from the frame memory 22C of the video processor 22 and image data generated by the CPU 21 corresponding to a timing control signal received from the memory controller 23A. Video data and image data stored in the VRAM 23B are read and displayed on the monitor 2B corresponding to the timing control signal received from the memory controller 23A in synchronization with the computer 2.

In this case, the image data is the GUI graphic data. The image data supplied from the CPU 10 to the VRAM 23B is for example a window, a cursor, a scroll bar, a device icon, and so forth. In the computer 2, a plurality of types of image data are displayed as GUI graphic data on the monitor 2B.

The HDD interface 24 is an interface block that communicates with the local hard disk driver (HDD) 24A in the computer 2. The HDD interface 24 communicates with the hard disk drive 24A in a SCSI (Small Computer System Interface) transmission format.

An application software that starts on the computer 2 has been installed to the hard disk drive 24A. When the application software is executed, it is read from the hard disk drive 24A and uploaded to the RAM 21B of the CPU 21. When the application software is stopped, various information (for example, file information) generated in the editing operation and stored in the RAM 21B is downloaded to the hard disk through the hard disk drive 24A.

The FDD interface 25 is an interface block that communicates with the floppy disk driver (FDD) 25A. The FDD interface 25 communicates with the floppy disk drive 25A in the SCSI transmission format.

The pointing device interface 26 is an interface block that receives information from the mouse 2D and the keyboard 2C connected to the computer 2. The pointing device interface 26 receives detection information of a two-dimensional rotary encoder of the mouse 2D and clock information of left and right buttons thereof. The pointing device interface 26 decodes such information and supplies the decoded information to the CPU 21. Likewise, the pointing device interface 26 receives input information from keys of the keyboards 2C, decodes the received information, and supplies the decoded information to the CPU 21. Thus, the CPU 21 recognizes what command button of the GUI displayed on the monitor 2B was clicked and various data that was input from the keyboard 2C and performs a control operation corresponding to the command button and the various data.

The external interface 27 is a block the communicates with the editing processing unit 3 disposed outside the computer 2. The external interface 27 has a driver that converts various control commands such as a reproduction command and a record command generated in the CPU 21 into data corresponding to a predetermined communication protocol. The external interface 27 supplies the control signal S1 that represents a control command to the editing processing unit 3.

1-2. Structure of Editing Processing Unit

Figure 3:
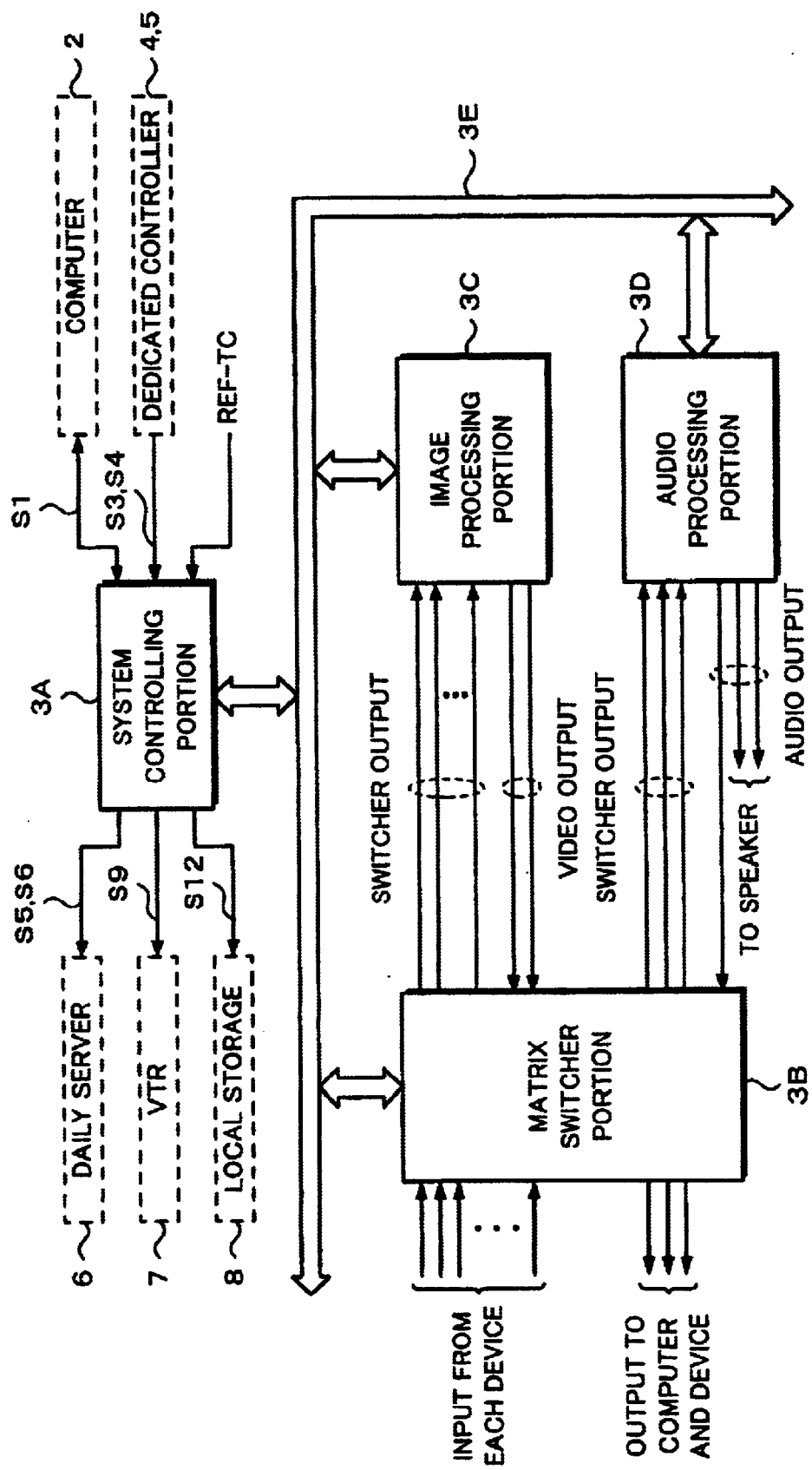
FIG. 3 is a block diagram showing the internal structure of an editing processing unit that composes the editing apparatus.

In this section, the structure of the editing processing unit 3 will be described. As shown in FIG. 3, the editing processing unit 3 mainly comprises a system controlling portion 3A, a matrix switcher portion 3B, an image processing portion 3C, and an audio processing portion 3D. The system controlling portion 3A receives the control signal S1 from the computer 2. In addition, the system controlling portion 3A receives the control signals S3 and S4 from the dedicated controllers 4 and 5. The system controlling portion 3A controls the operations of the individual blocks corresponding to the control signals S1, S3, and S4. In reality, the system controlling portion 3A controls the operations of the matrix swither portion 3B, the image processing portion 3C, and the audio processing portion 3D through the control bus 3E. In addition, the system controlling portion 3A supplies the control signals S5, S6, S9, and S12 to the daily server 6, the VTR 7, and the local storage 8 so as to control the reproducing operation and the recording operation thereof. Moreover, the system controlling portion 3A receives a reference time code (REF-TC) from the outside and manages a time code.

The matrix switcher portion 3B has a plurality of input terminals and a plurality of output terminals and connects a desired input terminal to a desired output terminal under the control of the system controlling portion 3A. Thus, the matrix switcher portion 3B supplies desired signals of video/audio signals read from each device (the daily server 6, the VTR 7, or the local storage 8) to the image processing portion 3C and the audio processing portion 3D. In addition, the matrix switcher portion 3B supplies a desired signal to the computer 2 and each device (the VTR 7, the local storage 8, or the on-air buffer 9). Moreover, the matrix switcher portion 3B supplies a video signal processed by the image processing portion 3C to the computer 2. Alternatively, the matrix switcher portion 3B superimposes the video signal with an audio signal processed by the audio processing portion 3D and supplies the resultant signal to each device (the VTR 7, the local storage 8, or the on-air buffer 9).

The image processing portion 3C is a block that performs an effect process such as transition effect (a effect process for switching a background image into a foreground image such as a wipe effect process or a page turn effect process), an animation effect (an effect including a special image process and an image inserting process such as a mosaic effect process and a picture-in-picture effect process) for a video signal. The image processing portion 3C extracts a video signal from a video/audio signal selected by the matrix switcher portion 3B, performs the effect process for the extracted video signal, and outputs the resultant video signal to the matrix switcher portion 3B.

The editing apparatus has two types of effects that are a transition effect and an animation effect. The transition effect is an image effect for switching one image to another image such as a wipe effect and a page turn effect. The animation effect is a special effect for three-dimensionally converting an image or an image insertion effect such as a zoom up effect and a picture-in-picture effect.

The audio processing portion 3D is a block that adjusts the level of an audio signal and combines audio signals. The audio processing portion 3D extracts an audio signal from a video/audio signal selected by the matrix switcher portion 3D and adjusts the level of the audio signal or combines audio signals. The audio processing portion 3D outputs the resultant audio signal to the matrix switcher portion 3B or the speakers 11 and 12.

Figure 4:
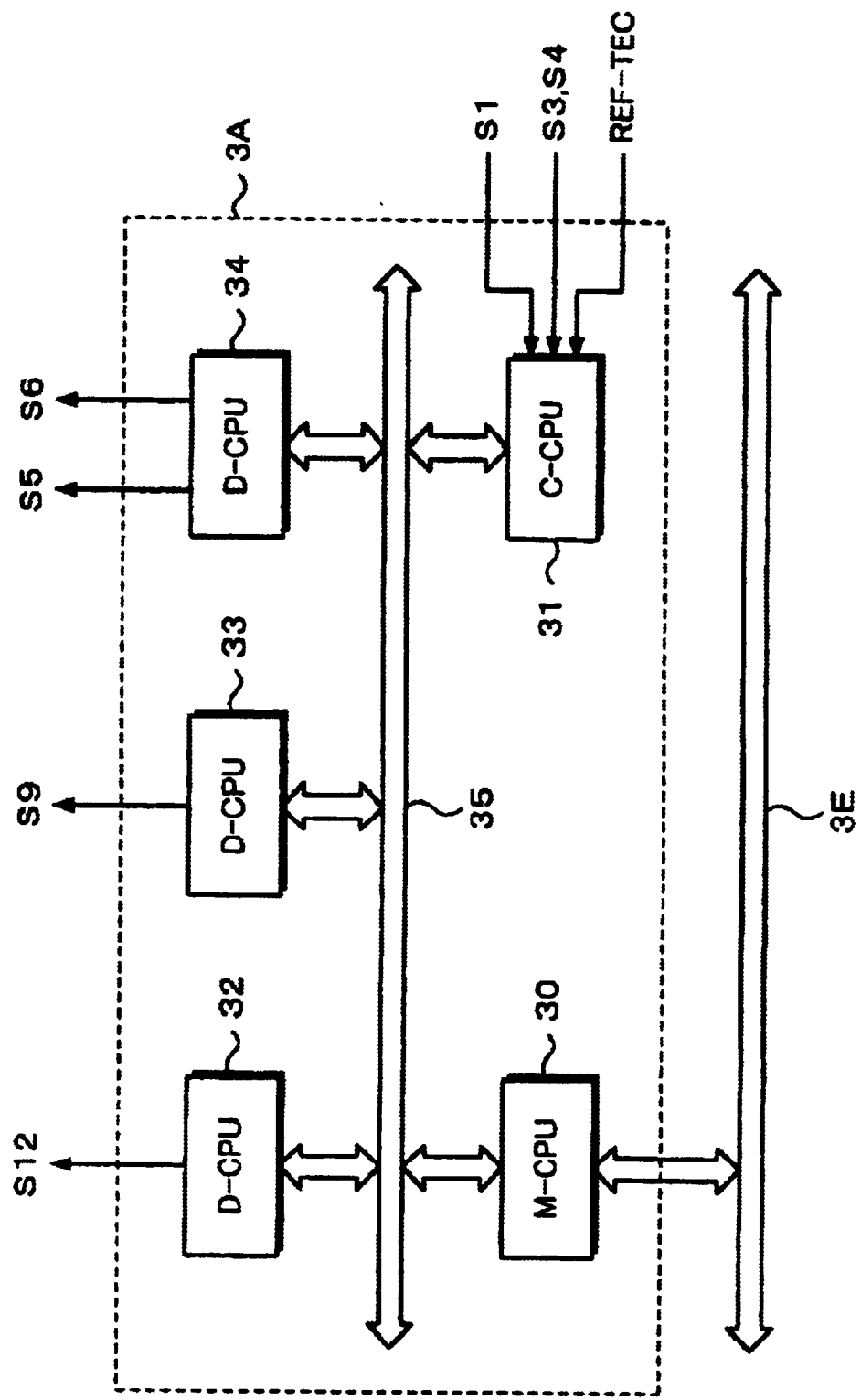
FIG. 4 is a block diagram showing the structure of a system controlling portion of the editing processing unit.

Next, with reference to FIG. 4, the structure of each block will be described in detail. As shown in FIG. 4, the system controlling portion 3A is composed of a plurality of CPUs that are a main CPU (M-CPU) 30, a communicating CPU (C-CPU), and device controlling CPUs (D-CPUs) 32 to 34. The main CPU 30 is a CPU that supplies control commands to the individual block (namely, the matrix switcher portion 3B, the image processing portion 3C, and the audio processing portion 3D) through the control bus 3E so as to control the operations thereof. The communicating CPU 31 is a communicating CPU that receives the reference time code (REF-TC) generated by an external time code generator (not shown), and receives the control signal S1 from the computer 2, and receives the control signals S3 and S4 from the dedicated controllers 4 and 5. The device controlling CPUs 32 to 34 are CPUs that supply the control signal S5, S6, S9, or S12 to each device (namely, the daily server 6, the VTR 7, and the local storage 8) so as to control the operation thereof.

In the system controlling portion 3A, the communicating CPU 31 receives the control signal S1, S3, or S4 and reproduces a control command corresponding to the control signal S1, S3, or S4. The control command is supplied to the main CPU 30 through the internal bus 35 of the system controlling portion 3A. The main CPU 30 analyzes the control command. When necessary, the main CPU 30 supplies a control command to the device controlling CPU 32, 33, or 34 so as to control the operation of the relevant device. When necessary, the main CPU 30 supplies a control command to the matrix switcher portion 3B, the image processing portion 3C, or the audio processing portion 3D through the control bus 3E so as to control the operation of the relevant block.

The communicating CPU 31 has a communication driver corresponding to the external interface 27 of the computer 2. The driver receives the control signal S1 from the computer 2. The device controlling CPUs 32 to 34 have RS-422 standard drivers. The drivers supply the control signal S5, S6, S9, or S12 corresponding to the RS-422 standard to each device.

Figure 5:
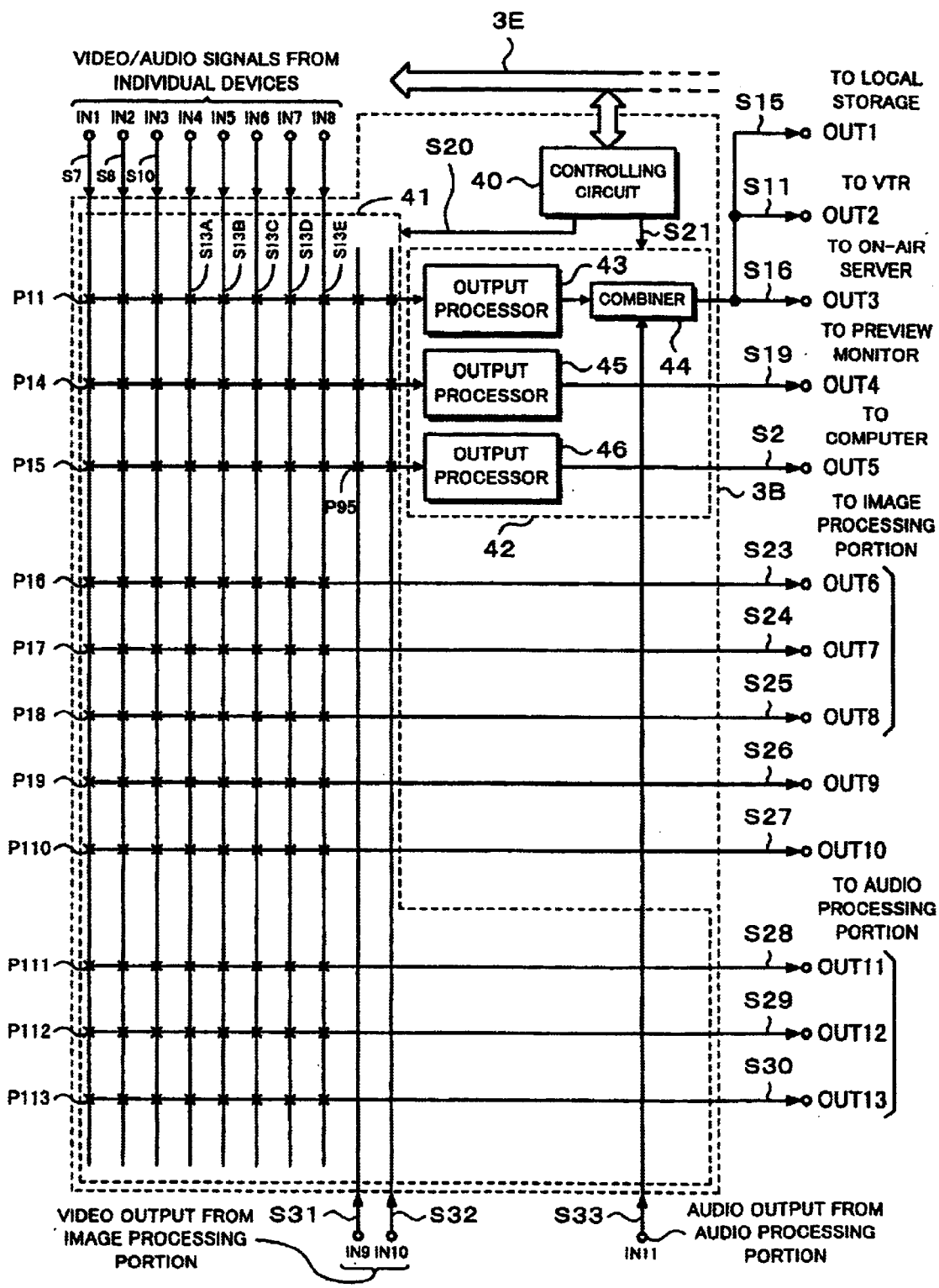
FIG. 5 is a block diagram showing the structure of a matrix switcher portion of the editing processing unit.

Next, with reference to FIG. 5, the matrix switcher portion 3B will be described. As shown in FIG. 5, the matrix switcher portion 3B mainly comprises a controlling circuit 40, a matrix switcher block 41, and a format converting block 42. The controlling circuit 40 controls the entire portions of the matrix switcher portion 3B, generates control signals S20 and S21 corresponding to a control command received through the control bus 3E, and supplies the control signals S20 and S21 to the matrix switcher block 41 and the format converting block 42 so as to control the operations thereof.

The matrix switcher block 41 has a plurality of input lines and a plurality of output lines arranged in a matrix shape. The input lines are connected to input terminals IN1 to IN11. The output lines are connected to output terminals OUT1 to OUT13. The matrix switcher block 41 connects an input line and an output line at a cross point P (denoted by X) where the input line and the output line intersect). Thus, in the matrix switcher block 41, when an input line and an output line are connected at a desired cross point corresponding to the control signal S20 received from the controlling circuit 40, a desired signal that is input to an input terminal IN1 to IN11 can be output to a desired output terminal OUT1 to OUT11. In the following description, a cross point that connects IN7 and OUT9 is denoted by "P79". A cross point that connects IN10 and OUT4 is denoted by "P104".

In the matrix switcher portion 3B, video/audio signals that are read from the individual devices of the daily server 6, the VTR 7, and the local storage 8 are input to the input terminals IN1 to IN8. (In the example shown in FIG. 5, the video/audio signals S7, S8, S10, and S13A to S13E are input to the input terminals IN1 to IN5. Thus, the input terminals IN5 to IN8 are blank terminals.) Video signals S31 and S32 that have been processed by the image processing portion 3C are input to the input terminals IN9 and IN10, respectively. An audio signal S33 that has been processed by the audio processing portion 3D is input to the input terminal IN11.

In the matrix switcher portion 3B, the output terminal OUT1 is assigned as a terminal for outputting the video/audio signal S15 to the local storage 8. The output terminal OUT2 is assigned as a terminal for outputting the video/audio signal S11 to the VTR 7. The output terminal OUT3 is assigned as a terminal for outputting the video/audio signal S16 to the on-air buffer 9. The output terminals OUT1 to OUT3 are assigned as terminals for outputting programs. The output terminal OUT4 is assigned as a preview terminal for outputting the video signal S19 to the preview monitor 13. The output terminal OUT5 is assigned as a capture output terminal for outputting the video signal S2 to the computer 2. The output terminals OUT6 to OUT10 are assigned as terminals for outputting video/audio signals S23 to S27 to the image processing portion 3C. The output terminals OUT11 to OUT13 are assigned as terminals for outputting video/audio signals S28 to S30 to the audio processing portion 3D.

The format converting block 42 is a circuit block that converts a signal that is output to the output terminals OUT1 to OUT5 into an SDI format signal corresponding to the control signal S21 received from the controlling circuit 40. The format converting block 42 comprises output processors 43, an audio combiner 44, an output processor 45, and an output processor 46. The output processor 43 converts the format of a signal that is output to the output terminals OUT1 to OUT3. The output processor 45 converts the format of a signal that is output to the output terminal OUT4. The output processor 46 converts the format of a signal that is output to the output terminal OUT5.

When a video signal that has been processed by the image processing portion 3C (namely, the video signal S31 or S2 that is input to the input terminal IN9 or IN10) is output, the output processor 43 converts the video signal S31 or S32 into an SDI format video signal. When the embedded audio signal S33 that has been processed by the audio processing portion 3D is output (namely, the audio signal S33 that is input to the input terminal IN11 is output), the audio combiner 44 superimposes the SDI format video signal that has been output from the output processor 43 with the embedded audio signal S33. Thus, the video signal S31 or S32 processed by the image processing portion 3C and the audio signal S33 processed by the audio processing portion 3D are supplied as SDI format signals to the local storage 8, the VTR 7, and the on-air buffer 9. The embedded audio signal is digital audio data transmitted with a packet in an SDI format auxiliary data area.

When video/audio signals that are input to the input terminals IN1 to IN8 are output to the output terminals OUT1 to OUT3, since these signals are output as SDI format signals, the output processor 43 and the audio combiner 44 directly output the input video/audio signals to the output terminals OUT1 to OUT3 without performing any process.

When the video signal S31 or S32 that has been processed by the image processing portion 3C is output to the output terminal OUT4 or OUT5, the output processors 45 and 46 convert the video signal S31 or S32 into an SDI format video signal. Thus, the video signal processed by the image processing portion 3C is supplied as an SDI format signal to the preview monitor 13 and the computer 2. When the video/audio signals that are input to the input terminals IN1 to IN8 are output to the output terminal OUT4 and OUT5, the output processors 45 and 46 directly output the video/audio signals to the output terminals OUT4 and OUT5 without performing any process.

Figure 6:
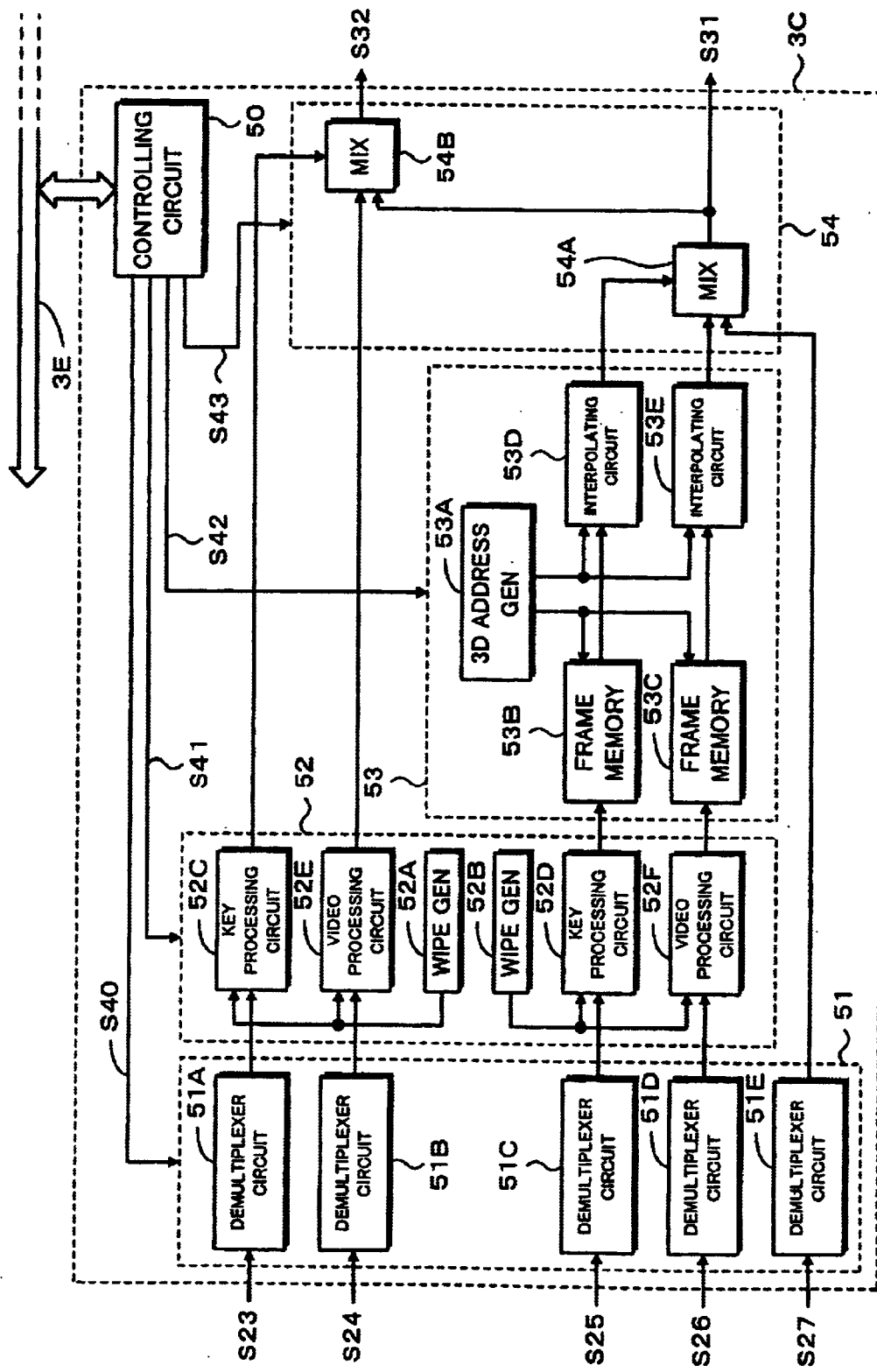
FIG. 6 is a block diagram showing the structure of an image processing portion of the editing processing unit.

Next, with reference to FIG. 6, the image processing portion 3C will be described. As shown in FIG. 6, the image processing portion 3C mainly comprises a controlling circuit 50, a demultiplexer block 51, a switcher block 52, a special effect block 53, and a mixer block 54. The controlling circuit 50 controls the entire portions of the image processing portion 3C. The controlling circuit 50 generates control signals S40, S41, S42, and S43 corresponding to a control command received through the control bus 3E. The controlling circuit 50 supplies the control signals S40, S41, S42, and 43 to the demultiplexer 51, the switcher block 52, the special effect block 53, and the mixer block 54 so as to control the operations thereof. Thus, the image processing portion 3C performs an image process for the video signals (S23 to S27) received from the matrix switcher portion 3B. The image process is for example an animation effect process and a transition effect process. The animation effect process is a special effect process added to a source video signal or an effect insertion process for inserting a special effect video signal into a background video signal. The transition effect process is for example an effect process for switching a background video signal to a foreground video signal.

The demultiplexer block 51 is a block that extracts a video signal or a key signal from the SDI format video/audio signals S23 to S27. The demultiplexer 51 is composed of five demultiplexer circuits 51A to 51E that extract signals from the input vide/audio signals S23 to S27. The demultiplexer circuit 51A is a circuit that extracts a key signal from a payload portion of each packet that composes the video/audio signal S23 corresponding to a synchronous signal and header information placed at the beginning of the key signal. The demultiplexer circuit 51B is a circuit that extracts a video signal from a payload portion of each packet that composes the video/audio signal S24 corresponding to a synchronous signal and header information placed at the beginning of the video signal. Likewise, the demultiplexer circuit 51C extracts a key signal from the video/audio signal S25. The demultiplexer circuit 51D extracts a video signal from the video/audio signal S26. The demultiplexer circuit 51E extracts a video signal from the video/audio signal S27.

The switcher block 52 is a block that performs a transition effect process for the extracted key signal and video signal. The switcher block 52 comprises wipe signal generators 52A and 52B, key signal processing circuits 52C and 52D, and video signal processing circuits 52E and 52F. The wipe signal generator 52A generates a wipe signal corresponding to a transition effect process designated by the editing operator corresponding to the control signal S41 received from the controlling circuit 50 and supplies the wipe signal to the key signal processing circuit 52C and the video signal processing circuit 52E. The key signal processing circuit 52C converts a key signal supplied from the demultiplexer circuit 51A corresponding to the wipe signal (or newly generates a desired key signal corresponding to the supplied wipe signal). The key signal processing circuit 52C supplies the resultant key signal to the mixer block 54 (that will be described later). The video signal processing circuit 52E converts a video signal received from the demultiplexer circuit 51B corresponding to the received wipe signal and supplies the resultant video signal to the mixer block 54.

Likewise, the wipe signal generator 52B generates a wipe signal corresponding to a transition effect process designated by the editing operator corresponding to the control signal S41 received from the controlling circuit 50 and supplies the wipe signal to the key signal processing circuit 52D and the video signal processing circuit 52F. The key signal processing circuit 52D converts a key signal received from the demultiplexer circuit 51C corresponding to the received wipe signal (or newly generates a desired key signal corresponding to the received wipe signal) and supplies the resultant key signal to the special effect block 53 (that will be described later). The video signal processing circuit 52F converts a video signal received from the demultiplexer circuit 51D corresponding to the received wipe signal and supplies the resultant video signal to the special effect block 53.

The special effect block 53 is a block that three-dimensionally converts a key signal received from the key signal processing circuit 52D and a video signal received from the video signal processing circuit 52F into a three-dimensional image corresponding to the control signal S42 received from the controlling circuit 50. The special effect block 53 comprises a three-dimensional address generating circuit 53, frame memories 53B and 53C, and interpolating circuits 53D and 53E. The three-dimensional address generating circuit 53A generates a conversion address for a three-dimensional video converting process designated by the editing operator corresponding to the control signal S42 and supplies the generated conversion address to the frame memories 53B and 53C and the interpolating circuits 53D and 53E.

The frame memory 53B successively stores the key signal received from the key signal processing circuit 52D to the memory area and reads the key signal from the memory area corresponding to the conversion address so as to perform the three-dimensionally converting process for the key signal. The frame memory 53B supplies the resultant key signal to the interpolating circuit 53D. Likewise, the frame memory 53B successively stores a video signal received from the video signal processing circuit 52F to the memory area and reads the video signal from the memory area corresponding to the conversion address. Thus, the frame memory 53B three-dimensionally converts the video signal and supplies the resultant video signal to the interpolating circuit 53E.

The interpolating circuit 53D performs an interpolating process for the key signal that has been three-dimensionally converted. The interpolating circuit 53D spatially interpolates pixels of the key signal corresponding to the conversion address and supplies the resultant key signal to the mixer block 54. Likewise, the interpolating circuit 53E is a circuit that performs an interpolating process for a video signal that has been three-dimensionally converted. The interpolating circuit 53E spatially interpolates pixels of the video signal corresponding to the conversion address and supplies the resultant video signal to the mixer block 54 (that will be described later).

The mixer block 54 is a block that combines video signals corresponding to a control signal S43. The mixer block 54 is composed of two mixing circuits 54A and 54B. The mixing circuit 54A combines a video signal converted by the special effect block 54 and a video signal received from the demultiplexer circuit 51E corresponding to a key signal received from the special effect block 53 and generates the video signal S31. The mixing circuit 54B combines a video signal received from the switcher block 52 and the video signal S31 received from the mixing circuit 54A corresponding to a key signal received from the switcher block 52 and generates the video signal S32. The video signals S31 and S32 are supplied to the matrix switcher portion 3B.

When a transition effect process for switching one image to another image is performed, a video signal received from the demultiplexer circuit 51D is supplied as a background video signal to the mixing circuit 54B through the mixing circuit 54A. In addition, a video signal received from the video signal processing circuit 52E is supplied as a foreground video signal to the mixing circuit 54B. The two video signals are combined corresponding to a key signal received from the key signal processing circuit 52C. Thus, the video signal S32 of which a background video signal is switched to a foreground video signal is generated.

A foreground image is an image displayed when a transition effect process is performed. Alternatively, a foreground image is an image inserted into a background image when an animation effect process is performed. The resultant image is filled in an effect pattern. On the other hand, a background image is an image that is erased when a transition effect process is performed. Alternatively, a background image is an image into which an effect pattern filled with a foreground image is inserted.

When a transition effect process that requires an image converting process such as a page turn process is performed, a video signal received from the demultiplexer circuit 51E is supplied as a background video signal to the mixing circuit 54A. In addition, a video signal received from the video signal processing circuit 52F is converted as a foreground video signal by the special effect block 53 and then supplied to the mixing circuit 54A. The two video signals are combined corresponding to a key signal processed by the special effect block 53. Thus, the video signal S31 of which a background video signal is switched to a foreground video signal as with a page turn process is generated.

When an animation effect process such as a picture-in-picture process is performed, a video signal received from the demultiplexer circuit 51E is supplied as a background video signal to the mixing circuit 54A. In addition, a video signal received from the video signal processing circuit 52F is converted as an insertion material by the special effect block 53 and then supplied to the mixing circuit 54A. The two video signals are combined corresponding to a key signal processed by the special effect block 53. The picture-in-picture video signal S31 of which an insertion material is inserted into a background video signal is generated.

Figure 7:
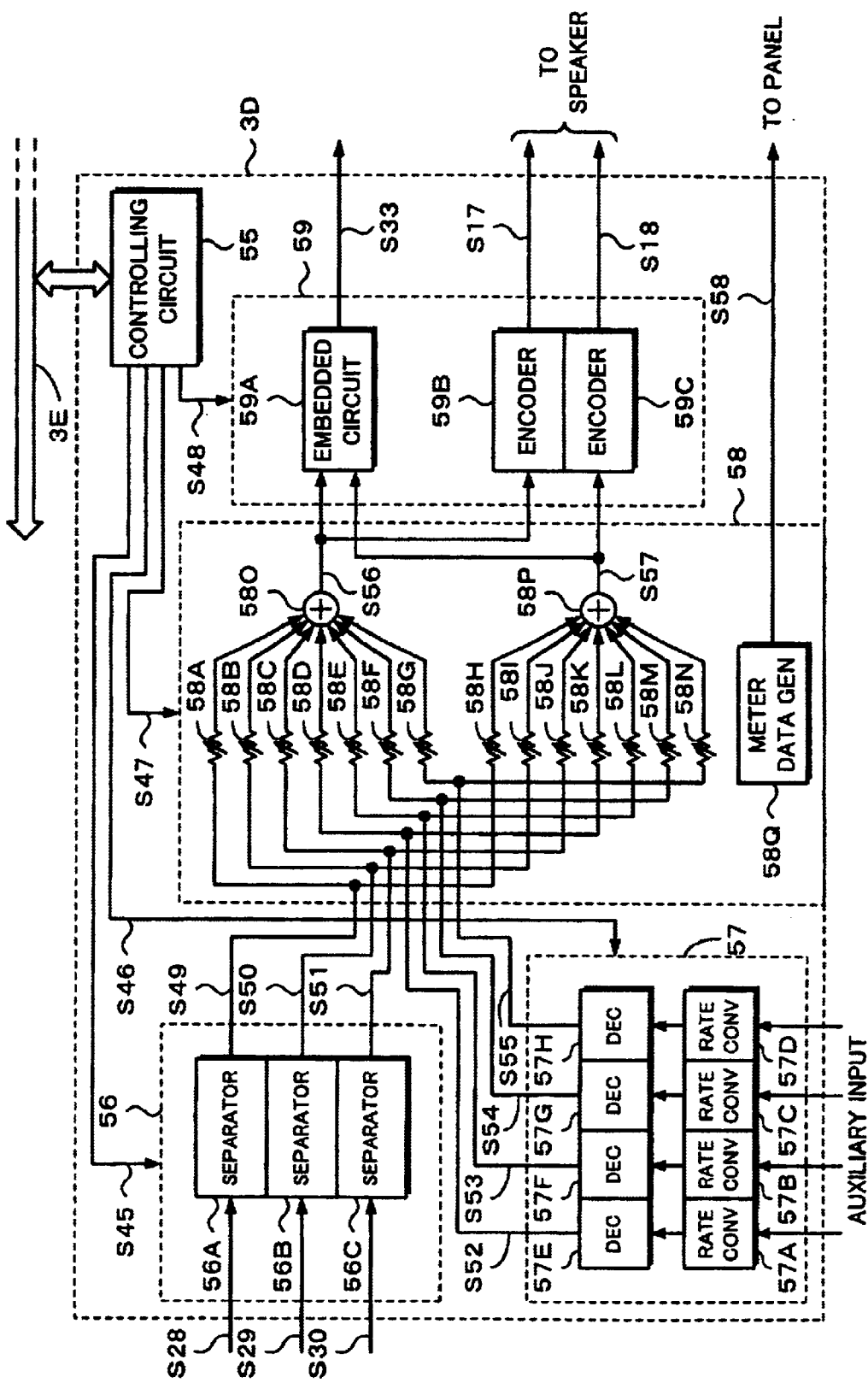
FIG. 7 is a block diagram showing the structure of an audio processing portion of the editing processing unit.

Next, with reference to FIG. 7, the audio processing portion 3D will be described. As shown in FIG. 7, the audio processing circuit 3D mainly comprises a controlling circuit 55, an input signal processing block 56, an auxiliary input signal processing block 57, a mixer block 58, and an output signal processing block 59. The controlling circuit 55 controls the entire portions of the audio processing portion 3D. The controlling circuit 55 generates control signals S45, S46, S47, and S48 corresponding to a control command received through the control bus 3E and supplies the control signals S45, S46, S47, and S48 to the input signal processing block 56, the auxiliary input signal processing block 57, the mixer block 58, and the output signal processing block 59 so as to control the operations thereof. Thus, the audio processing portion 3D performs an audio process for the audio signals (S28 to S30) received from the matrix switcher portion 3B. In this example, the audio process is a level adjusting process of an audio signal and a combining process of audio signals.

The input signal processing portion 56 extracts an audio signal from the parallel SDI format video/audio signals S28 to S30, converts the extracted audio signal into a DSP format audio signal (so that the resultant audio signal can be processed by the signal processing portion (DSP portion)), and outputs the resultant signal. The input signal processing block 56 has separators 56A to 56C as signal separating circuits. The separators 56A to 56C extract DSP format audio signals from the parallel SDI format video/audio signals S28 to S30. In other words, the separators 56A to 56C extract embedded audio signals from the video/audio signals S28 to S30 and supply the resultant serial audio signals to the mixer block 58.

The auxiliary input signal processing block 57 is a block that converts an external AES/EBU (Audio Engineering Society/European Broadcasting Union) format audio signal into a DSP format audio signal. The auxiliary input signal processing block 57 has sampling rate converters 57A to 57D and decoders 57E to 57H. The sampling rate converters 57A to 57D convert data rates of input signals. The decoders 57E to 57H are format converting circuits. The sampling rate converters 57A to 57D convert the sampling rates of AES/EBU format audio signals into a predetermined sampling rate of the audio processing portion 3D. The resultant audio signals are supplied to the decoders 57E to 57H. The decoders 57E to 57H are circuits that convert the input AES/EBU format audio signals into DSP format audio signals and supply the resultant audio signals to the mixer block 58.

The mixer block 58 is a block that adjusts the levels of audio signals and combines audio signals. The mixer block 58 comprises gain setting circuit 58A to 58N, adding circuits 58O and 58P, and a meter data generating circuit 58Q. The meter data generating circuit 58Q supplies the signal levels of the gain setting circuits 58A to 58N to the dedicated controller 5. Audio signals received from the input signal processing block 56 and audio signals received from the auxiliary input signal processing block 57 are separated into right channel signal components and left channel signal components. The separated right channel signal components and the separated left channel signal components are supplied to the gain setting circuits 58A to 58G and the gain setting circuits 58H to 58N, respectively. The resistance values of the gain setting circuits 58A to 58G and 58H to 58N are varied corresponding to the operations of the audio faders of the GUI displayed on the monitor 2B of the computer 2 or the operations of the audio faders disposed in the dedicated controller 5. With the gain setting circuits 58A to 58G and 58H to 58N, the levels of input audio signals are adjusted as designated by the editing operator.

Audio signals whose levels have been adjusted by the gain setting circuits 58A to 58G are supplied to the adding circuit 58O. An output signal of the adding circuit 58O is supplied to the output signal processing block 59. Likewise, audio signals whose levels have been adjusted by the gain setting circuits 58H to 58N are supplied to the adding circuit 58P. An output signal of the adding circuit 58P is supplied to the output signal processing block 59. The meter data generating circuit 58Q converts the signal levels into data so that a digital meter of a panel of the dedicated controller 5 is directly controlled. The converted data is supplied to the dedicated controller 5.

The output signal processing block 59 is a block that converts DSP format audio signals into SDI format parallel embedded audio signals. The output signal processing block 59 has an embedded circuit 59A and encoders 59B and 59C. The embedded circuit 59A is a signal combining circuit. The encoders 59B and 59C are format converting circuits. The embedded circuit 59A is a circuit that converts the format of the input signal so that the audio signal is superimposed with an SDI format video signal by the combiner 44 of the matrix switcher portion 3B. In reality, the embedded circuit 59A combines serial audio signals received from the adding circuit 58O and 58P and converts the resultant signals into a parallel embedded audio signal. The resultant embedded audio signal S33 is supplied to the combiner 44 of the matrix switcher portion 3B.

The encoder 59B is a circuit that converts a DSP format audio signal into an AES/EBU format audio signal. In reality, the encoder 59B converts an audio signal received from the adding circuit 58O into the AES/EBU format audio signal S17 and supplies the audio signal S17 to the speaker 11 (see FIG. 1). Likewise, the encoder 59C is a circuit that converts a DSP format audio signal into an AES/EBU format audio signal. In reality, the encoder 59C converts an audio signal received from the adding circuit 58P into the AES/EBU format audio signal S18 and supplies the audio signal S18 to the speaker 12 (see FIG. 1).

1-4. Structure of Local Storage

Figure 8:
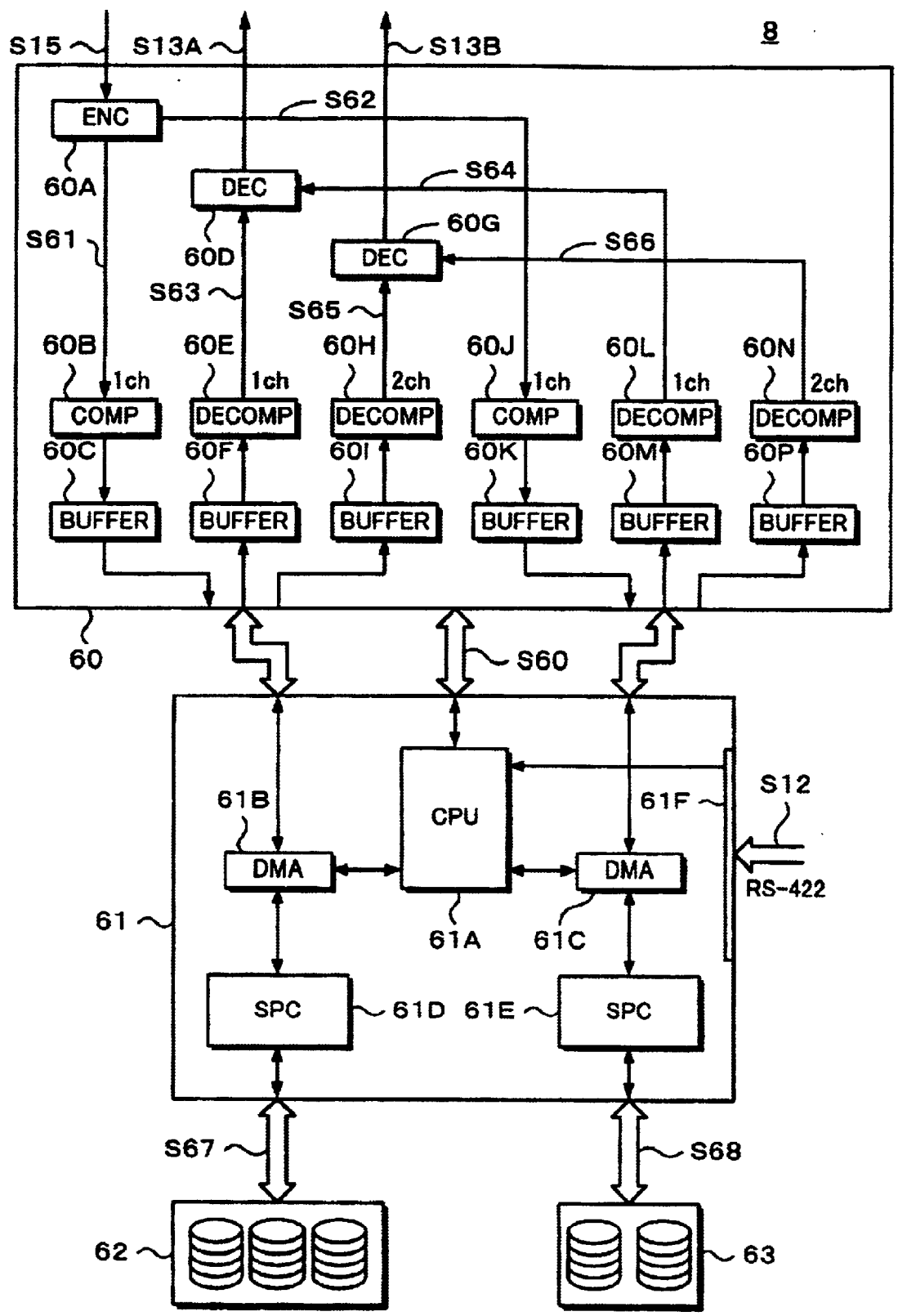
FIG. 8 is a block diagram showing the structure of a local storage connected to the editing apparatus.

Next, the local storage 8 that is a data storing means connected to the editing processing unit 3 will be described. As shown in FIG. 8, the local storage 8 comprises a data input/output block 60, a system controlling block 61, a disk array block 62, and a disk array block 63. The data input/output block 60 is an input/output interface. The system controlling block 61 controls the entire portions of the local storage 8. The disk array block 62 stores video data. The disk array block 63 stores audio data. In FIG. 8, for simplicity, only input/output block and disk array block for one channel are shown. In reality, input/output blocks and disk array blocks for five channels are disposed.

The data input/output block 60 has one input channel and two output channels. The data input/output block 60 performs a predetermined process for the video/audio signal S15 received from the editing processing unit 3 corresponding to a control signal S60 received from the system controlling block 61. In addition, the data input/output block 60 performs a process for data read from the disk array blocks 62 and 63 and outputs the resultant data as the audio signals S13A to S13E.

In reality, the video/audio signal S15 received from the editing processing circuit 3 is supplied to an encoder 60A. The encoder 60A extracts a video signal S61 and an audio signal S62 from the SDI format video/audio signal S15 and supplies the video signal S61 to a video compressing circuit 60B and the audio signal S62 to an audio compressing circuit 60J. The video compressing circuit 60B compresses the video signal S61 with a compression ratio of 1/10 corresponding to the MPEG standard and stores the compressed video data to a buffer memory 60C. Likewise, the audio compressing circuit 60J compresses the audio signal S62 corresponding to a predetermined audio compressing method and stores the compressed audio data to a buffer memory 60K. The video data and the audio data that have been stored in the buffer memories 60C and 60K are successively read under the control of the system controlling block 61, respectively. The video data and the audio data are recorded to the video data disk array block 62 and the audio disk array block 63, respectively.

On the other hand, video data that has been read as the first channel video data is successively stored to a buffer memory 60F under the control of the system controlling block 60F. Likewise, audio data that has been read as the first channel audio data from the disk array block 63 is successively stored to a buffer memory 60M under the control of the system controlling block 61. A first video decompressing circuit 60E reads video data that has been compressed with a compression ratio of 1/10 corresponding to the MPEG standard from the buffer memory 60F, decompresses the video data, and supplies the resultant data as video data S63 to a first decoder 60D. Likewise, a first audio decompressing circuit 60L reads compressed audio data from a buffer memory 60M, decompresses the compressed audio data, and supplies the resultant audio data as audio data S64 to the first decoder 60D. The first decoder 60D superimposes the audio data S64 with the video data S63 corresponding to the SDI format. Thus, the first channel video data read from the disk array block 62 and the first channel audio data read from the disk array block 63 are output as the SDI format video/audio signal S13A.

Likewise, video data read as the second channel video data from the disk array block 62 is successively stored to a buffer memory 60I under the control of the system controlling block 61. In addition, audio data read as the second channel audio data from the disk array block 63 is successively stored to a buffer memory 60P under the control of the system control block 61. A second video decompressing circuit 60H reads video data compressed with a compression ratio of 1/10 corresponding to the MPEG standard from the buffer memory 60I, decompresses the compressed video data, and supplies the decompressed video data as video data S65 to a second decoder 60G. Likewise, a second audio decompressing circuit 60N reads compressed audio data from a buffer memory 60P, decompresses the compressed audio data, and supplies the decompressed audio data as audio data S66 to the second decoder 60G. The second decoder 60G superimposes the audio data S66 with the video data S65 in the SDI format. Thus, the second channel video data read from the disk array block 62 and the second channel audio data read from the disk array block 63 are output as the SDI format video/audio signal S14.

The system controlling block 61 is a block that controls the entire portions of the local storage 8. The system controlling block 61 comprises a CPU 61A, DMA controllers (Direct Memory Access Controllers) 61B and 61C, SCSI protocol controllers 61D and 61E, and an input interface 61F for inputting the control signal S12. The CPU 61A is a controlling circuit for the system controlling block 61. The CPU 61A receives the control signal S12 corresponding to the RS-422 communication protocol from the editing processing unit 3 through the input interface 61F and controls the operations of the DMA controllers 61B and 61C and the SCSI protocol controllers 61D and 61E corresponding to a control command represented by the control signal S12. In addition, the CPU 61A generates the control signal S60 and supplies the control signal S60 to the data input/output block 60 so as to control the operation thereof.

In addition, the CPU 61A manages record addresses of the disk array blocks 62 and 63 along with time codes of data recorded therein so as to easily search record addresses of data corresponding to the time codes. In reality, an internal memory of the CPU 61A stores a video data table that correlates record addresses of frames of video data recorded in the disk array block 62 and all time codes of the frames. Likewise, the internal memory of the CPU 61A stores an audio data table correlates record addresses of frames of audio data recorded in the disk array block 63 and all time codes of the frames. Thus, when a time code is designated, a record address can be easily searched from a relevant table. Thus, video data and audio data can be quickly reproduced.

In record mode, the video data DMA controller 61B reads video data from the buffer memory 60C of the data input/output block 60. In reproduction mode, the video data DMA controller 61B writes video data to the buffer memories 60F and 60I of the data input/output block 60. In record mode, the video data SCSI protocol controller 61D converts a command received from the CPU 61A, a frame of video data received from the DMA controller 61B, and a time code added to the frame of the video data into SCSI format data S67, supplies the data S67 to the disk array block 62, and causes the disk array block 62 to record the video data. In reproduction mode, the SCSI protocol controller 61D receives the SCSI format video data S67 from the disk array block 62, converts the video data S67 into the original format data, and supplies the resultant video data to the DMA controller 61B.

Likewise, in record mode, the audio data DMA controller 61C reads audio data from the buffer memory 60K of the data input/output block 60 corresponding to a command received from the CPU 61. In reproduction mode, the DMA controller 61C writes audio data to the buffer memories 60M and 60P of the data input/output block 60. In record mode, the audio data SCSI protocol controller 61E converts a command received from the CPU 61A, a frame of audio data received from the DMA controller 61C, and a time code added to the frame into SCSI format data S68 and supplies the data S68 to the audio data disk array bock 63 so as to cause the disk array block 63 to record the audio data. In reproduction mode, the SCSI protocol controller 61E receives the SCSI format audio data S68 from the disk array block 63, converts the audio data S68 into the original format audio data, and supplies the resultant audio data to the DMA controller 61C.

The video data disk array block 62 and the audio data disk array block 63 are disc array units that have a plurality of hard disks. The disk array blocks 62 and 63 operate the hard disks in parallel so as to record video data and audio data. The disk array blocks 62 and 63 redundantly record data. Thus, even if any hard disk gets defective, data recorded thereon can be restored (this operation is referred to as restoring operation). A disk array unit that has such a restoring function is referred to as Redundant Array of Inexpensive Disks (RAID).

Figure 9:
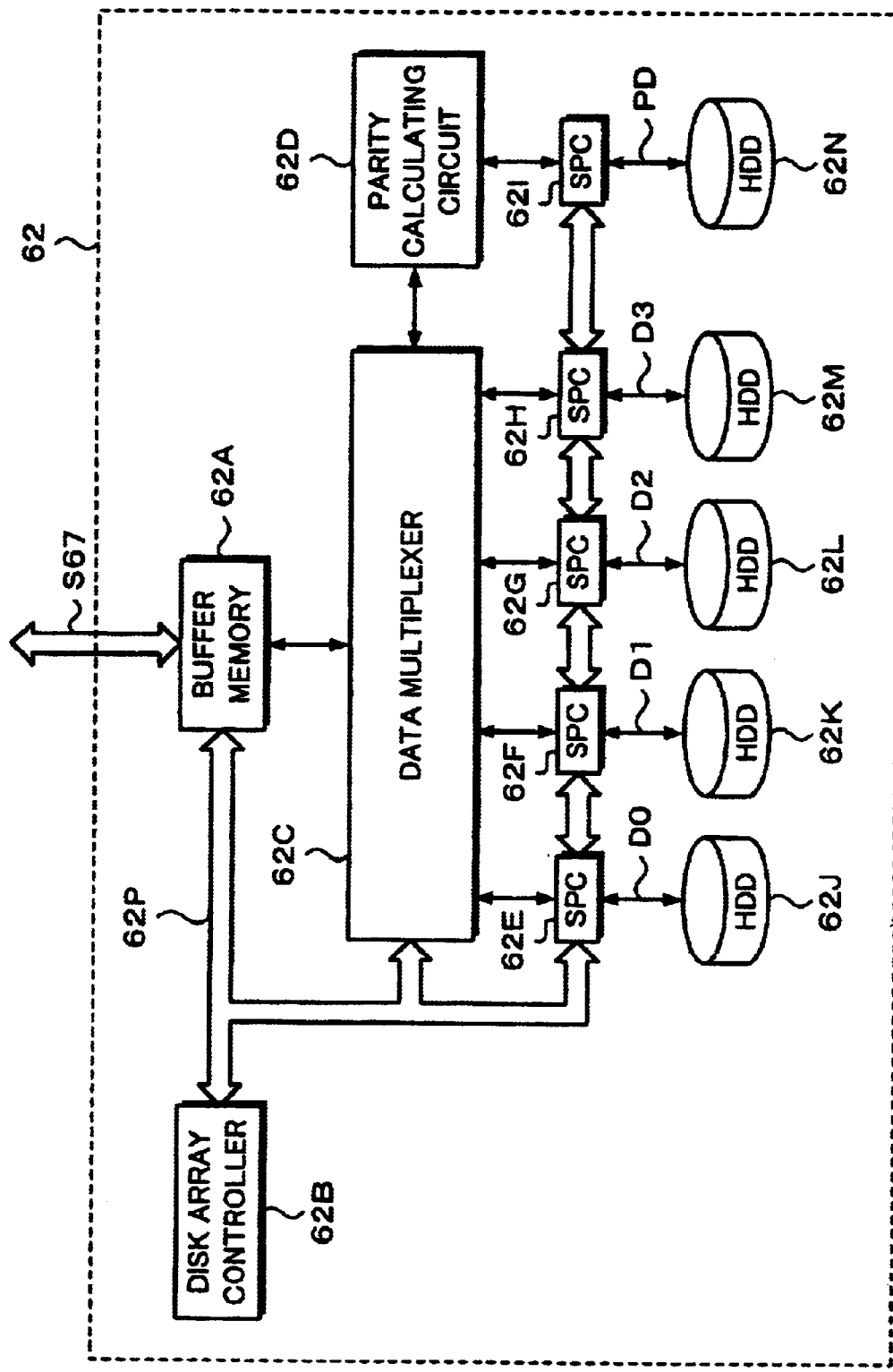
FIG. 9 is a block diagram showing the structure of a disc array block of the local storage.

Next, with reference to the accompanying drawings, the disk array blocks 62 and 63 will be described in reality. Since the structure of the disk array block 62 is the same as the structure of the disk array block 63, for simplicity, only the disk array block 62 will be described. As shown in FIG. 9, the disk array block 62 mainly comprises a buffer memory 62A, a disk array controller 62B, a data multiplexer 62C, a parity calculating circuit 62D, a plurality of SCSI protocol controllers 62E to 62I, and a plurality of hard disks 62J to 62N.

The buffer memory 62A is a memory that temporarily stores data. The buffer memory 62A successively receives the SCSI format data S67 from the system controlling block 61 shown in FIG. 8, and stores the data S67. In reproduction mode, the buffer memory 62A temporarily stores data received from the data multiplexer 62C (that will be described later).

The disk array controller 62B is a circuit that controls the operations of the entire portions of the disk array block 62 (for example, a recording operation and a reproducing operation of the disk array block 62). The disk array controller 62B receives data corresponding to a control command that has been received from the system controlling block 61 from the buffer memory 62A through the command data bus 61 and supplies the command data corresponding to the control command to the data multiplexer 62C, the SCSI protocol controllers 62E to 62I, and the hard disks 62J to 62N through the command data bus 62P so as to control the operations thereof.

In record mode, the data multiplexer 62 reads data to be recorded such as video data, supplies the data to the hard disks 62J to 62M through the SCSI protocol controllers 62E to 62H, and informs the parity calculating circuit 62D of the contents of data supplied to the hard disks 62J to 62M. In reproduction mode, the data multiplexer 62C combines data reproduced from the hard disks 62J to 62M and supplies the combined data to the buffer memory 62A. When data cannot be reproduced from the hard disks 62J to 62M due to a defect thereof, the data is reproduced by a restoring operation corresponding to parity data received from the parity calculating circuit 62D.

In record mode, the parity calculating circuit 62P calculates parity data of data corresponding to the contents of the data supplied by the data multiplexer 62C and supplies the parity data to the hard disk 62N through the SCSI protocol controller 62I. In reproduction mode, if data on the hard disks 62J to 62M cannot be reproduced, the parity calculating circuit 62P supplies the parity data reproduced from the hard disk 62N to the data multiplexer 62C.

In record mode, the SCSI protocol controllers 62E to 62I convert video/audio data received from the data multiplexer 62C or parity data received from the parity calculating circuit 62P into data corresponding to the record format of the hard disks 62J to 62N, and supply the resultant data to the hard disks 62J to 62N. In reproduction mode, the SCSI protocol controllers 62E to 62I convert data reproduced from the hard disks 62J to 62N into SCSI format data and supply the resultant data to the data multiplexer 62C or the parity calculating circuit 62P.

When the SCSI protocol controllers 62E to 62I access the hard disks 62J to 62N and cannot reproduce data therefrom due to a defect thereof, the SCSI protocol controllers 62E to 62I supplies the detected results to the disk array controller 62B so as to restore data.

The hard disks 62J to 62N are data storing means that distributively and parallel record data such as video data. In this example, the four hard disks 62J to 62M distributively store data. However, the number of hard disks is not limited to four. In recoding mode, the hard disks 62J to 62M successively record data received from the SCSI protocol controllers 62E to 62H to predetermined record areas. In reproduction mode, the hard disks 62J to 62M successively read data and supply the data to the SCSI protocol controllers 62E to 62H. Since the plurality of hard disks 62J to 62M are disposed and data is distributively recorded thereto, the disk array block 62 securely records a large amount of data such as video data.

The hard disk 62N is a data storing means that stores parity data calculated corresponding to video/audio data. In record mode, the hard disk 62N successively records parity data received from the SCSI protocol controller 62I to a desired record area. In reproduction mode, parity data is successively read from the hard disk 62N and supplied to the SCSI protocol controller 62I. Thus, since parity data calculated corresponding to video/audio data is recorded to the hard disk 62N other than the hard disks 62J to 62M that record video/audio data, even if video/audio data cannot be reproduced from the hard disks 62J to 62M due to a defect thereof, the video/audio data can be restored corresponding to the parity data.

Next, the theory of data restoring operation will be described. In the following description, it is assumed that video/audio data supplied to the hard disk 62J by the multiplexer 62C is denoted by D0, that video/audio data supplied to the hard disk 62K by the multiplexer 62C is denoted by D1, that video/audio data supplied to the hard disk 62L by the multiplexer 62C is denoted by D2, and that video/audio data supplied to the hard disk 62M by the multiplexer 62C is denoted by D3, and that parity data calculated by the parity calculating circuit 62P is denoted by PD.

The parity calculating circuit 62P has a logical calculating means 70 shown in FIG. 10A. The logical calculating means 70 calculates parity data. The logical calculating means 70 adds the video/audio data D0 supplied to the hard disk 62J, the video/audio data D1 supplied to the hard disk 62K, the video/audio data D2 supplied to the hard disk 62L, and the video/audio data D3 supplied to the hard disk 62M. When the added result is an even value, the logical calculating means 70 outputs parity data PD whose value is "1". When the added result is an odd value, the logical calculating means 70 outputs parity data PD whose value is "0". When the added result is "0", the logical calculating means 70 treats the value of the added result as an even value and thereby outputs parity data PD whose value is "1".

In reality, as shown in FIG. 10B, when all values of the video/audio data D0 to D3 are "0", since the added result becomes "0", the logical calculating means 70 outputs parity data PD whose value is "1". When the values of the video/audio data D0 to D2 are "0" and the value of the video/audio data D3 is "1", since the added result is "1", the logical calculating means 70 outputs parity data PD whose value is "0". Likewise, for other data combinations, parity data PD is output corresponding to a table shown in FIG. 10B. The calculated parity data PD is recorded to the hard disk 62N through the SCSI protocol controller 62I as described above.

In reproduction mode, if the video/audio data D2 cannot be reproduced from the hard disk 62L due to a defect thereof, the disk array controller 62B receives a detected result that represents a disable reproduction from the SCSI protocol controller 62G and causes the data multiplexer 62C to restore video/audio data with parity data. Thus, the data multiplexer 62C supplies the video/audio data D0 reproduced from the hard disk 62J, the video/audio data D1 reproduced from the hard disk 62K, the video/audio data D3 reproduced from the hard disk 62M, and the parity data PD reproduced from the hard disk 62N to the logical calculating means 62C. Thus, the logical calculating means 62C performs calculations so as to restore the video/audio data D2. As with the logical calculating means 70 that calculates the parity data PD, the logical calculating means 71 adds the input video/audio data D0, D1, and D3, and the parity data PD. When the added result is an even value, the logical calculating means 71 outputs restored data D2 whose value "1". When the added result is an odd value, the logical calculating means 71 outputs restored data D2 whose value is "0".

In reality, as shown in FIG. 11A, when the values of the video/audio data D0, D1, and D3 are all "0" and the value of the parity data PD is "1", since the added result is "1", the logical calculating means 71 outputs the restored data D2 whose value is "0". When the values of the video/audio data D0, D1, and the parity data PD are all "0" and the value of the video/audio data D3 is "1", since the added result is "1", the logical calculating means 71 outputs the restored data (D2) whose value is "0". Likewise, for other data combinations, the restored video/audio data (D2) is output corresponding to a table shown in FIG. 11B. As is clear from FIGS. 11B and 10B, the video/audio data D2 that cannot be reproduced due to a defect of the hard disk 62L can be accurately restored.

Thus, in record mode, the disk array block 62 calculates the parity data PD corresponding to the video/audio data D0 to D3 and records the parity data PD to the hard disk 62N. Thus, in reproduction mode, even if the video/audio data D0, D1, D2, or D3 cannot be reproduced due to a defect of the hard disk 62J, 62K, 62L, or 62M, the video/audio data D0, D1, D2, or D3 can be securely restored corresponding to the parity data PD.

2. Structure of Graphical User Interface 2-1. Structure of Viewer Window

Figure 12:
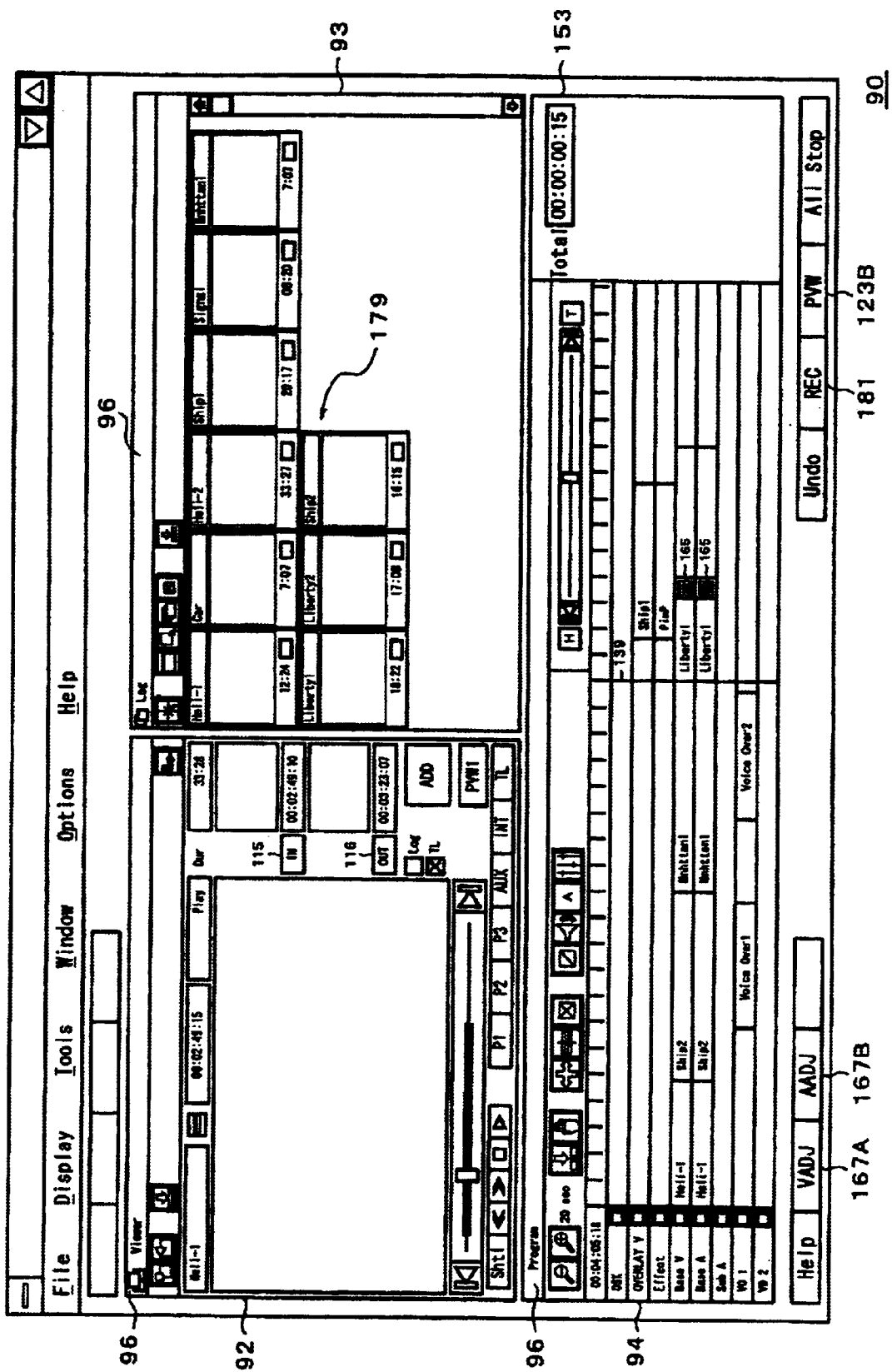
FIG. 12 is a schematic diagram for explaining an editing graphic user interface screen.

In the editing apparatus 1 according to the embodiment, the computer 2 reads the editing application software from the hard disk HDD disposed therein, causes the editing application software to get started, and causes the editing graphical user interface 90 as shown in FIG. 12 to be displayed on the monitor 2B.

The graphical user interface 90 that performs the editing process is composed of three windows that are a viewer window 92, a log window 93, and a program window 94. With the three windows, the editing operator performs an editing process.

On the viewer window 92, while viewing a video image reproduced from a selected source device, the editing operator sets an in-point and an out-point for an edit material reproduced from the selected source device.

On the log window 93, the editing operator registers a clip card (stamp picture) that represents an event generated with an in-point and an out-point he or she has set.

On the program window 94, the editing operator arranges an event with an in-point and an out-point he or she has set on a time line so as to produce a desired program.

As a rough editing method, the editing operator sets an in-point and an out-point on the viewer window 92 so as to generate an event. The editing operator places the generated event as a clip card on the log window 93. By repeating such an operation, clip cards that represent events are displayed on the log window 93.

Next, the editing operator drags and drops desired events from those registered on the log window 93 and arranges the desired events on a time line 95 of the program window 94 so as to produce a program. In addition, the editing operator can set a video effect such as an animation effect or a transition effect to the events arranged on the time line 95.

2-2. Structure of Viewer Window

The viewer window 92 is a window on which the editing operator selects a source device and while viewing a video image reproduced from the selected source device, sets an in-point and an out-point for an edit material reproduced form the source device.

Figure 13:
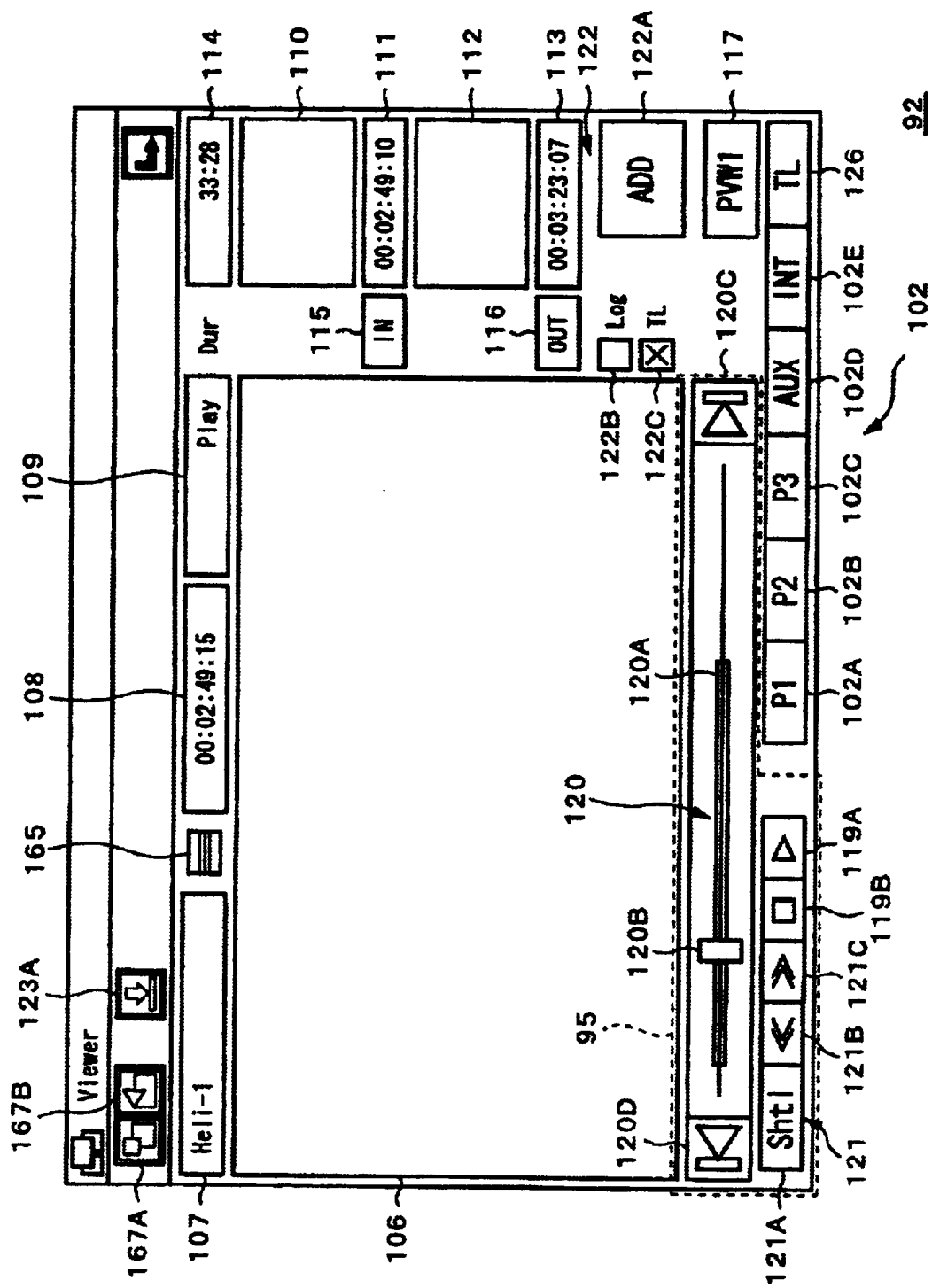
FIG. 13 is a schematic diagram for explaining a viewer window.
Figure 14:
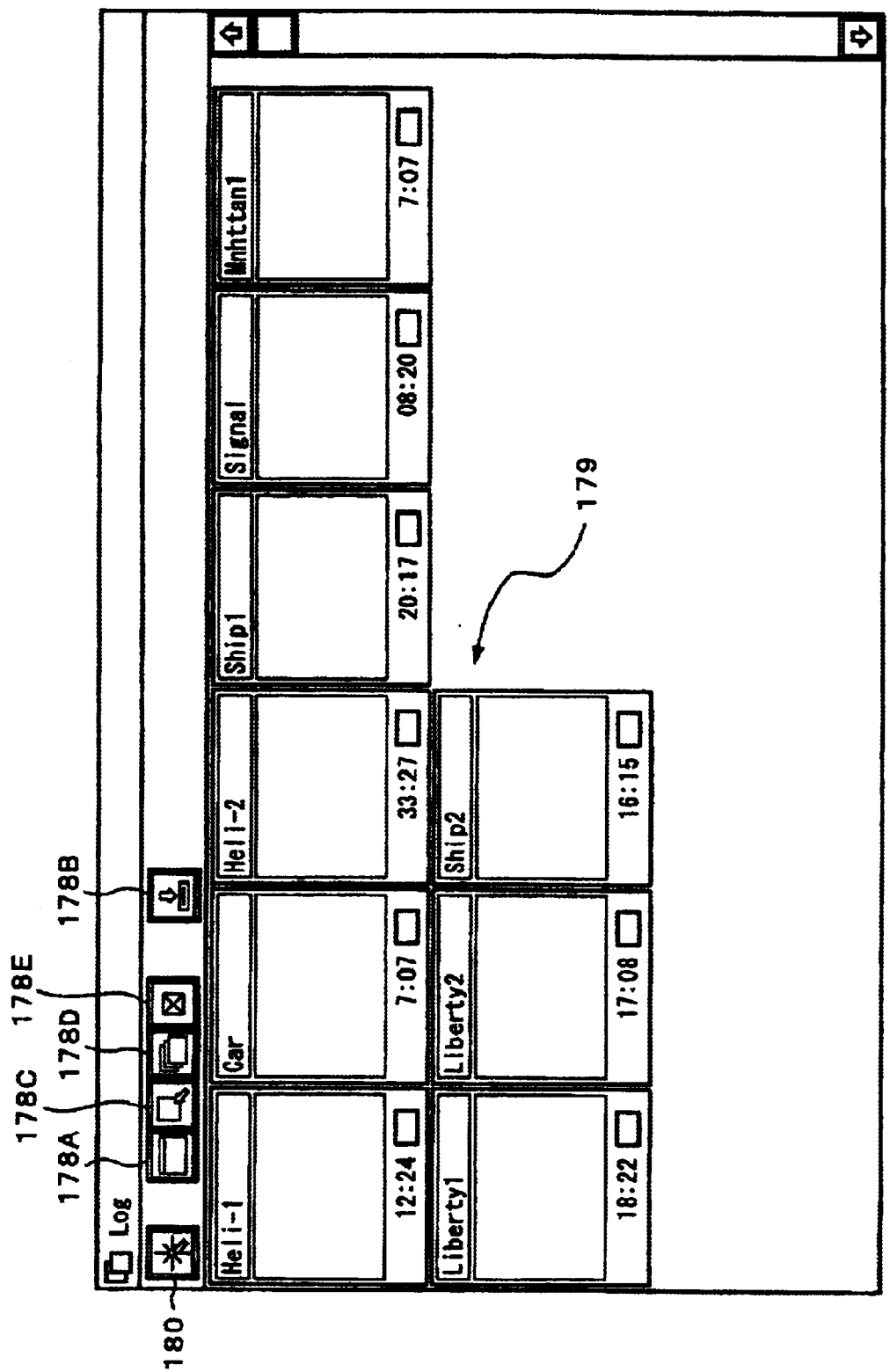
FIG. 14 is a schematic diagram for explaining a log window.

As shown in FIG. 13, the viewer window 92 comprises a viewer 106, a device controlling portion 95, a mark-in button 115, an in-point image displaying portion 110, a mark-out button 116, and an out-point image displaying portion 112. The viewer 106 allows the editing operator to view a video image reproduced from a source device. The device controlling portion 95 allows the editing operator to control the selected source device. The mark-in button 115 allows the editing operator to set an in-point for a material displayed on the viewer window 92. The in-point image displaying portion 110 displays a stamp image at the in-point that the editing operator has clicked the mark-in button 115. The mark-out button 116 allows the editing operator to set an out-point for a material displayed on the viewer window 92. The out-point image displaying portion 112 displays a stamp image at the out-point that the editing operator has clicked the mark-out button 116.

The viewer window 92 further comprises an in-point time code display column 111, an out-point time code display column 113, and a DUR display column 114. The in-point time code display column 111 displays a time code of a stamp image displayed on the in-point image displaying portion 110 (namely, a time code of an in-point of a material). The out-point time code display column 113 displays a time code of a stamp image displayed on the out-point image displaying portion (namely, a time code at an out-point of a material). The DUR display column 114 is a column that displays the duration of an event generated with an in-point and an out-point (namely, a time code calculated corresponding to a time code at an in-point and a time code at an out-point).

The viewer window 92 further comprises source selection buttons 102 (102A to 102E) that allow the editing operator to select a source device from the daily server 6, the VTR 7, the local storage 8, the auxiliary input portion AUX, and the internal input INT. When the editing operator clicks a source selecting button, a relevant source device that is the daily server 6, the VTR 7, the local storage 8, the auxiliary input portion AUX, or the internal input INT is selected.

The auxiliary input portion AUX has a plurality of sources. The name of the input portion that has been selected from the auxiliary input portions (AUX1 to AUXn) is displayed on the source selection button 102D.

The device controlling portion 95 has a slider portion 120 and a jog shuttle portion 121. On the slider portion 120, A slider 120B represents the current position of a file that is being reproduced in the range of a duration displaying portion 120A that represents the length of an event. By sliding the slider 120B to any position of the duration displaying portion 120A with the mouse 2D, the editing operator can search any position of the file. When the editing operator clicks an arrow mark button 120C or 120D, the file is moved by one frame in the backward direction or forward direction, respectively.

The jog shuttle portion 121 has a reproduction button 119A, a still button 119B, a shuttle button 121A, and buttons 121B and 121C. With the reproduction button 119A, the editing operator can designate a normal speed (×1) reproduction mode. With the still button 119B, the editing operator can designate a still reproduction mode. With the shuttle button 121A, the editing operator can designate a shuttle reproduction mode. With the buttons 121B and 121C, the editing operator can vary the search speed of the device in the range from −50 times speed to +50 times speed.

The viewer window 92 further comprises a material name column 107, a time code display column 108, and a status column 109. The material name column 107 displays a selected edit material name. The time code display column 108 displays a time code of a frame of video data displayed on the viewer 106. The status column 109 displays the status of the viewer window 92.

When the editing operator clicks the time code display column 108, the time code display column 108 enters an input mode. When the editing operator inputs a time code of a desired position of a material to the time code display column 108 and clicks an enter key, the desired position of the material can be searched corresponding to the time code.

When the status column 109 displays "OPEN", with the device controlling portion 95, the editing operator can control the selected device.

When the editing operator inputs a reproduction speed value in the status column 109 with ten keys, the device operates in the reproduction mode at the designated reproduction speed. When the editing operator clicks the mark-in button 115 at a desired position of a material that is being reproduced, the in-point is set to the clicked position. In addition, the relevant stamp image and the relevant time code are obtained and displayed on the in-point image displaying portion 110 and the in-point time code display column 111, respectively. When the editing operator clicks the mark out-point 116 at a desired position of the selected material, the out-point is set to the clicked position. At this point, the relevant stamp image and the relevant time code are displayed on the out-point image displaying portion 112 and the out-point time code display column 113, respectively.

In addition, when the editing operator clicks the in-point time code display column 11, it enters a time code input mode. When the editing operator inputs a desired time code value in the in-point time code display column 111 with the ten keys, an image of material data corresponding to the input time code is read as an in-point image and displayed on the in-point image displaying portion 110. Likewise, when the editing operator clicks the out-point time code display column 113, it enters a time code input mode. At this point, when the editing operator inputs a desired time code value in the out-point time code display column 113 with the ten keys, an image of material data corresponding to the input time code is read as an out-point image and displayed on the out-point image displaying portion 112.

The viewer window 92 further comprises a preview button 117, an ADD button 122A, a log button 122B, and a time line button 122C. With the preview button 117, the editing operator can view an edit material that is set with an in-point and an out-point before the edit material is registered as an event. With the ADD button 122A, the editing operator can register a material that is set with an in-point and an out-point as an event on the viewer window 92. With the log button 122B, the editing operator can select a log mode for registering an event as a clip card on the log window 93. With the time line button 122C, the editing operator can select a time line mode for registering an event to the time line 95.

2-3. Structure of Log Window

The log window 93 is a database window on which the editing operator can store an event registered on the viewer window 92 as a clip card 179.

The log window 93 comprises a clip card displaying area, a direct entry button 180, a scene change button 178A, a recall button 178C, a sort button 178D, a delete button 178E, and a download button 178B. The clip card displaying area displays a plurality of clip cards.

The direct entry button 178 is a button with which the editing operator can designate a direct entry mode for automatically arranging clip cards 179 displayed on the log window on the time line. In the direct entry mode, when the editing operator just clicks a clip card 179 displayed on the log window 93 without dragging and dropping it, the clip card 179 is arranged on the time line. The direct entry mode will be described later.

The scene change button 178C is a button with which the editing operator can assign successive click names to events displayed as clip cards 179. When the editing operator clicks the scene change button 178C, a scene name assignment dialog is opened. The scene name assigning method will be described later.

The recall button 178C is a button with which the editing operator can search a clip card 179 corresponding to a click name or the like. When the editing operator clicks the sort button 178D, clip cards 179 are arranged in the descending order or ascending order. When the editing operator clicks the delete button 178E, a clip card 179 displayed on the log window 93 is deleted.

The download button 178B is a button with which the editing operator can download a selected clip card 179 to the local storage 8.

Figure 15A:
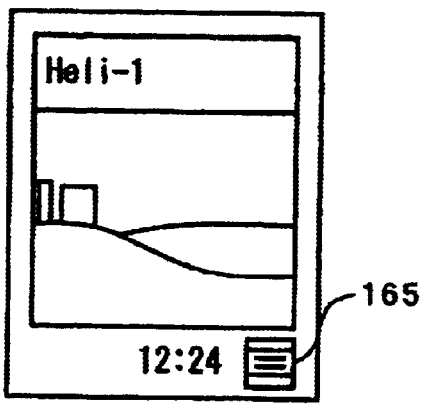
FIGS. 15A–15C are a schematic diagram for explaining a clip card display format on the log window.
Figure 15B:
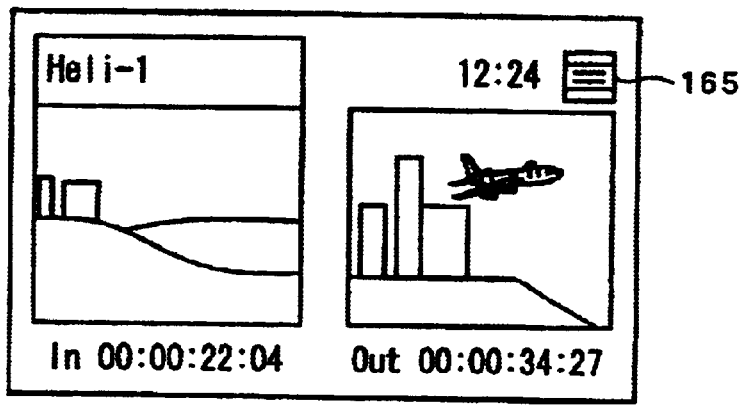
Figure 15C:
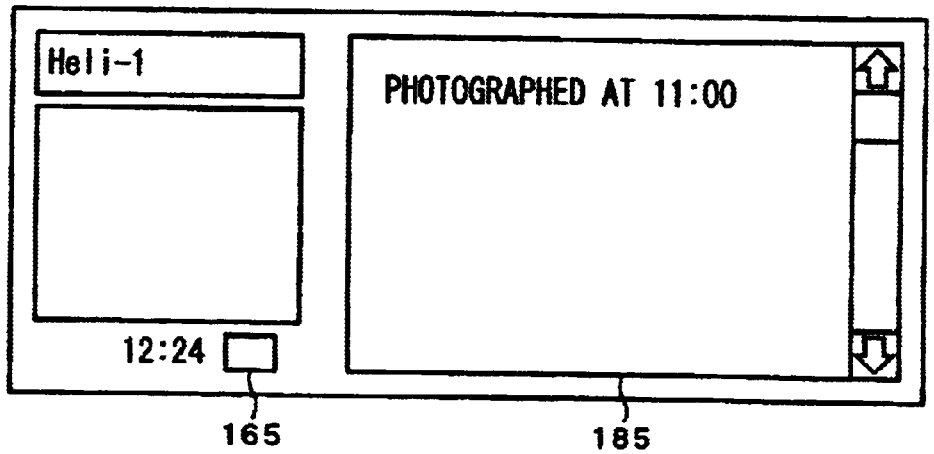

There are three display formats for clip cards 179 displayed on the log window 93 as shown in FIGS. 15A to 15C.

In the first clip card display format shown in FIG. 15A, a clip name, a stamp picture at an in-point, and a duration of an event are displayed. In the second clip card display format shown in FIG. 15B, a clip name, an event duration, a time code at an in-point, a time code at an out-point, a stamp picture at an in-point, and a stamp picture at an out-point are displayed. In the third clip card display format shown in FIG. 15C, a clip name, an event duration, a stamp picture at an in-point, and a text display column that displays a text of information of an event are displayed.

When the editing operator selects a desired format from the three clip card display formats and stores an event as a clip card on the log window 93, the clip card is displayed in the selected clip card display format.

2-4. Structure of Program Window

The program window 94 is a window on which the editing operator can arrange a material that is set with an in-point and an out-point on the viewer window 92 or a clip card 179 displayed on the log window 93 on the time line as an event so as to create a program list (ED).

Figure 16:
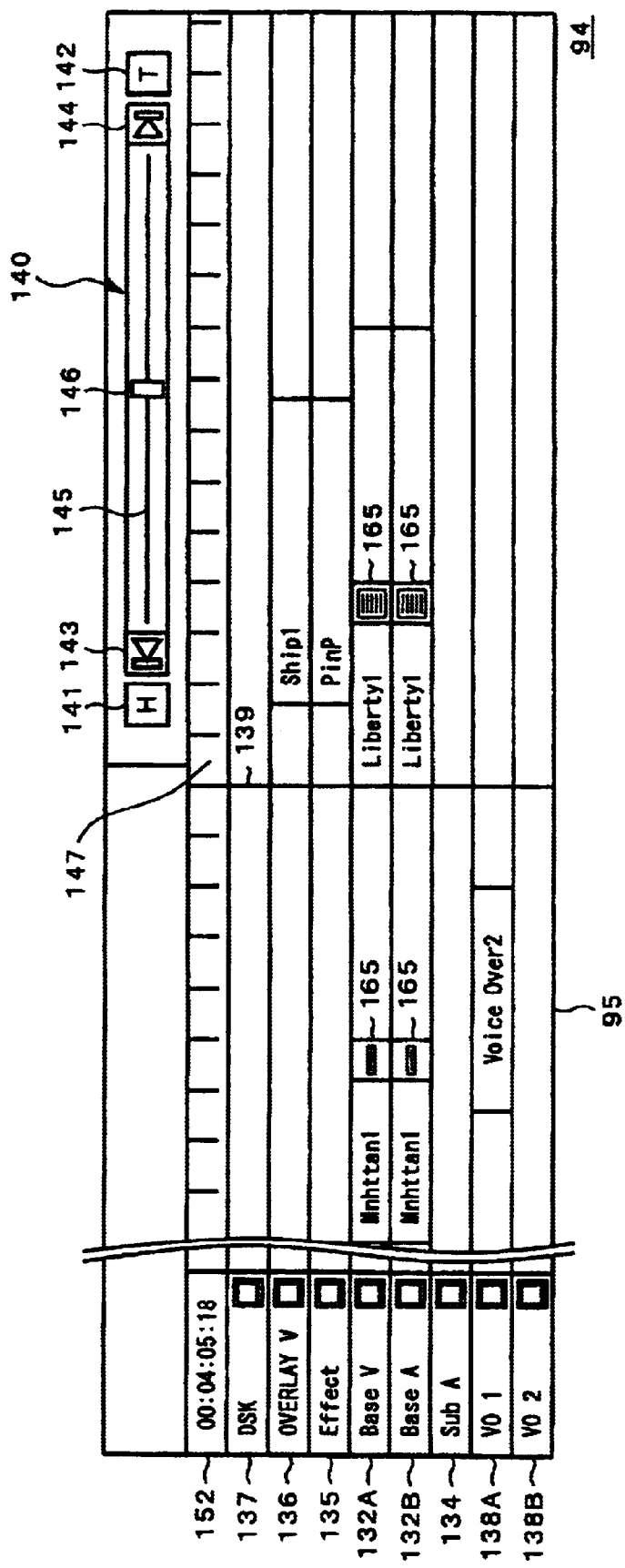
FIG. 16 is a schematic diagram for explaining a program window.
Figure 17:
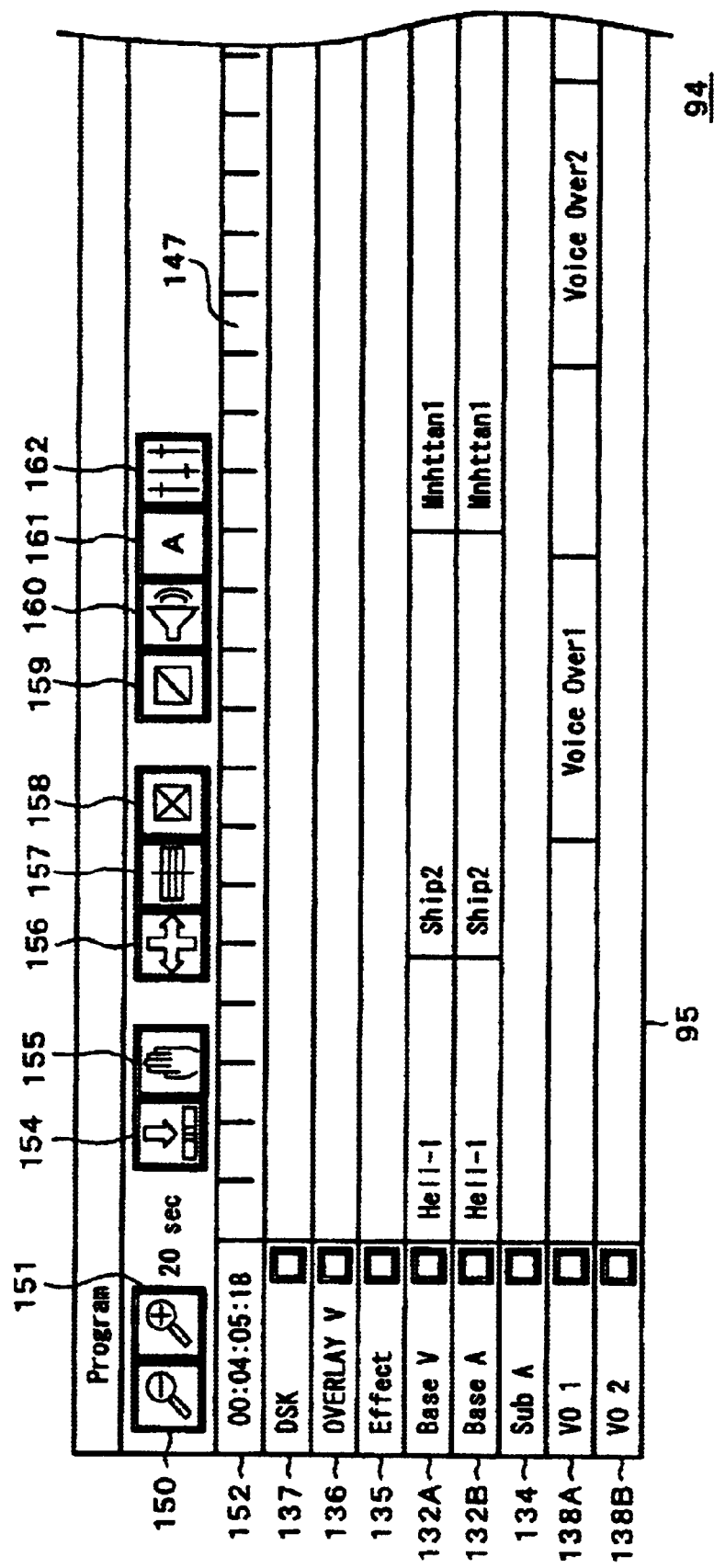
FIG. 17 is a schematic diagram for explaining the program window.
Figure 18A:
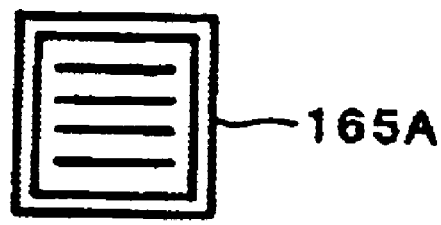
FIGS. 18A–18E are a schematic diagram for explaining a device icon.
Figure 18B:
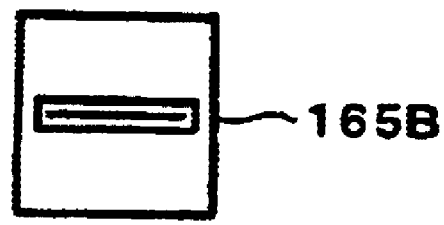
Figure 18C:
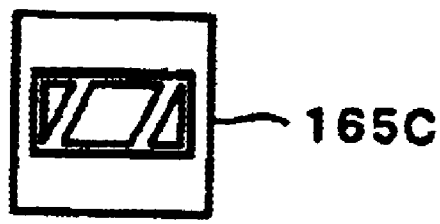
Figure 18D:
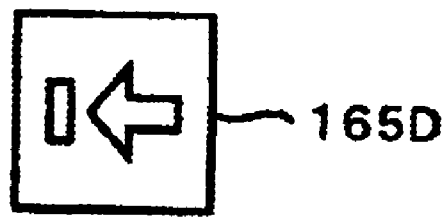
Figure 18E:
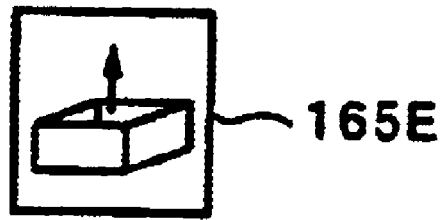

As shown in FIGS. 16 and 17, the program window has a time line 95 composed of a plurality of lines on which video data and audio data can be placed. The time line 95 is composed of a base video line 132A, a base audio line 132B, a sub audio line 134, an effect line 135, an overlay line 136, a DSK line 137, and voice over lines 138A and 138B.

The base video line 132A is a line on which the editing operator can place base video data. The base audio line 132B is a line on which the editing operator can place base audio data corresponding to base video data. The base video line 132A and the base audio line 132B are always linked and their materials are the same.

The overlay line 136 is a line on which the editing operator can set an animation effect process for combining two images (in reality, a video image is overlaid on a base video image). The sub audio line 134 is a line on which the editing operator can designate audio data corresponding to overlay video data placed on the overlay line 136. The overlay line 136 is always linked with the sub audio line 138B and their materials are the same.

The effect line 135 is a line on which the editing operator can set a video effect. The detail of the use of the effect line 135 will be described later.

The DSK line 137 is a line on which the editing operator can set a downstream key for combining a title and a subtitle.

The voice over lines 138A and 138B are lines on which the editing operator can combine base audio data and a voice of an announcer.

Each event and each effect placed on the time line 95 are displayed in different colors. For example, a video event is displayed in blue. An audio event is displayed in yellow. An effect event is displayed in pink. A DSK event is displayed in green.

The time line 95 also has a now line 139 that represents a current time or a current position on the time line. In a preview mode in which the editing operator can preview an event placed on the time line 95, the now line 139 moves on the time line rightward corresponding to a video frame displayed on the viewer window 92.

The now line 139 is always displayed on the time line 95. In normal state, the now line 139 is displayed in gray. In preview mode or reproduction mode, the now line 139 is displaced in red. Since the color of the now line 139 is changed from gray to red in preview mode or reproduction mode, the editing operator can easily know whether or not an image clip at a time code position on the now line 139 is displayed on the viewer window 92.

As shown in FIG. 16, the editing operator can easily place the now line 139 at a desired position on the time line 95 with an input tool 140 displayed at an upper portion of the time line 95. The input tool 140 displayed on the program window 94 comprises a head button 141, a tail button 142, a previous button 143, a next button 144, and a slider 146. With the head button 141, the editing operator can move the now line 139 at the beginning of the time line 95. With the tail button 142, the editing operator can move the now line 139 just after the last event on the time line 95. With the previous button 143, the editing operator can move the now line 139 to an event just before the current event. With the next button 144, the editing operator can move the now line 139 to an event just after the current event. With the slider 146, the editing operator can move the now line 139 to a predetermined position on the time line 95.

The time line 95 also has a count time display column 152 that displays the current position of the now line 139 on the time line 95.

Above the time line 95, a scale line 147 that represents scale gradations corresponding to time codes is disposed. The scale gradations of the scale line 147 can be freely varied corresponding to the length of an event placed on the time line 95 and the length of a program produced on the time line 95.

As shown in FIG. 17, the program window 94 has a zoom out button 150 and a zoom in button 151 that are GUI tools and with which the editing operator can adjust the duration of the time line 95 and the duration of one graduation of the scale line 145. With the zoom out button 150, the editing operator can increase the duration of the time line displayed on the program window 94. With the zoom in button 151, the editing operator can decrease the duration of the time line displayed on the program window 94.

The program window 94 also has a ripple button 154, a manual location button 155, a trim button 156, a match cut button 157, a delete button 158, and a video effect button 159 as input tools.

When the editing operator places a new event in the middle of events arranged on the base line, with the ripple button 154, he or she can designate a re-arrangement process for placing the event as an insertion event on the base line and for moving down the other events on the base line. When the editing operator deletes or moves an event from the base line, with the ripple button 154, he or she can designate the re-arrangement process for moving up the other events on the base line.

When the editing operator sets an animation effect, with the manual location button 155, he or she can set the location of the effect with the mouse 2D in event preview mode or record mode.

With the trim button 156, the editing operator can designate a trim to an event on the time line 95 so as to display the background of the event on the monitor along with the boundary thereof. With the match cut button 157, the editing operator can separate an event into two portions at the position of the now line 139.

With the delete button 158, the editing operator can delete an event. With the video effect button 159, the editing operator can open a dialog for allowing the editing operator can set an effect at a change point of an image or set an effect to an image.

The program window 94 also has an audio fade button 160, a DSK button 161, and a mix down button 162. With the audio fade button 160, the editing operator can set a fade in effect or a fade out effect to an audio event placed on the sub audio line 134 or the voice over line 138. With the DSK button 161, the editing operator can open a dialog for setting a DSK. With the mix down button 162, the editing operator can open a dialog for routing audio events on the time line to four channel outputs.

2-5. Device Icon

In the editing apparatus according to the embodiment, a device icon 165 that represents a material and an event to be edited are supplied from what source device is displayed on the viewer window 92, the log window 93, and the program window 94.

The device icon 165 is one of five types of device icons as shown in FIGS. 18A to 18E. When a source device of a material to be edited is the daily server 6, a server icon 165A is displayed. When a source device of a material to be edited is the local storage 8, a local storage icon 165B is displayed. When a source device of a material to be edited is the VTR 7, a VTR icon 165C is displayed. When a source device of a material to be edited is the auxiliary input portion AUX, an AUX icon 165D is displayed. When a source device of a material to be edited is a signal generating unit of the editing apparatus, an INT icon 126 is displayed.

On the viewer window 92, as shown in FIG. 13, the device icon 165 is displayed at an upper portion of the viewer 106. The device icon 165 represents that an image displayed on the viewer 106 is supplied from what source device. In other words, since the device icon 165 is displayed on the viewer window 92 along with an event image, the editing operator can easily know that an image displayed on the viewer window 92 is supplied from what source device.

As shown in FIG. 18, the device icon 165 is displayed for each clip card 179 on the log window 93 so that an event corresponding to the clip card 179 is produced by what source device. In other words, since the device icon 165 is displayed for each clip card 179, the editing operator can easily know an event corresponding to each clip card 179 is produced by what source device.

As shown in FIG. 16, the device icon 165 is displayed for each event on the program window 94 so that each event is produced by what source device. Since the device icon 165 is displayed for each event on the time line, the editing operator can easily know that each event is produced from an image of what source device.

When the editing operator produces an edit program, he or she should know the source device of each event due to the following reason. The local storage 8 in the editing apparatus according to the embodiment uses a random access type record medium. In addition, the local storage 8 can reproduce video data and audio data on multiple channels on real time basis, the local storage 8 can perform an effect setting process and a program producing process without any restriction.

However, as with the VTR 7 that is a record medium that cannot be randomly accessed, it requires tape rewinding time to cue up. Thus, such a record medium has several restrictions to perform the effect setting process and the program producing process. Consequently, a program of which two or more events produced from materials on a tape of the VTR 7 are closely arranged on the time line cannot be produced. Likewise, a program of which two or more events produced from materials on a tape of the VTR 7 are arranged at the same position on the base video line and the overlay video line cannot be produced.

Although the effect setting process and the program producing process for a material produced from the server are lesser restricted than those of the VTR, since the access performance of the server is inferior to that of the local storage 8 and the server is disposed apart from the editing processing unit, a video signal is received with a delay. Thus, when several effects are set, they have restrictions.

Thus, when the editing operator produces a program, he or she should consider individual events are produced by what source devices.

Since a device icon is added to each event, the editing operator can easily know by what source device the even is produced. Thus, when the editing operator sets an effect to an event, he or she can easily know the source device of the event is the VTR 7, the daily server 6, or the local storage 8. For example, when a source device of an event to which an effect is added is the VTR 7 and a source device of an adjacent event on the time line is also the VTR 7, the editing operator can cause the editing apparatus to download one of the events from the VTR 7 to the local storage 8. In other words, the editing operator can more securely perform the editing operation for materials.

3. File Manager

In the editing apparatus according to the embodiment, various types of data such as a material downloaded to the local storage 8, a final video program, a program list and a log clip stored in a hard disk HDD of the computer 2 are managed by a file manager. In other words, a registered event is managed as one file by the file manager.

The file manager manages individual files in designated folders. For example, a log file is stored in a log folder. A program list (EDL) file is stored in a program list folder. A material file is stored in a material folder. An edited master file for storing data of a final video program (edited master) is stored in an edited master folder.

All files managed by the file manager have file information as shown in FIG. 19. The file information is composed of a file name 331, an event name 332, an in-point time code 335, an in-point clip address 334, an out-point time code 335, an out-point clip address 336, a duration 337, file type information 338, file position information 339, source device ID information 340, produced date and time 341, video adjustment information 342, audio adjustment information 343, text data 344, a program list name 345, and so forth.

The file name 331 is data that represents that the current event is produced from a material with what file name. As the file name 331, a source file name is registered. When the source device is the local storage 8 or the server 6, a source file name is registered. When the source device is the VTR 7, a reel name of a tape cassette is registered.

The event name 332 is a name that the editing operator can freely assign. The event name is the same as the clip name. A name added to a clip displayed on the log window 93 is referred to as clip name. A name added to an event displayed on the time line window 95 is referred to as event name.

The in-point clip address 334 and the out-point clip address 336 represent addresses on a hard disk HDD of the computer 2 corresponding to an in-point and an out-point, respectively.

The file type information 338 is information that represents whether the current file is a log clip file, a program list file, or a final program file (that has been registered to the local storage). "Log" represents that the current file is a log clip. "EDL" represents that the current file is a program list. "Material" represents that the current file is a material downloaded to the local storage. "Master" represents a final program recorded to the local storage.

The file position information 339 is data that represents whether the current file is a data file recorded on a hard disk HDD of the computer 2 or a material file stored in the local storage 8. "C" represents a data file stored in the computer. "L" represents a material file stored in the local storage.

The source device information is information that represents a material represented by the file information is recorded in what source device. "S" represents that the source device is the server 6. "L" represents that the source device is the local storage. "V" represents that the source device is the VTR 7. "A" represents that the source device is an AUX (auxiliary) material. "I" represents an internal material.

4. Operation of Editing Process 4-1. Event Producing Process

Figure 20:
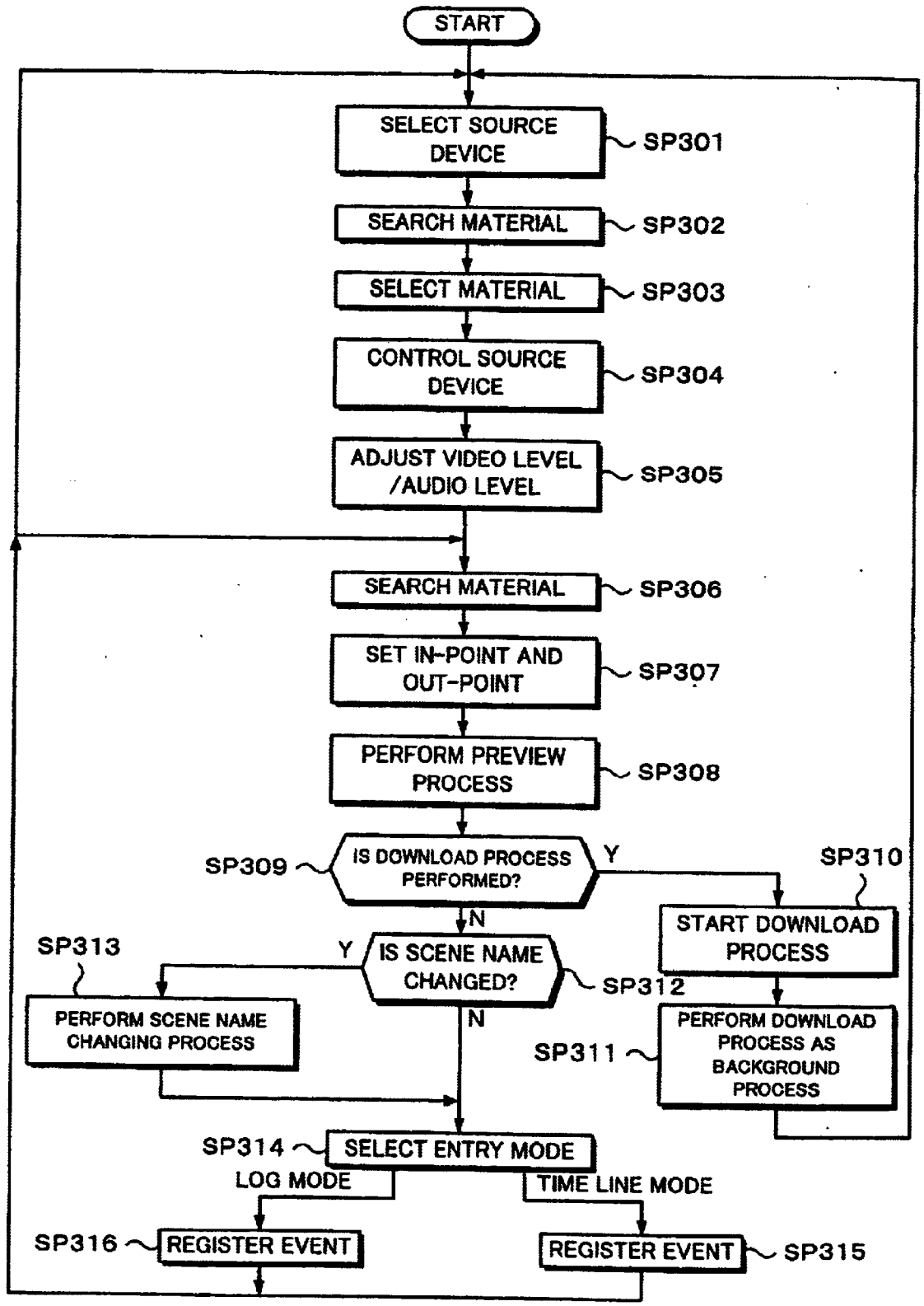
FIG. 20 is a flow chart for explaining the operation of an event registering process.

With reference to a flow chart shown in FIG. 20, the event producing process that is the first process of the editing process will be described. In the following description, "the operation of the editing operator" represents a clipping operation, a dragging operation, and a dropping operation of a pointing device such as the mouse 2D at a particular portion of a graphic image displayed on the monitor 2B or direct operations of the keyboard 2c, the mouse 2D, the dedicated controllers 4 and 5, and so forth.

At step SP301, the CPU 21 of the computer 1 selects a source device to be controlled corresponding to the operation of the editing operator. In reality, when the editing operator clicks one of the source selection buttons 102A to 102E as a GUI image on the viewer window 92 displayed on the monitor 2B, the CPU 21 decides a source device corresponding to the clicked button. For example, when the editing operator clicks the source selection button 102A, the CPU 21 determines that the daily server 6 is selected as a source device. When the editing operator clicks the source selection button 102, the CPU 21 determines that the VTR 7 is selected as a source device. When the editing operator clicks the source selection button 102C, the CPU 21 determines that the local storage 8 is selected as a source device.

Figure 21:
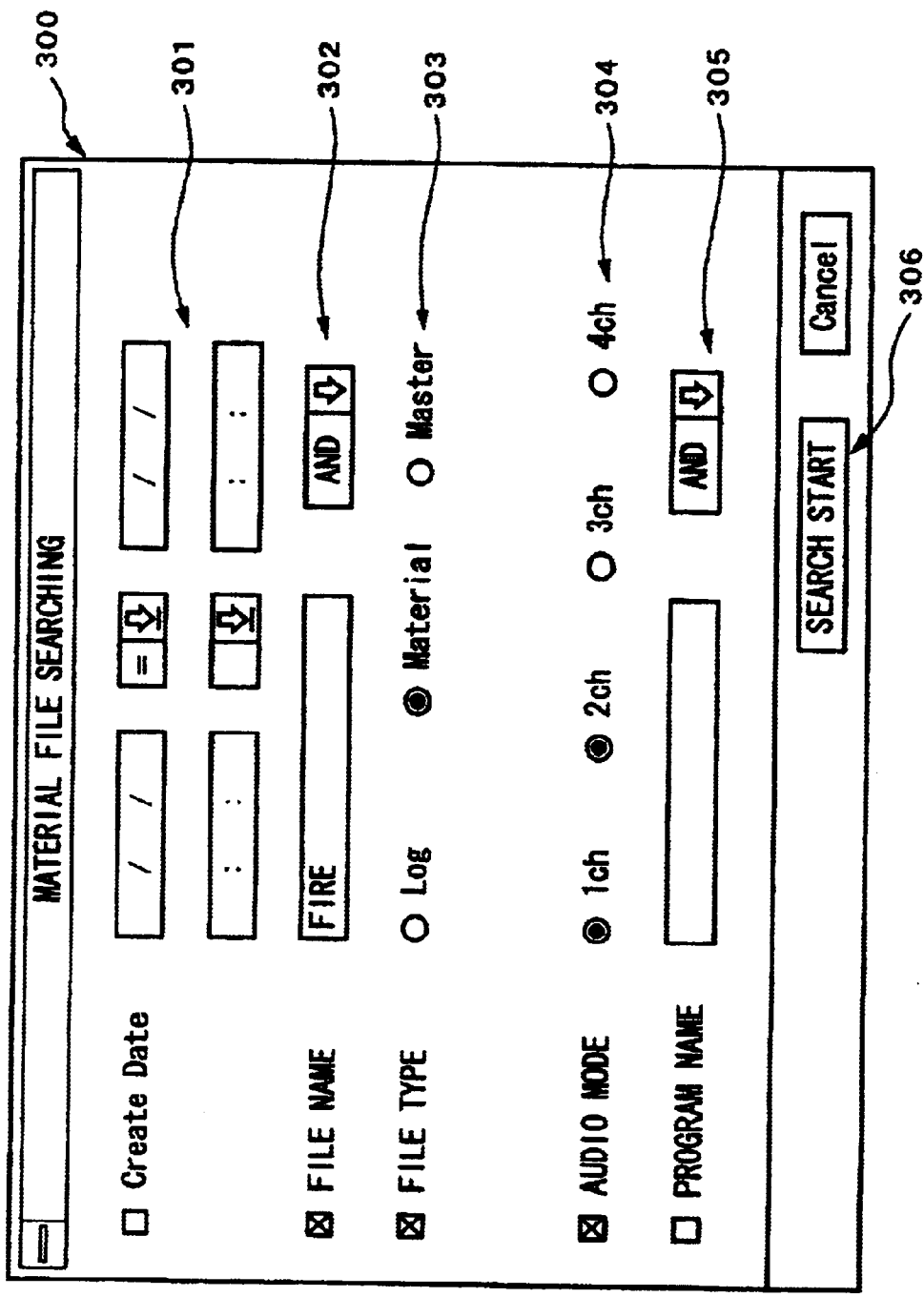
FIG. 21 is a schematic diagram for explaining a file searching dialog.

AT step SP302, the CPU 21 searches a material file registered to the source device selected at step SP301 corresponding to the operation of the editing operator. In reality, a material searching dialog 300 as shown in FIG. 21 is displayed on the monitor 2B of the computer 1. The dialog 300 has input items that are a produced date and time input column 301, a file name input column 302, a file type input column 303, an audio mode selection column 304, a program name input column 305, and a search start button 306. For example, when the editing operator inputs a key word "FIRE" in the file name input column 302, only files with a file name containing characters "FIRE" can be searched. When the editing operator inputs desired data in each column of the dialog 300, search conditions are set. Thereafter, when the editing operator clicks the search start button 306, the CPU 21 executes a searching process for searching files registered in the source device corresponding to the conditions that are set on the dialog 300.

The CPU 21 references file information stored in the RAM 21B and searches files corresponding to the conditions that are set on the dialog 300. The CPU 21 causes the searched result as a file list 310 shown in FIG. 22 to be displayed.

At step SP303, the CPU 21 selects a desired file from the file list as the searched result at step SP302 corresponding to the operation of the editing operator. In reality, when the editing operator clicks a desired file name from the file list 310, the CPU 21 selects the file designated by the editing operator.

At step SP304, the CPU 21 controls the selected source device and the editing apparatus 3 so as to reproduce video data and audio data from the selected file, display the reproduced video data on the viewer window 92, and output the reproduced audio data to the speakers 11 and 12. Next, the case that a file recorded in the daily server 6 is reproduced will be described as an example.

First of all, the CPU 21 supplies a control signal to the daily server 6 through the LAN 10 so as to reproduce the field selected at step SP303 from the daily server 6. The daily server 6 supplies video data and audio data contained in the selected file as the SDI format digital signal S7 to the editing processing unit 3 corresponding to the control signal. The supplied digital signal S7 is input to the input terminal IN1 of the matrix switcher portion 3B of the editing processing unit 3.

The CPU 21 controls the matrix switcher portion 3B through the system controlling portion 3A of the editing processing unit 3 so as to cause a cross point P19 that connects the input terminal IN1 and the output terminal OUT9 to be active. Thus, the SDI format digital signal S7 supplied to the input terminal IN1 is output as the SDI format digital video signal S26 from the output terminal OUT9 and then supplied to the image processing portion 3C.

The SDI format digital video signal S26 that is output from the output terminal OUT9 is supplied to the digital multiplexer 51D of the image processing portion 3C. The demultiplexer 51D extracts a digital video signal from a payload portion of the SDI format data. The extracted digital video signal is output as the output video signal S31 through the switcher block 52, the special effect block 53, and the mixer block 54.

The digital video signal S31 that is output from the image processing portion 3C is supplied to the input terminal IN9 of the matrix switcher portion 3B. The CPU 21 controls the matrix switcher portion 3B through the system controlling portion 3A of the editing processing portion 3 so as to cause a cross point P95 that connects the input terminal IN9 and the output terminal OUT5 to be active. Thus, the digital video signal S31 supplied to the input terminal IN9 is output as the digital video signal S2 from the output terminal OUT5 to the computer 2 through the output processor 46.

The digital video signal S2 that is output from the editing processing unit 3 is supplied to the video processor 22 of the computer 2 and displayed on the viewer window 92 of the computer monitor 2B through the display controller 23.

On the other hand, the CPU 21 controls the matrix switcher portion 3B through the system controlling portion 3A of the editing processing unit 3 so as to supply the SDI format digital signal S7 from the input terminal IN1 to the audio processing portion 3D. In other words, the CPU 2 controls the matrix switcher 3B through the system controlling portion 3A of the editing processing unit 3 so as to cause a cross point P111 that connects the input terminal IN1 and the output terminal OUT11 to be active. Thus, the SDI format digital signal S7 supplied to the input terminal IN1 is output as the digital output signal S28 from both the output terminal OUT9 and the output terminal 11 to the audio processing portion 3D.

A payload portion of the SDI format digital output signal S28 is superimposed with video data. An auxiliary data portion is superimposed with audio data. Thus, the separator 56A of the audio processing portion 3D separates only audio data from the SDI format digital signal S28. The CPU 21 controls the audio processing portion 3D through the system controlling portion 3A of the editing processing portion 3 so as to supply the separated audio signal S48 as the output audio signals S17 and S18 to the speakers 11 and 12 through the mixer block 57.

Figure 23:
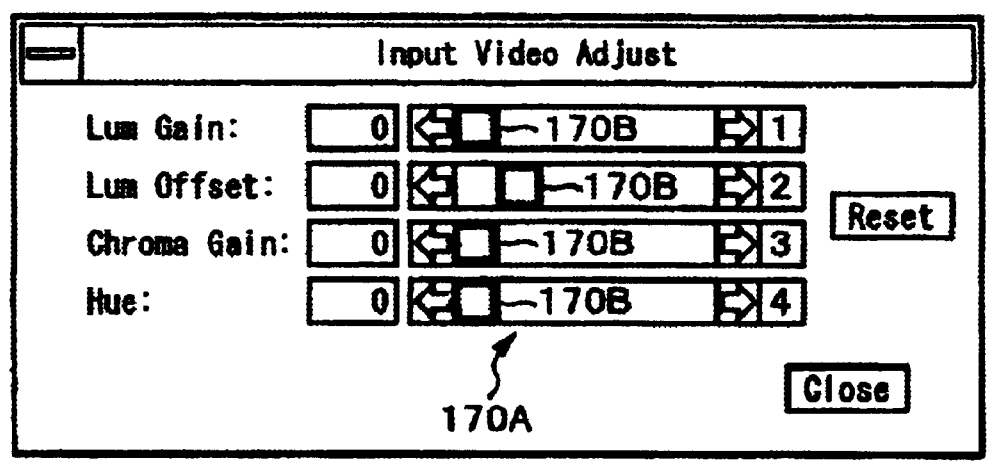
FIG. 23 is a schematic diagram for explaining a video level setting dialog.

At step SP305, the CPU 21 of the computer adjusts video data and audio data reproduced from the selected source device corresponding to the operation of the editing operator. In reality, when the editing operator clicks a video adjust key 167A on the viewer window 92, the CPU 21 of the computer 2 displays a video level setting dialog 170 shown in FIG. 23 on the monitor 2B. The editing operator can move a slider portion 170 with the mouse 2D so as to set desired levels of luminance, chroma, and so forth.

The CPU 21 of the computer 2 stores each level that is set as video adjustment information of file information on the video level setting dialog 170 through the system controlling portion 3A. In addition, the CPU 21 controls the video signal processing circuits 52E and 52F of the image processing portion 3C so that the levels of the luminance and chroma of video data reproduced from the selected source device match the levels of the luminance and the chroma that are set on the video level setting dialog 170.

The video level adjusting process is a process performed only when the editing operator clicks the video adjust key 167A. When the video level adjusting process is not performed, the video signal is adjusted with predetermined default values of the reference luminance level and the reference chroma level.

Figure 24:
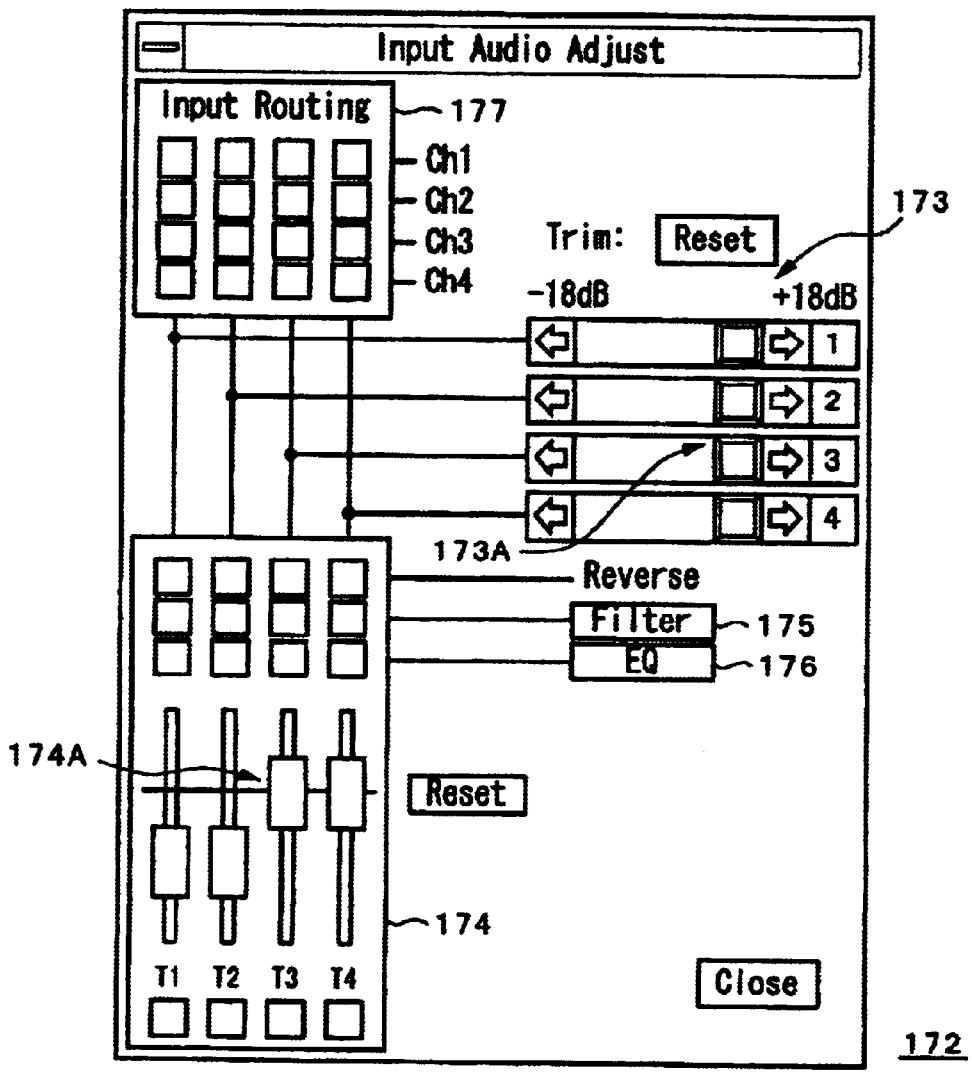
FIG. 24 is a schematic diagram for explaining an audio level setting dialog.

On the other hand, when the editing operator clicks the audio adjust key 167A on the viewer window 92, the CPU 21 of the computer 2 displays an audio/video level setting dialog 172 shown in FIG. 24 on the monitor 2B. The editing operator can move a slider 173A and a fader 174A with the mouse 2D so as to set desired audio input/output levels.

The CPU 21 of the computer 2 stores the audio levels that are set on the audio/video level setting dialog as audio adjustment information of file information through the system controlling portion 3A. In addition, the CPU 21 controls the mixer block 57 of the audio processing portion 3D so that the input/output levels of the audio data reproduced from the selected source device become input/output levels of audio data that are set on the audio level setting dialog 172.

The above-described audio level adjusting process is a process performed only when the editing operator clicks the audio adjust key 167B. When such an audio level adjusting process is not performed, the audio signal is adjusted with default values that are preset as reference input/output levels of audio data.

At step SP306, the CPU 21 searches a video material recorded in the selected source file corresponding to the operation of the editing operator. In reality, when the editing operator operates the device controlling portion 96 of the viewer window 92, the CPU 21 of the computer 2 controls the reproducing operation of the selected source device corresponding to the operation of the editing operator. Thus, video data is displayed at the speed that is set by the editing operator on the viewer 106 of the viewer window 92.

At step SP307, the CPU 21 sets an in-point and an out-point corresponding to the operation of the editing operator. In reality, in the case that a video image of the selected file is displayed as a moving picture on the viewer 106 in the searching process at step SP306, when the editing operator searches a desired video frame, the desired video frame is displayed on the viewer 106 of the viewer window 92. At this point, when the editing operator clicks the mark-in button 115 on the viewer window 92, the in-point is set. When the editing operator clicks the mark-in button 115, the CPU 21 displays video data on the viewer 106 as a clip picture (stamp picture) on the in-point image displaying portion 110. In addition, the CPU 21 recognizes a time code added to the video frame with the in-point as a time code at the in-point.

After setting the in-point, when the editing operator searches a desired video frame as with step SP306, the desired video frame is displayed on the viewer 106 of the viewer window 92. At the time, when the editing operator clicks the mark-out button 116, an out-point is set. When the editing operator clicks the mark-out button 116, the CPU 21 displays video data on the viewer 106 as a clip picture (stamp picture) on the out-point image displaying portion 112. In addition, the CPU 21 recognizes a time code added to the video frame with the out-point as a time code at the out-point.

When the out-point is set, the CPU 21 calculates the duration between the in-point and the out-point corresponding to the time code at the in-point and the time code at the out-point and displays the calculated duration on the DUR display column 114 of the viewer window 92.

At step SP308, the CPU 21 performs a preview process in the duration between the in-point and the out-point that are set at step SP307 corresponding to the operation of the editing operator. In reality, when the editing operator clicks the preview button 117 on the preview window 92, the CPU 21 controls the relevant source device (the daily server 6, the local storage 8, or the VTR 7) through the system controlling portion 3A of the editing controlling unit 3 so as to reproduce video frames from a point several seconds prior to the in-point to the out-point.

The preview process performed in the editing system according to the present invention is a process performed assuming that an event produced in the process at step SP307 is registered to the position of the now line 139. In the preview process, data is reproduced from a point several seconds prior to the in-point (for example, five seconds prior to the in-point), not from the in-point.

In other words, in the preview process, an event is virtually registered on the time line. The event is reproduced several seconds prior to the in-point. Thus, before an event is actually registered on the time line, the editing operator can virtually know the connection between a new event and the preceding event.

After previewing a material, if the editing operator does not like the material and the in-point and the out-points thereof, he or she can repeat the process from step SP301 or SP306.

The process at step SP308 is not a mandatory process. Instead, the process at step SP380 is performed only when the editing operator clicks the preview button 117.

Figure 25:
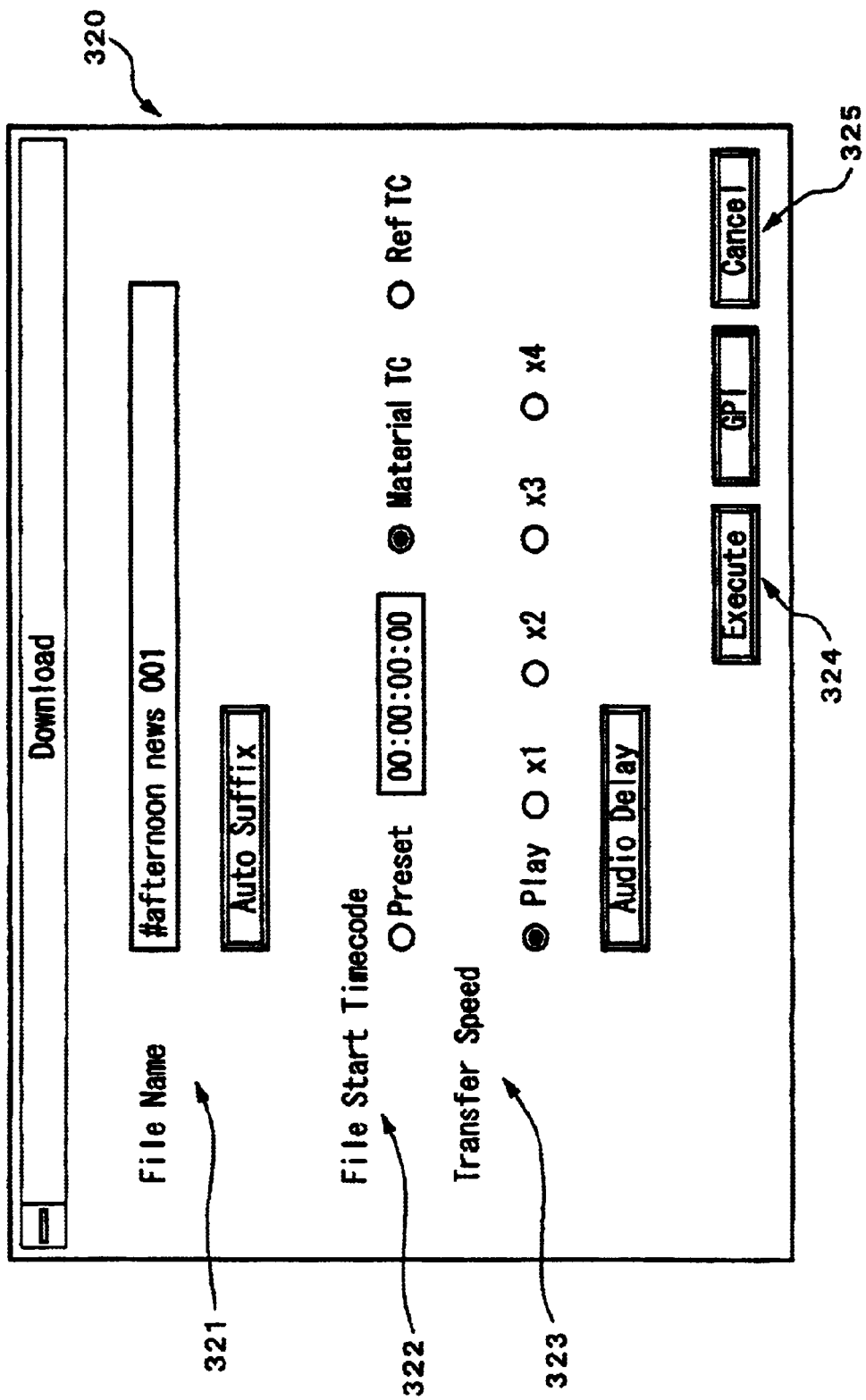
FIG. 25 is a schematic diagram for explaining a download setting dialog.

At step SP309, the CPU 21 of the computer 2 determines whether or not a process for downloading a material stored in the daily server 6 or the VTR 7 to the local storage 8 is designated corresponding to the operation of the editing operator. In reality, when the editing operator clicks the download button 123A on the viewer window 92, the CPU 21 determines that the download process is designated. The download process is a process performed only when the daily server 6 or the VTR 7 is designated as a source device at step SP301. When the editing operator designates the download process, the CPU 21 opens a download process setting dialog as shown in FIG. 25. Thereafter, the flow advances to step SP310. On the other hand, when the editing operator does not designate the download process, the flow advances to sep SP312.

At step SP310, the CPU 21 starts the download process corresponding to the operation of the editing operator. In reality, before the CPU 21 starts the download process, the editing operator inputs data necessary for the download process on the download process setting dialog 320. A file name input portion 321 is a setting column on which the editing operator assigns a new file name to a file that is downloaded to the local storage. A start time code setting portion 322 is a setting column on which the editing operator sets a start time code of a file that is downloaded to the local storage. A transfer speed setting column 323 is a setting column on which the editing operator sets a transfer speed of a file transferred from a selected source device to the local storage.

When the editing operator inputs necessary data on the download process setting dialog 320 and clicks the execute button 324, the CPU 21 controls the source device and the editing controlling unit 3 so as to download video data in the range from the in-point to the out-point of the designated file to the local storage 8. Next, the operations of the CPU 21 of the computer 2 and the editing controlling unit 3 in the case that video data and audio data in the range from an in-point to an out-point of a file recorded in the daily server 6 are downloaded to the local storage 8 will be described.

First of all, the daily server 6 starts reproducing video data and audio data from the in-point of the designated file and supplies the reproduced video signal and audio signal as the SDI format digital signal S7 to the editing processing unit 3. The supplied digital signal S7 is input to the input terminal IN1 of the matrix switcher portion 3B of the editing processing unit 3.

Since the digital signal S7 reproduced from the daily server 6 is downloaded to the local storage 8, the CPU 21 controls the matrix switcher portion 3B through the system controlling portion 3A of the editing processing unit 3 so as to cause a cross point P11 that connects the input terminal IN1 and the output terminal OUT1 to be active. Thus, the SDI format digital signal S7 supplied to the input terminal IN1 is output as the SDI format digital signal S15 to the output terminal OUT1 through the output processor 43.

The local storage 8 records the digital signal S15 received from the editing processing unit 3 to a proper record medium corresponding to RAID algorithm. Thus, video/audio data recorded to the daily server 6 is downloaded to the local storage 8.

In the download process, to display a video signal downloaded to the local storage on the viewer window 92, the CPU 21 causes the cross point P19 of the matrix switcher portion 3B to be active through the system controlling portion 3A of the editing processing unit 3 so that the SDI format digital signal S7 supplied to the input terminal IN1 is output to the output terminal 9. Thus, the SDI format digital signal S7 supplied to the input terminal IN1 is downloaded to the local storage through the output terminal S15. In addition, the SDI format digital signal S7 is supplied as the SDI format digital video signal S26 to the image processing portion 3C through the output terminal OUT9.

The SDI format digital video signal that is output from the output terminal OUT9 is supplied as the output video signal S31 to the input terminal IN9 of the matrix switcher portion 3B through the image processing portion 3C. The CPU 21 controls the matrix switcher portion 3B through the system controlling portion 3A of the editing processing unit 3 so as to cause the cross point P95 that connects the input terminal IN9 and the output terminal OUT5 to be active. Thus, the digital video signal S31 supplied to the input terminal IN9 is output as the digital video signal S2 from the output terminal OUT5 to the computer 2 through the output processor 46.

The digital video signal S2 that is output from the editing processing unit 3 is supplied to the video processor 22 of the computer 2 and displayed on the viewer window 92 of the computer monitor 2B through the display controller 23.

In other words, video data reproduced from the daily server 6 is downloaded to the local storage 8. In addition, the video data is displayed on the viewer window 92 of the computer 2. In the editing apparatus according to the embodiment, a process for downloading an edit material to the local storage 8 and displaying it on the viewer window 92 is referred to as "background download process".

At step SP311, the CPU 21 controls the editing processing unit 3 so as to perform a background download process corresponding to the operation of the editing operator. When the editing operator clicks a cancel button 325 on the download setting dialog 320 in the download process, the CPU 21 switches the download process from a foreground process to a background process. In reality, when the editing operator clicks the cancel button 325 on the download setting dialog 320, the CPU 21 causes the cross point P11 that connects the input terminal IN1 to which digital data is supplied and the output terminal OUT1 from which digital data is downloaded to be active. However, the CPU 21 controls the matrix switcher 3B so as to cause the cross point P19 that connects the input terminal IN1 and the output terminal OUT9 from which digital data is output to the image processing portion 3D to be inactive.

Thus, the digital signal S7 reproduced from the daily server is continuously downloaded to the local storage 8. However, the digital signal S7 is not supplied to the image processing portion 3C and the computer 2. In other words, from the standpoint of the editing operator who operates the computer 2, the download process is performed as a background process.

In the process at step SP311, when the CPU 21 causes the editing processing unit 3 to download that a digital signal to the local storage, the download process is performed as a background process. In addition, the editing process for the next material is performed at step SP301.

When the editing operator does not designate the background download process at step SP311, the background download process is performed until the download process is completed.

Next, the normal editing process of which the download process is not designated at step SP309 will be described. At step SP312, the normal editing process is performed.

At step SP312, the CPU 21 performs a scene name assigning process corresponding to the operation of the editing operator. In reality, when the editing operator clicks the scene change button 178A on the view window 92, the flow advances to step SP313. At step SP313, the CPU 21 performs the scene name assigning process. When the editing operator does not click the scene change button 178A, the flow advances to step SP314. At step SP314, the CPU 21 assigns a clip name and an event name with an existing scene name.

Next, the scene name assigning process at step SP313 will be described.

Figure 26A:
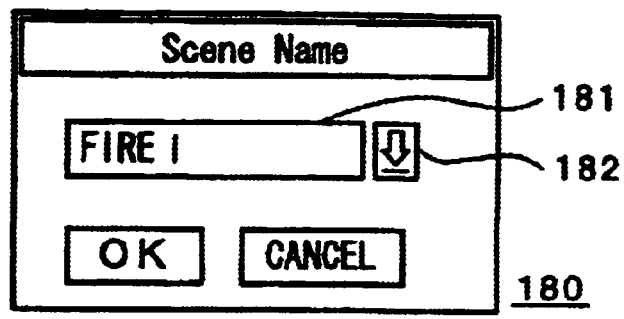
FIGS. 26A–26B are a schematic diagram for explaining a scene name assignment dialog.
Figure 26B:
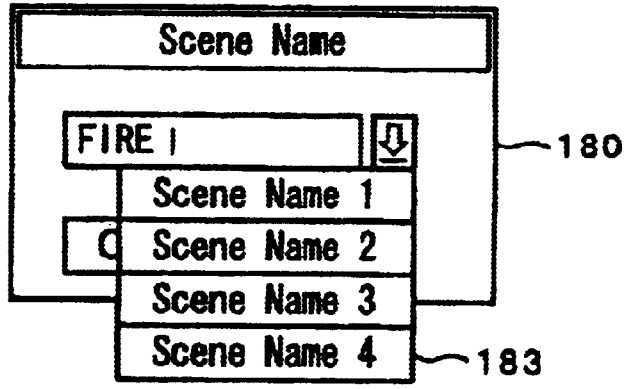

The CPU 21 opens a scene name input dialog 180 as shown in FIG. 26A on the monitor 2B. When the editing operator clicks a pull-down button 182 that shows a scene name list 183 on the dialog 180, the CPU 21 displays a scene name list 183 as shown in FIG. 26B on the monitor 2B. The scene name list is a list of scene names used and registered by the editing operator in the preceding editing operation and is data stored as a history list in the RAM 21B.

When the editing operator selects a scene name from the list 183 displayed on the monitor 2B, the CPU 21 registers the selected scene name as a scene name used in a clip producing process and an event producing process that will be described later.

The editing operator can directly input a scene name to a scene name input column 181 with the keyboard 2C without the use of the pull-down button 182. In this case, the CPU 21 registers the input scene name as a scene name used in the clip producing process and the event producing process.

Next, the necessity of the scene name updating function in the editing apparatus according to the embodiment will be described.

In the clip producing process and the event producing process, a clip name and an event name are assigned with a scene name. In reality, a clip name and an event name are assigned with a "scene name" and a "serial number". In other words, at step SP313, assuming that the scene name is changed to "FIRE", in the clip producing process, clips with clip names "FIRE001", "FIRE002", "FIRE003", and so forth are successively produced. For example, at step SP313, assuming that the scene name is changed to "SEA" at step SP313, in the clip producing process, clips with clip names "SEA001", "SEA002", "SEA003", . . . are successively produced.

When the editing operator assigns a proper scene name corresponding to a change of a scene of a material, he or she can categorize clips registered on the log window 93 corresponding to individual scene names. Thus, even if the editing operator produces several hundred clips, he or she can easily manage them. In addition, when the editing operator searches clips from the local storage 8 at step SP302, he or she can easily search only desired clips with the scene name as a keyword.

At step SP314, the CPU 21 sets an entry mode corresponding to the operation of the editing operator. The entry mode is a mode in which the editing operator enters a material with an in-point and an out-point on the log window or the time line window. The entry mode has two modes that are a log mode and a time line mode. In the log mode, a material with an in-point and an out-point is registered as a clip on the log window. In the time line mode, a material with an in-point and an out-point is registered as an event on the time line window.

In reality, when the editing operator clicks the log button 122b on the viewer window 92, the log mode is selected. When the editing operator clicks the time line button 122C on the viewer window 92, the time line mode is selected. When the log mode is selected, the flow advances to step SP315. When the time line mode is selected, the flow advances to step SP316.

At step SP315, the CPU 21 registers a material with an in-point and an out-point as an event corresponding to the operation of the editing operator. In reality, when the editing operator clicks the ADD button 122A on the viewer window 92, the CPU 21 registers a material with an in-point and an out-point as an event. At this point, the CPU 21 generates file information that represents a registered event as shown in FIG. 19.

Since the log mode has been selected at step SP314, the CPU 21 displays a stamp picture at an event in-point, an in-point time code, and a clip name corresponding to a scene name assigned at step SP313 on the log window 93.

By repeating the processes from step SP306 to step SP315, a plurality of events designated by the editing operator are registered. In the log mode, a plurality of clip cards 179 corresponding to a plurality of events can be displayed on the log window 93.

At step SP316, the CPU 21 registers a material with an in-point and an out-point as an event corresponding to the operation of the editing operator. In reality, as with the process at step SP315, when the editing operator clicks the ADD button 122A on the viewer window 92, the CPU 21 registers a material with an in-point and an out-point as an event. At this point, the CPU 21 generates file information that represents a registered event as shown in FIG. 19.

Since the time line mode has been selected at step SP314, the CPU 21 places a video event on the now line 139 of the video line 132A and an audio event to the now line 139 of the base audio line 132B.

By repeating the processes from step SP306 to step SP316, a plurality of events designated by the editing operator are registered. On the time line window, the editing operator can place a plurality of events at desired positions on the base video/base audio line 132 of the time line 95.

An event produced in the log mode is the same as an event produced on the time line mode. The difference between the log mode and the time line mode is in that an event produced is displayed as a clip card on the log window 93 or as an event on the time line 95.

4-2. Program List Producing Process

Next, the program list producing process for producing a program list with events produced in the event producing process at steps SP301 to SP315 will be described.

Figure 27:
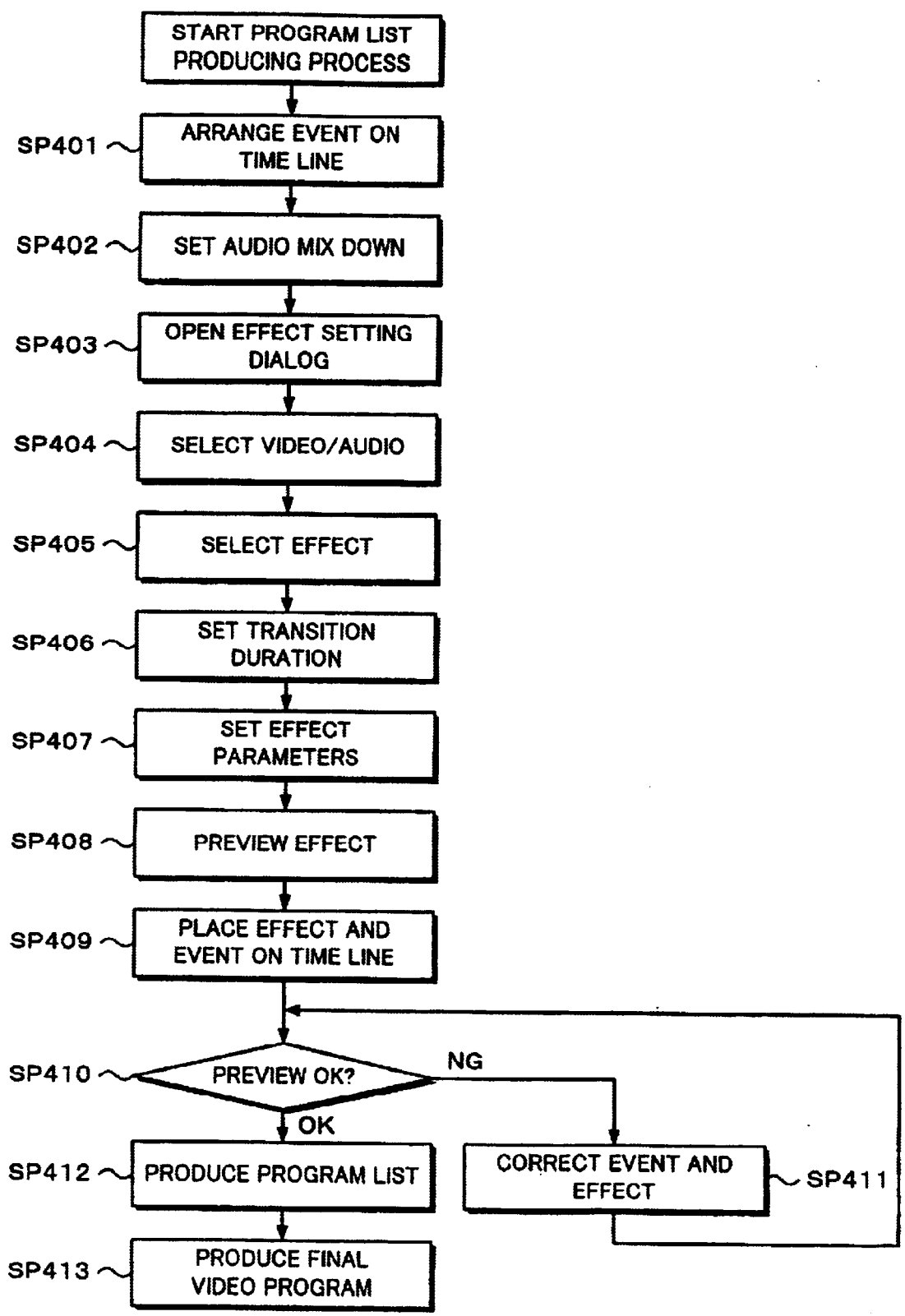
FIG. 27 is a flow chart for explaining a program list producing process.

FIG. 27 is a flow chart for explaining the operation of the program list producing process. Corresponding to the flow chart shown in FIG. 27, a program list is produced with events displayed as clip cards 179 on the log window 93.

At step SP401, events displayed as the clip cards 179 are arranged on the time line. There are two methods for arranging events on the time line.

In the first method, the editing operator drags and drops a clip card to a desired position on the time line 95 with the mouse 2D. In reality, when the editing operator clicks a clip card 179 displayed on the log window 93 with the mouse 2D, the clip card 179 becomes active. Thus, the editing operator can drag the clip card 179. Next, the editing operator drags the clip card 179 and drops it at a desired position on the time line 95. Thus, a video event corresponding to the clip card 179 is inserted at the dropped position on the base video line 132A. In addition, an audio event corresponding to the clip card 179 is inserted at the dropped position on the base audio line 132B.

In the second method, clip cards 179 are automatically arranged on the time line 178B in the direct entry mode. When the editing operator clicks the direct entry button 180 on the log window 93, the normal mode is switched to the direct entry mode. In the direct entry mode, when the editing operator clicks a clip card 179 displayed on the log window 93 rather than dragging and dropping the clip card 179, it is arranged on the time line. In reality, in the direct entry mode, when the editing operator clicks a clip card 179 on the log window 93, a video event and an audio event corresponding to the clicked clip card 179 are inserted at the position on the now line 139 of the time line 95. When the event is inserted, the now line 139 is automatically moved to the position of the out-point of the newly inserted event. In other words, when the editing operator successively clicks clip cards 179 on the log window 93, the clip cards 179 are successively inserted rightward on the time line 95.

In the direct entry mode, when the editing operator clicks a clip card 179 on the log window 93 rather than dragging and dropping the clip card 179, it is placed on the time line 95. Thus, when the editing operator should place many clip cards 179 on the order of several tens on the time line, he or she cannot omit the dragging and dropping operations for the clip cards 179. Consequently, the editing operation can be simplified and the editing time can be shortened.

At step SP402, the CPU 21 sets a mix down process for audio events placed on the time line 95 corresponding to the operation of the editing operator. The mix down process is a process for setting output levels of four tracks of audio events and routing the four tracks to four channels of the final audio outputs (program out).

When the editing operator clicks the audio mix down dialog selection button 162 with the tool bar on the program window 94, an audio mix down dialog 200 is displayed on the graphical user interface 90.

The dialog 200 has an output routing portion 201, a track fader portion 208, a fader panel assign portion 207, a fader assign button 202, and an on/off button 202A. With the output routing portion 201, the editing operator can assign four tracks T1 to T4 (or two tracks T1 and T2) of audio events as a base audio (BASE), a sub audio (SUB), a voice over 1 (VO1), and a voice over 2 (VO2) to channels Ch1 to Ch4 of final audio outputs (program out). With the track fader portion 208, the editing operator can set audio levels to the four tracks T1 to T4 of the individual audio events. With the fader panel assign portion 207, the editing operator knows how track faders of the dedicated controller 5 are assigned to the four tracks T1 to T4. With the fader assign button 202, the editing operator can open a setting dialog for assigning four fader levers of the dedicated controller 5 to the individual tracks of the audio lines. With the on/off button 202A, the editing operator can turn on/off an audio level manual adjustment mode with the four fader levers of the dedicated controller 5.

When the editing operator clicks a cross point button corresponding to the position of a desired output channel Ch1 to Ch4 for each track T1 to T4 on the output routing portion 201, each track can be routed to a desired output channel.

Figure 28:
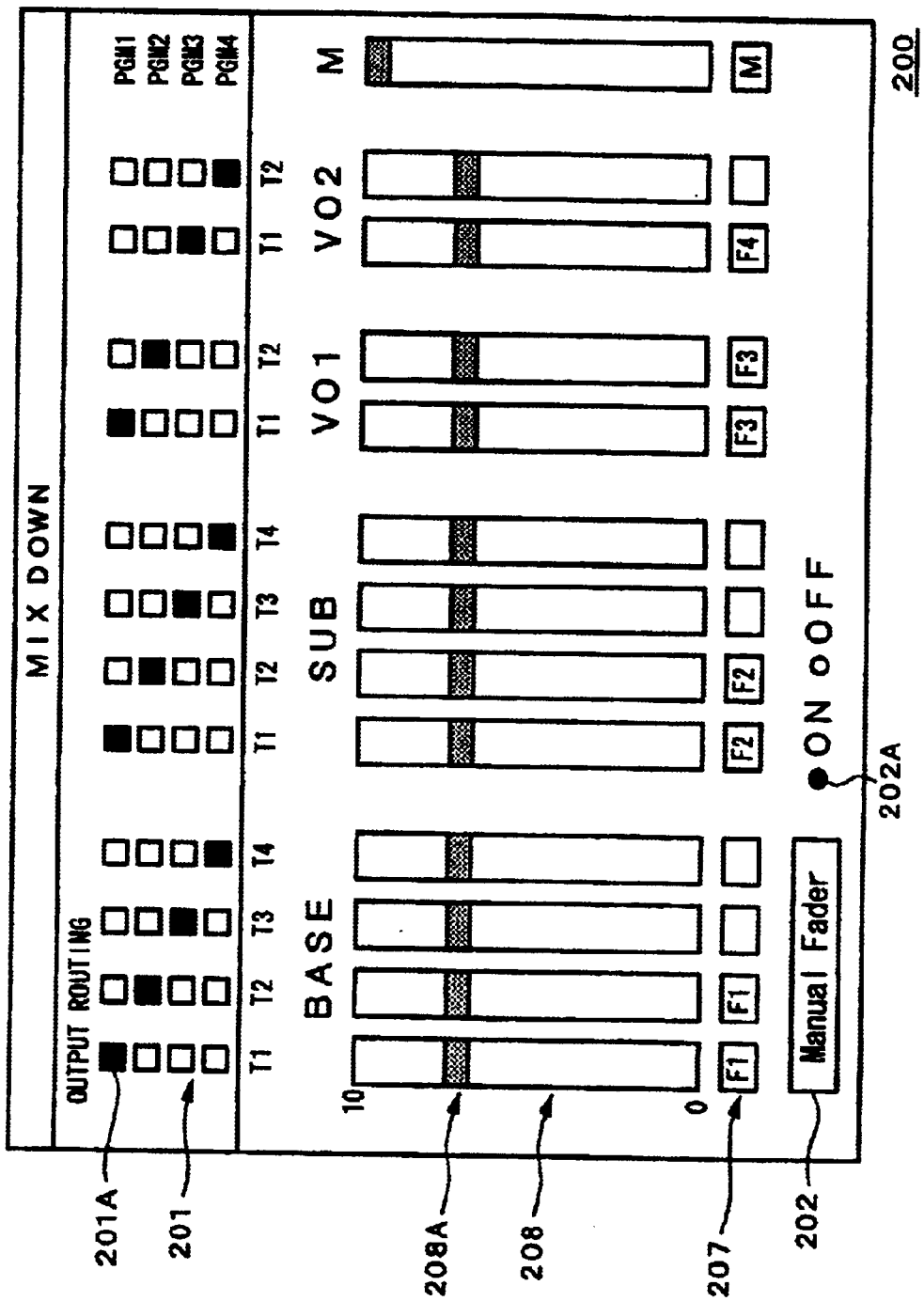
FIG. 28 is a schematic diagram for explaining a mix down setting dialog.

In the example shown in FIG. 28, when the editing operator clicks a cross point button 201A on track T1 of an event on the base audio line 132B, the track T1 is routed to the output channel Ch1. Likewise, the track T2 is routed to the output channel Ch2. The track T3 is routed to the output channel Ch3. The track T4 is routed to the output channel Ch4. In addition, this operation applies to the sub audio line 134, the voice over 1 line 138A, and the voice over 2 line 138B. Thus, the tracks T1 to T4 of the audio events of the sub audio line 134 are routed to the output channels Ch1 to Ch4. The tracks T1 to T2 of the audio events of the voice over 1 line 138A are routed to the output channels Ch1 and Ch2. The tracks T1 and T2 of the audio events of the voice over 2 line 138B are routed to the output channels Ch3 and Ch4.

Figure 29:
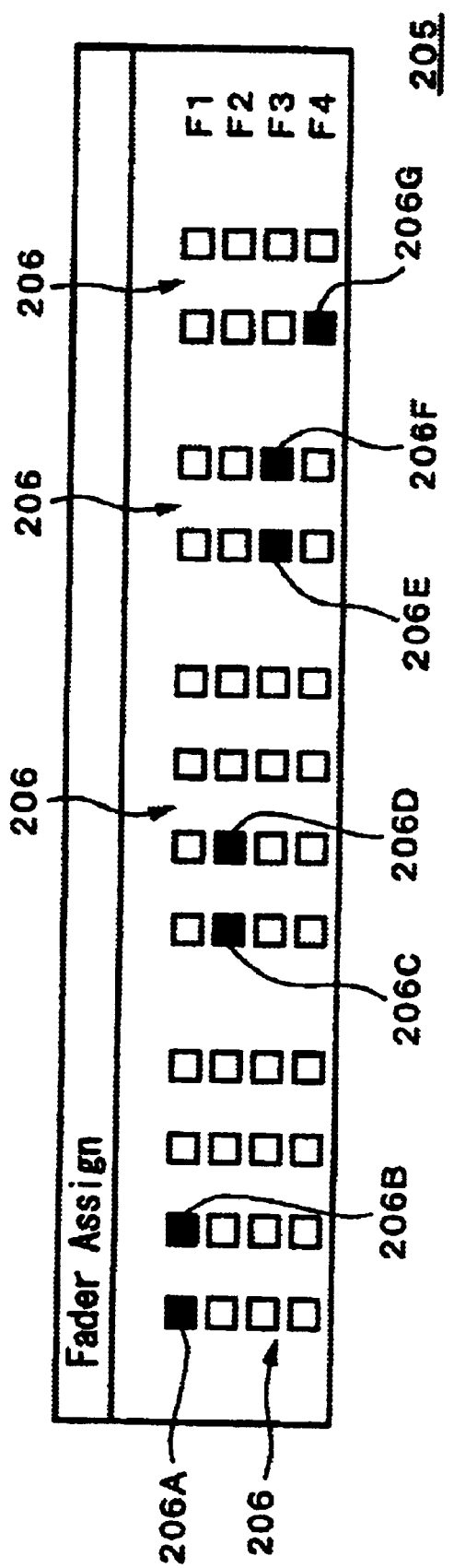
FIG. 29 is a schematic diagram for explaining a fader assignment dialog.

When the editing operator clicks a manual fader button 202 on the mix down setting dialog 200, a fader assignment dialog 205 as shown in FIG. 29 is displayed.

The dialog 250 has an assignment panel 206. On the assignment panel 206, the editing operator can assign each of four tracks T1 to T4 (or two tracks T1 and T2) of audio events registered to the base audio, sub audio, voice over 1, and voice over 2 to any of fader levers F1 to F4 of the dedicated controller 5. When the editing operator clicks a button corresponding to a desired fader lever F1 to F4 for each track T1 to T4 on the assignment panel 206, each track T1 to T4 can be assigned to any fader lever F1 to F4.

In FIG. 29, when the editing operator clicks buttons 206A and 206B corresponding to the tracks T1 and T2 of the base audio, the tracks T1 and T2 of the base audio are assigned to the first fader lever F1. Likewise, when the editing operator clicks buttons 206C and 206D corresponding to the tracks T1 and T2 of the sub audio, the tracks T1 and T2 are assigned to the second fader lever F2. In addition, when the editing operator clicks buttons 206E and 206F, the tracks T1 and T2 of the voice over are assigned to the third fader lever F3.

To set the audio levels of the tracks T1 to T4 of the individual audio lines, the editing operator moves the sliders 208A of the track fader portions 208 with the mouse 2D. When the on/off button 202A is turned on, the editing operator can manually adjust the audio levels with the fader levers of the dedicated controller. Thus, when the editing operator moves the fader levers F1 to F4, he or she can set desired audio levels of the tracks corresponding to the fader levers. At this point, when the editing operator operates the fader levers of the dedicated controller 5, the sliders 208A of the track fader portions 208 on the mix down setting dialog automatically slide corresponding to the operations of the fader levers of the dedicated controller 5.

In addition, the editing operator can freely assign each of the fader levers F1 to F4 of the dedicated controller to any of the tracks T1 to T4 of the audio lines (BASE, SUB, VO1, and VO2) on the fader assignment dialog 205. Thus, when the editing operator edits only the base audio (BASE), he or she can assign the fader levers F1 to F4 to the tracks T1 to T4 of the base audio. In other words, the audio lines (BASE, SUB, VO1, and VO2) and the tracks T1 to T4 can be freely assigned by software, not physically with the fader levers of the dedicated controller 5. Thus, the relation among the audio lines, the tracks T1 to T4, and the fader levers of the dedicated controller 5 can be freely changed.

When the audio mix down process is completed at step SP402, the flow advances to step SP403.

Figure 30:
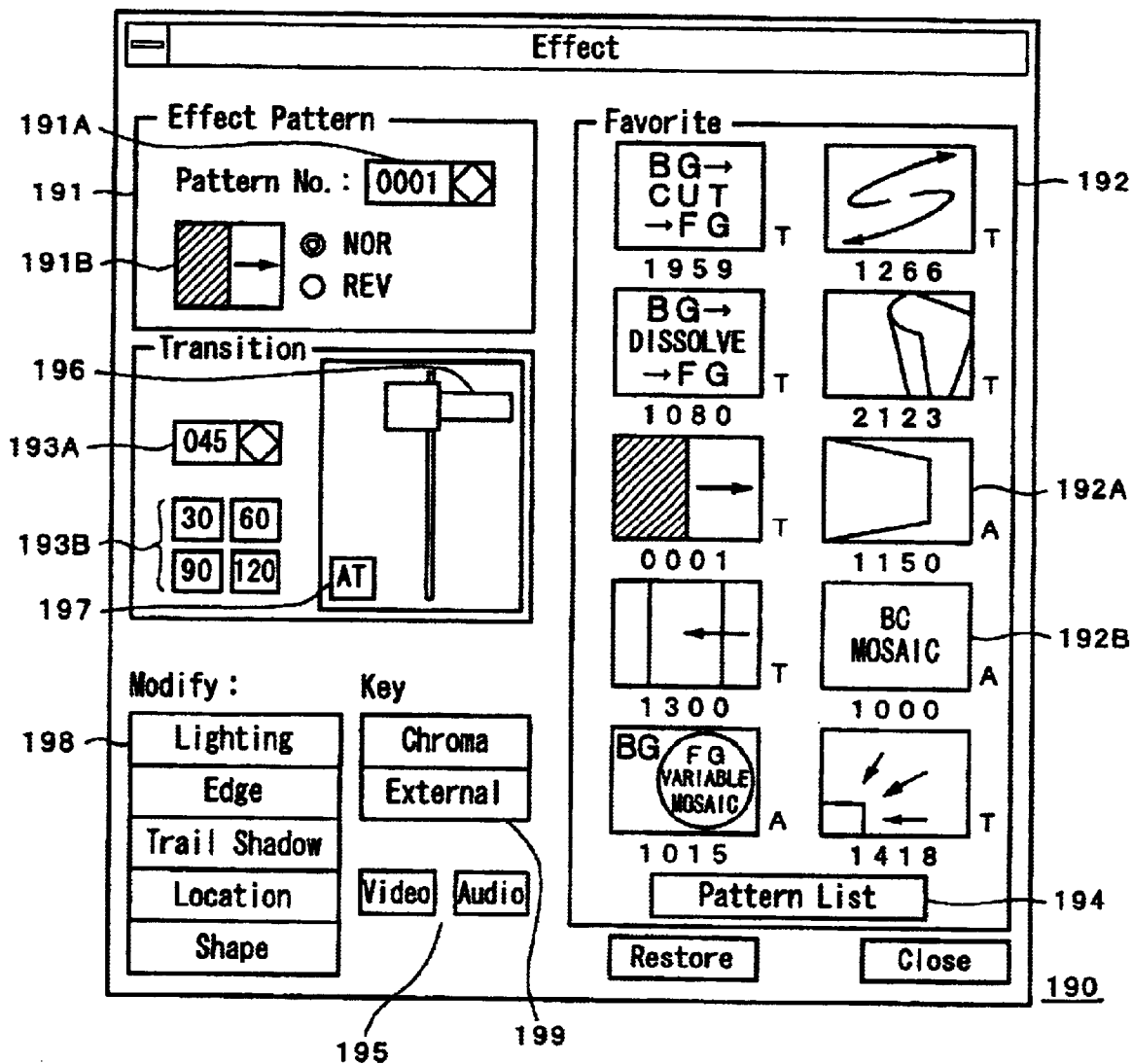
FIG. 30 is a schematic diagram for explaining an effect setting dialog.

At step SP403, the CPU 21 opens an effect setting dialog 190 for setting an effect to an event on the time line corresponding to the operation of the editing operator. In reality, when the editing operator clicks the video effect button 159 on the program window 94, the CPU 21 opens the effect setting dialog 190 shown in FIG. 30.

The effect setting dialog 190 has an effect pattern portion 191, a favorite pattern portion 192, a transition setting portion 193, a video/audio selecting portion 195, a modify portion 198, and a key setting portion 199. The effect pattern portion 191 displays an effect pattern that is currently set. The favorite pattern portion 192 displays an effect pattern that is frequently used. The transition setting portion 193 allows the editing operator to set a transition of a selected effect. The video/audio selecting portion 195 allows the editing operator to select an event (video/audio event) to which an effect is set. The modify portion 198 allows the editing operator to set parameters for modifying an effect. The key setting portion 199 allows the editing operator to set parameters for a key signal.

At step SP404, the editing operator selects a video event and an audio event to which an effect is set. When the editing operator sets an effect to both a video event and an audio event, he or she clicks both "Video" and "Audio" buttons 195. When the editing operator sets an effect to either a video event or an audio event, he or she clicks either "Video" button or "Audio" button 195.

At step SP405, the editing operator selects a desired effect in one of three effect selecting methods that follow.

In the first effect selecting method, the editing operator directly inputs a pattern number that represents an effect so as to set a desired effect. For example, when the editing operator knows the pattern number of a desired effect, he or she directly inputs the pattern number to the pattern number setting portion 191 with the keyboard 2C. Thus, the desired effect corresponding to the input pattern number is set.

In the second effect selecting method, the editing operator selects a desired effect from effect patterns that he or she favorably uses (hereinafter, this patterns are referred to favorite patterns). In reality, the CPU 21 always stores effect patterns that the editing operator favorably uses and displays icons that represent the favorite effect patterns at the favorite pattern displaying portion 192 on the effect setting dialog 190. When the editing operator clicks a desired effect pattern at the favorite pattern displaying portion 192, the desired effect is selected.

In the third effect selecting method, the editing operator selects a desired effect pattern from a list of all effect patterns. When the editing operator clicks a pattern list button 194, all effect patterns are categorized and displayed. When the editing operator clicks a desired effect pattern from the list, the desired effect is selected.

When the editing operator selects a desired effect in any selecting method, an icon corresponding to the selected effect is displayed at the effect pattern portion 191. Thus, the effect is selected.

At step SP406, the editing operator sets a desired transition duration for the selected effect. When the editing operator sets a transition duration for the selected effect, he or she inputs a desired transition duration of the selected effect to the transition setting portion 193A or selects a desired transition duration from icons corresponding to a plurality of transition durations at the transition setting portion 193A.

At step SP407, the editing operator sets effect parameters for the selected effect. In reality, effect parameters are for example a parameter with respect to an edge of a video switching position, a parameter with respect to lighting, a parameter with respect to trail/shadow, and a parameter with respect to location of an effect. The editing operator can set various parameters of the selected effect at the modify portion 198 on the effect setting dialog 190. When the editing operator clicks a key button 199 on the dialog 190, he or she can set a chroma key or an external key.

At step SP408, the CPU 21 controls each source device and the editing processing unit corresponding to the operation of the editing operator so that he or she can preview the effect that he or she has set. When the editing operator operates a fader lever 196 on the dialog 190 or clicks an AT button 197 on the dialog 190, he or she can preview the effect on the viewer 106.

When the effect is a transition effect such as a wipe effect, if the fader lever 196 is placed at the top position, a background image is displayed on the viewer 106. As the editing operator drags the fader lever 196 downward with the mouse, the background image is gradually transited to a foreground image. If the fader lever is placed at the bottom, a foreground image is displayed on the viewer 106. Thus, the editing operator can manually operate the fader lever 196 so that he or she can preview a transition effect at any speed and at any position.

A foreground image is displayed when a transition effect is executed. Alternatively, a foreground image is inserted into a background image and filled in an effect pattern when a transition effect is executed. In contrast, a background image is deleted from the screen when a transition effect is executed. Alternatively, a background image is an image in which an effect pattern with a foreground image is inserted when an animation effect is executed.

In the editing apparatus according to the embodiment, there are two types of effects that are a transition effect and an animation effect. The transition effect is a video effect of which one image is switched to another image. Examples of the transition effect is a wipe effect and a pager effect. The animation effect is an effect of which an image is converted in a three-dimensional space. Alternatively, the animation effect is an effect of which an image with a video effect is inserted into a particular image. Example of the animation effect are a spot light effect, a zoom up effect, and a picture-in-picture effect.

When the editing operator clicks the AT button (Auto button) 197 instead of the manual operation of the fader lever 196, a background image is transited to a foreground image at a transition speed that is set for the effect. In reality, when the editing operator clicks the AT button 197, the fader lever 196 is moved to the top position. Thereafter, the fader lever 196 is gradually moved downward at a predetermined speed. As the fader lever 196 moves, a transition effect of which a background video event is transited to a foreground video event at a predetermined speed is executed. Thus, the editing operator can preview a transition effect on the viewer 106.

When the preview process is performed, the editing operator has not placed an effect selected at step SP503 to the effect line 135 on the time line 95. Thus, the CPU 21 does not know to what event the effect has been set. Consequently, for a background image and a foreground image necessary for the preview process for the effect, the CPU 21 uses a video signal that has been set in the image processing portion 3C of the editing processing unit 3 and virtually performs the effect. This is because the editing operator performs the preview process so as to determine whether or not the effect, the transition duration, and parameters that have been set are proper. Thus, in the preview process, any background image and any foreground image can be used.

In reality, the CPU 31 controls the matrix switcher portion 3B of the editing processing unit 3 so that a signal supplied as the video signal S24 to the image processing portion 3C is used as a foreground video signal and a signal supplied as the video signal S26 to the image processing portion 3C is used as a background video signal. In other words, when the editing operator previews the effect, the CPU 21 of the computer controls the editing processing unit so that a signal supplied as the video signal S26 to the image processing portion 3c is used as a background image and a signal supplied as the video signal S24 to the image processing portion 3C is used as a foreground image.

When the editing operator determines that the effect that is set on the effect dialog 190 is a desired effect as the result of the preview process at step SP408, the flow advances to step SP409.

At step SP409, the CPU 21 places the selected effect and a foreground event thereof on the time line 95 corresponding to the operation of the editing operator. The method for placing an effect on the time line is different between a transition effect and an animation effect. Thus, the method will be described for each of a transition effect and an animation effect.

Figure 31A:
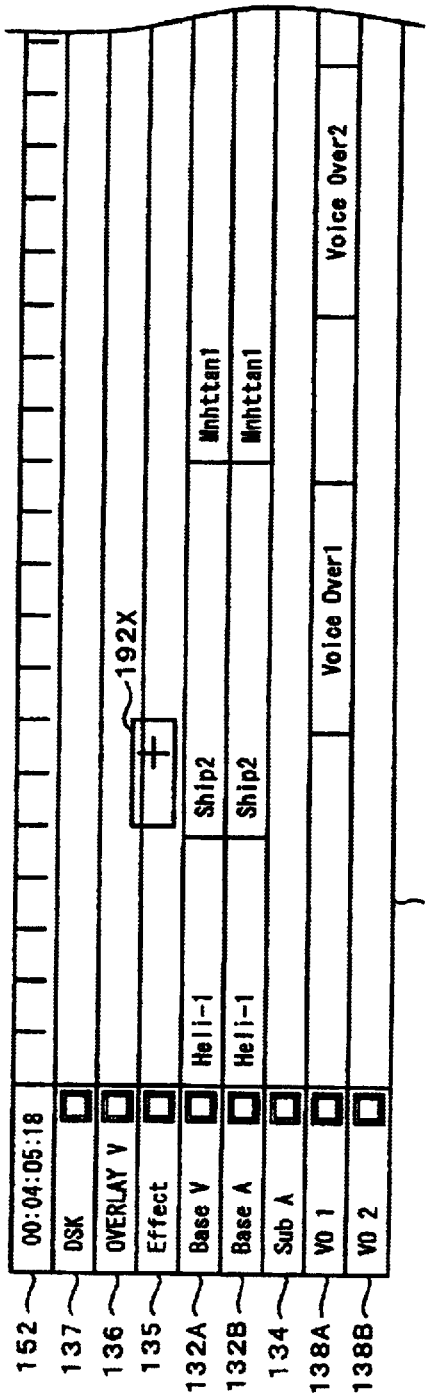
FIGS. 31A–31B are a schematic diagram for explaining an effect setting operation on a time line.
Figure 31B:
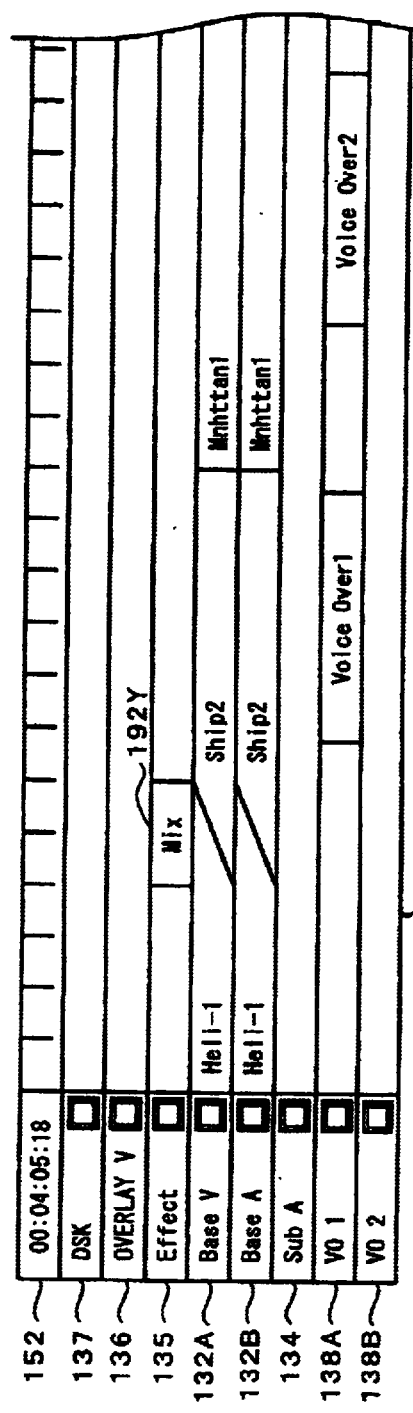

With reference to FIGS. 31A and 31B, the method for placing a transition effect on the time line will be described.

When the editing operator drags an icon 191B corresponding to a selected transition effect on the favorite pattern displaying portion 192 on the time line 95 with the mouse 2D, a shadow 192X of the icon is displayed on the time line 95 as shown in FIG. 31A.

When the editing operator drops the shadow 192X of the icon at a desired position on the effect line 135 of the time line 95, a transition effect 192Y is set as shown in FIG. 31B.

FIG. 31B shows that when an event "Heli-1" is transited to an event "Ship2", a "Heli-1" image and a "Ship2" image are mixed in an effect duration represented by "Mix". In other words, when this mix effect is executed, the event "Heli-1" is set as a background image and the event "Ship2" is set as a foreground image.

When a transition effect is set between events, the out-point of the event that is set as a background image is automatically prolonged by the transition duration. For example, assuming that the out-point of the event "Heli-1" that is set as a background image is "00:00:05:00" and the transition duration of the mix effect 192Y is 2 seconds, the out-point of the event "Heli-1" that is set as a background image is automatically prolonged by 2 seconds and thereby becomes "00:00:07:00".

When such a transition effect is executed, the matrix switcher portion 3B of the editing processing unit 3 switches a cross point corresponding to a control signal received from the CPU 21 of the computer so that a video signal of the "Heli-1" material is set to the signal S26 that is output to the output terminal OUT9 and that a video signal of the "Ship2" material is set to the signal S24 that is output to the output terminal OUT7. In addition, the image processing portion of the editing processing unit 3 controls the mixer 54B corresponding to a control signal received from the CPU 21 of the computer so as to execute an effect corresponding to a transition duration and various effect parameters that are set to the mix effect.

Next, with reference to FIGS. 32 to 35, the method for placing an animation effect on the time line will be described. Since this method varies depending on the type of an effect and an effect setting method for an event, the method will be described in two cases.

In the first case, an effect such as a zoom effect or a spot light effect is set to one event. With reference to FIGS. 32A and 32B, the first case will be described.

As with the method for placing a transition effect on the time line, when the editing operator drags an icon 191B corresponding to a selected animation effect at the favorite pattern displaying portion 192 on the dialog 190 to the time line 95 with the mouse 2D, a shadow 192E of the icon is displayed on the time line 95 as shown in FIG. 32A. When the editing operator drops the shadow 192E of the icon at a desired position on the effect line 135 of the time line 95, an animation effect 192F such as a special effect is set to an event "002" as shown in FIG. 32B.

When the animation effect as shown in FIG. 32B is executed, the matrix switcher portion 3B of the editing processing unit 3 switches a cross point corresponding to a control signal received from the CPU 21 of the computer 2 so that a video signal of the event "002" is set to the signal 26 that is output to the output terminal OUT9. In addition, the image processing portion 3B of the editing processing unit 3 controls the special effect block 53 corresponding to a control signal received from the CPU 21 of the computer so as to execute an effect corresponding to a transition duration and various effect parameters that are set to the modify effect.

In the second case, an event with an effect is set to a particular event. An example of the second case is a picture-in-picture effect. To explain the second case, "the case that an effect and a clip are set at the same time", "the case that the length of an early placed effect is matched with the length of a lately placed clip", and "the case that the length of a lately placed clip is matched with the length of an early placed effect" will be described.

First of all, with reference to FIGS. 33A and 33B, the case that an effect and a clip are set at the same time will be described.

When the editing operator drags a clip card 179 displayed on the log window with the mouse 2D, a shadow 192G of an icon is displayed on the time line 95 as shown in FIG. 33A. When the editing operator drops the shadow 192G of the icon at a desired position of the overlay video line 136, an event "007" that is dragged and dropped from the log window 93 is placed on the overlay line 136 as shown in FIG. 33B. In addition, an effect that is set on the effect setting dialog 190 is automatically placed on the effect line 135. Moreover, a duration of the event "007" placed on the overlay video line 136 is set as the duration of the effect.

Thus, when the editing operator just places a desired event on the overlay video line 36, the effect can be automatically set on the effect line 135 of the time line. Consequently, the operation efficiency is further improved.

When an animation effect as shown in FIG. 33B is executed, the matrix switcher portion 3B of the editing processing unit 3 switches a cross point corresponding to a control signal received from the CPU 21 of the computer 2 so that a video signal of an event "002" is set as the signal S26 that is output to the output terminal OUT9 and a video signal of an event "007" is set as the signal S24 that is output to the output terminal OUT7. In addition, the image processing portion 3B of the editing processing unit 3 controls the special effect block 53 corresponding to a control signal received from the CPU 21 of the computer so as to execute an effect corresponding to a transition duration and various effect parameters that are set to the modify effect.

Next, with reference to FIGS. 34A and 34B, the case that the length of an early placed effect is matched with the length of a lately placed clip will be described.

Figures 34A, 34B, 35A, 35B:
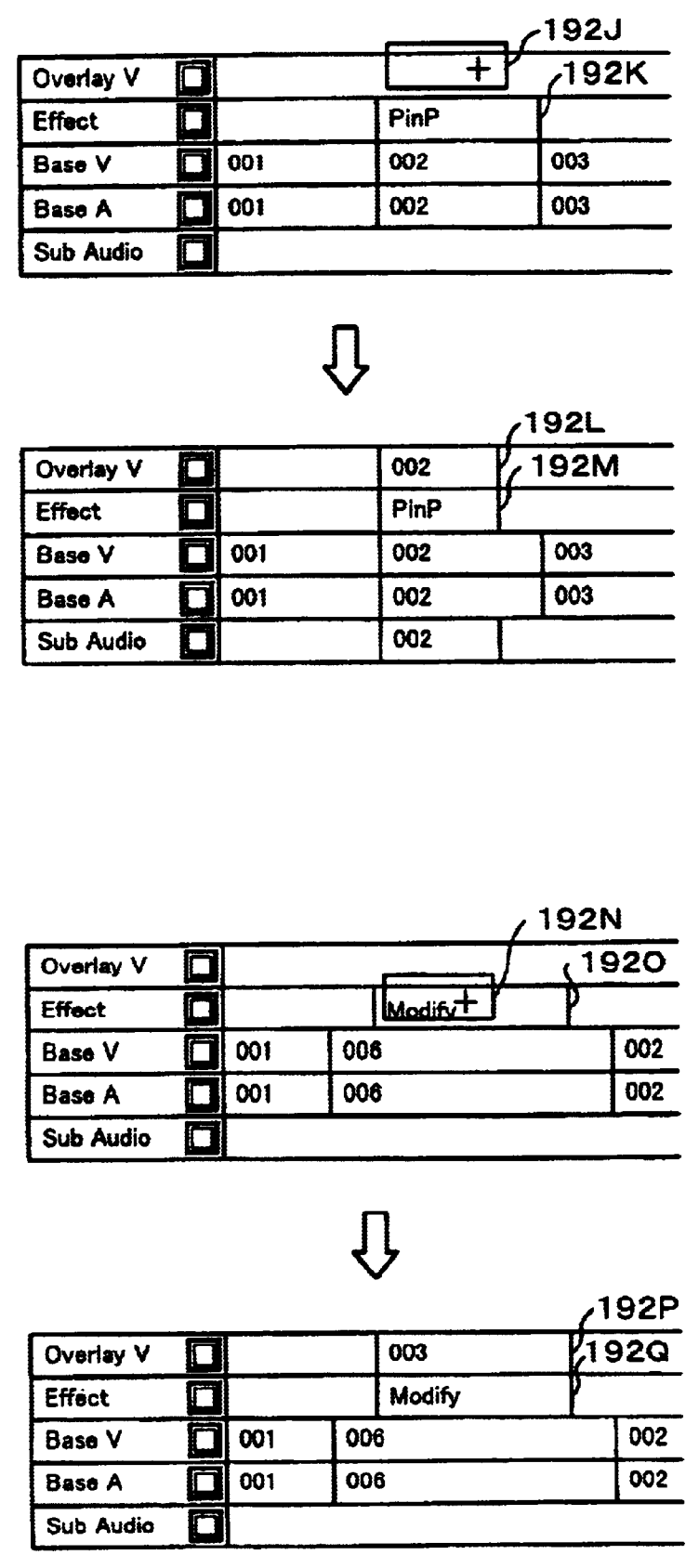

The editing operator drags an icon 191B corresponding to an animation effect selected on the dialog 190 to the effect line 135 of the time line 95 and drops the icon 191B at a desired event as shown in FIG. 34A. Thus, a desired effect 192K is placed on the effect line 135.

Next, the editing operator drags a clip card 179 displayed on the log window to the time line with the mouse 2D and drops the dragged clip card on the overlay video line 136 of the time line as shown in FIG. 33B. Thus, a desired event 192L is placed on the overlay video line 136. Corresponding to the duration of the lately placed event 192L as a foreground image, the duration of the early placed effect 192K is changed. Consequently, an effect 192M with a duration corresponding to the duration of the lately placed event 192L is displayed. In other words, the transition duration of the early placed effect 192M is changed corresponding to the duration of the lately placed event 192L.

Corresponding to the duration of the lately placed event 192L as a foreground image, the duration of the early placed effect is automatically changed. Thus, since it is not necessary to set the duration of the effect once again, the operation efficiency can be improved.

When the animation effect as shown in FIG. 34B is executed, the matrix switcher portion 3B of the editing processing unit 3 switches a cross point corresponding to a control signal received from the CPU 21 of the computer 2 so that a video signal of an event "002" is set as the signal S26 that is output to the output terminal OUT9 and the same video signal of the event "002" is set as the signal S24 that is output to the output terminal OUT7. In addition, the image processing portion 3B of the editing processing unit 3 controls the switcher block 52 corresponding to a control signal received from the CPU 21 of the computer so as to execute an effect corresponding to a transition duration and various effect parameters that are set to the picture-in-picture effect.

Next, with reference to FIGS. 35A and 35B, the case that the length of a lately placed clip is matched with the length of an early placed effect will be described.

The editing operator drags an icon 191B corresponding to an animation effect selected on the dialog 190 to the effect line 135 of the time line 95 with the mouse 2D and drops the icon 191B at a desired event as shown in FIG. 35A. Thus, a desired effect 192O is placed on the effect line 135.

Next, the editing operator drags a clip card 179 displayed on the log window to the time line with the mouse 2D as shown in FIG. 35A. Thereafter, the editing operator drops the dragged clip card at the position of the exiting effect 192O on the effect lien 135 of the time line as shown in FIG. 35B. Thus, an event 192P is placed on the overlay video line 136. Corresponding to the duration of the early placed effect 192O, the duration of a lately placed event 192N as a foreground image is changed. Thus, an event 192P with a duration corresponding to the duration of the early placed effect 192O is displayed. In other words, the out-point of the event 192P is changed so that the duration of the early placed effect 192O is matched with the duration of the lately placed event 192P.

Since the duration of the early placed effect matches the duration of the lately placed event, the operation for changing the duration of an event can be omitted. Thus, the operation efficiency can be improved.

When the animation effect as shown in FIG. 35B is executed, the matrix switcher portion 3B of the editing processing unit 3 switches a cross point so that a video signal of an event "006" is set as the signal S26 that is output to the output terminal OUT9 and a video signal of an event "003" is set as the signal S24 that is output to the output terminal OUT7. The image processing portion of the editing processing unit 3 controls the special effect block 53 corresponding to a control signal received from the CPU 21 of the computer so as to execute an effect corresponding to a transition period and various effect parameters that are set in the modify effect.

Next, with reference to FIGS. 36A and 36B, the method for placing an effect on the time line 95 will be described.

When the editing operator clicks a TL button 126 on the viewer window 92, the editing apparatus enters a time line control mode. In the time line control mode, the time line 95 chronologically correlates to the viewer window 92. Thus, a video image corresponding to a time code at the display position on the now line 139 of the time line 95 is displayed on the viewer 106 of the viewer window 92.

When the editing operator searches a desired frame of a file, he or she operates the slider portion 120 of the device controlling portion 96. Thus, the now line 139 moves on the time line 95. In other words, when the editing operator controls a device such as a reproducing operation or a jog traveling operation, the computer 2 controls the graphical user interface 90 displayed on the monitor 2D so that the now line 139 moves rightward on the time line 95. In addition, the computer 2 controls each source device so as to display a video image on the viewer 106 of the viewer window 92 corresponding to the changed graphical user interface 90.

When the editing operator clicks the mark-in button 115 at a desired position while viewing a video image displayed on the viewer 106 of the viewer window 92, the CPU 21 displays a flag 116C that represents an in-point and a mark line 166C at the position of the now line 139 on the time line 95.

When the in-point is marked, an image such as the flag 116C that represents that the in-point has been marked in the time line control mode is displayed at the in-point display column 110 on the viewer window 92 instead of a stamp picture of a frame displayed on the viewer 106.

When the editing operator operates the slider portion 120 of the device controlling portion 96, searches a file, and click the mark-out button 116 at a desired position, the CPU 21 displays a flag 166B that represents an out-point and a mark line 166D at the position of the now line 139 on the time line 95.

When the out-point is marked, an image such as the flag 116D that represents that the out-point has been marked in the time line control mode is displayed at the out-point display column 112 on the viewer window 92 instead of a stamp picture of a frame displayed on the viewer 106.

Next, the editing operator drags a desired clip card 179 from clip cards 179 on the log window 93 with the mouse 2D and drops the dragged clip card 179 between the mark line 166C as the in-point and the mark line 166D as the out-point on the overlay video line 136. Thus, the event dropped from the log window 93 is inserted between the mark line 166C and the mark line 166D on the overlay video line 136. In addition, as shown in FIG. 36B, the effect that is set at step SP407 is automatically inserted between the mark line 166C and the mark line 166D on the effect line 135.

When the duration of a clip dropped from the log window 93 is different from the duration defined with the mark line 166C and the mark line 166D, the duration defined with the mark line 166C and the mark line 166D is preferentially used. In other words, since the time code of the out-point of a clip dropped from the log window 93 is compensated corresponding to the duration defined with the mark line 166C and the mark line 166D, the duration defined with the mark line 166C and the mark line 166D can be matched with the duration of the clip dropped from the log window 93.

Figure 36A:
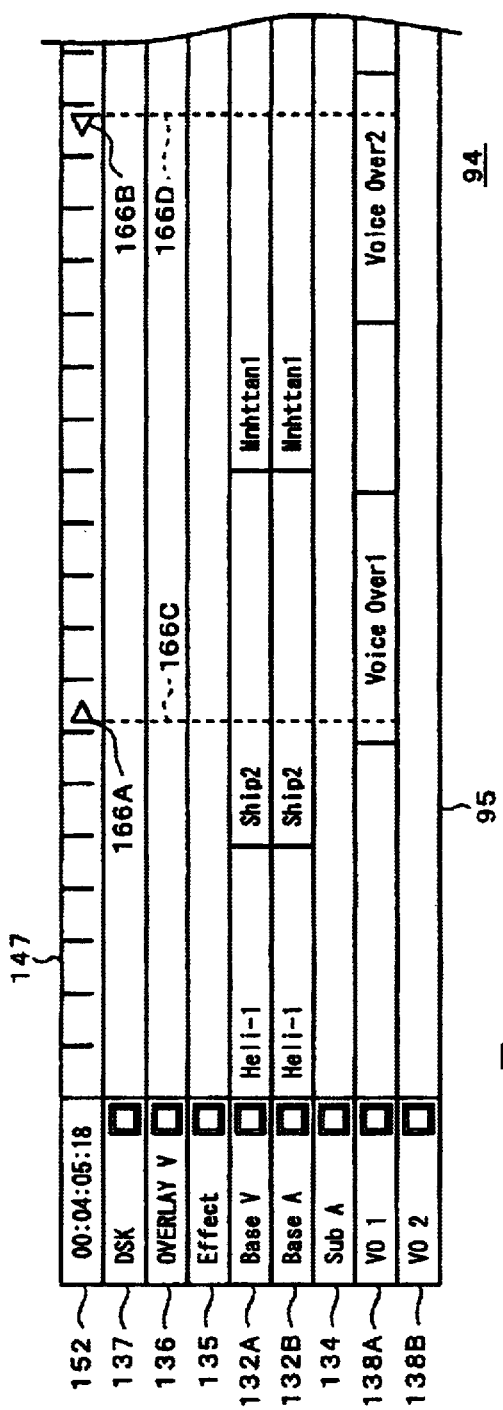
FIGS. 36A–36B are a schematic diagram for explaining an effect setting operation on a time line.
Figure 36B:
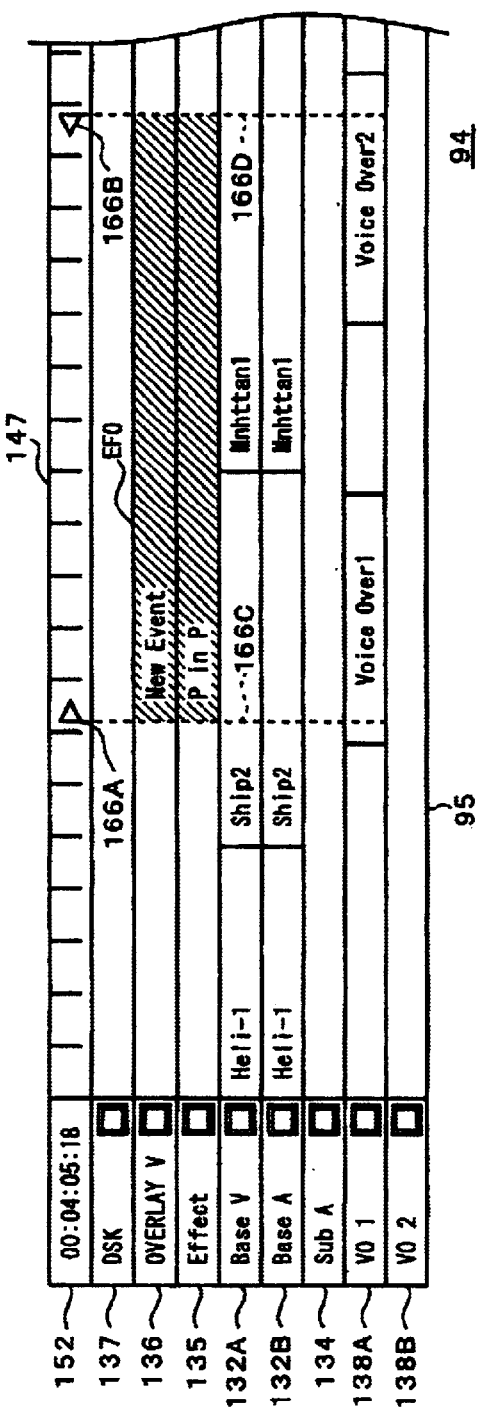

In FIGS. 36A and 36B, the case that an event is placed on the overlay video line 136 was described. Likewise, a clip can be placed on another line (the sub audio line 134, and the voice over lines 138A and 138B).

With the above-described operation and control, while viewing the position of a background event that has been placed on the time line, the editing operator can set an effect and an area in which a foreground event is inserted on the time line 95. In addition, regardless of editing points such as an in-point and an out-point of a background event that has been placed on the time line, the editing operator can place an effect and a foreground event at any position and in any duration.

After the effect placing process and the foreground event placing process are completed at step SP409, the flow advances to step SP410.

At step SP410, the CPU 21 of the computer 2 executes the preview process for previewing a program produced on the time line 95 corresponding to the operation of the editing operator. In reality, when the editing operator clicks a preview button "PVW" 123B, the preview operation is started from the position of the now line 139 on the time line 95. In the preview state, the computer 2 causes the local storage to reproduce video data and audio data corresponding to a program placed on the time line 95. In addition, the editing processing unit 3 processes supplied video material and audio material under the control of the computer 2 so as to perform a video process and an audio process corresponding to the program placed on the time line 95. The editing processing unit 3 outputs the processed results to the computer 2. The CPU 21 of the computer 2 controls the display controller 23 so as to display the supplied video data on the viewer 106 of the viewer window 92. In addition, the CPU 21 controls the display controller 23 so as to vary the position of the now line 139 on the time line 95 corresponding to the video data being displayed on the viewer 106.

Since the now line 139 moves corresponding to the video data displayed on the viewer 106 of the viewer window 92, while viewing the image on the viewer 106 of the viewer window 92, the editing operator can easily know the position of the image in the program placed on the time line 95.

Next, with reference to FIG. 37, the preview process performed by the editing processing unit 3 will be described in detail. FIGS. 37A to 37C are schematic diagrams showing states on the time line at several timings in the preview process.

Figure 37A:
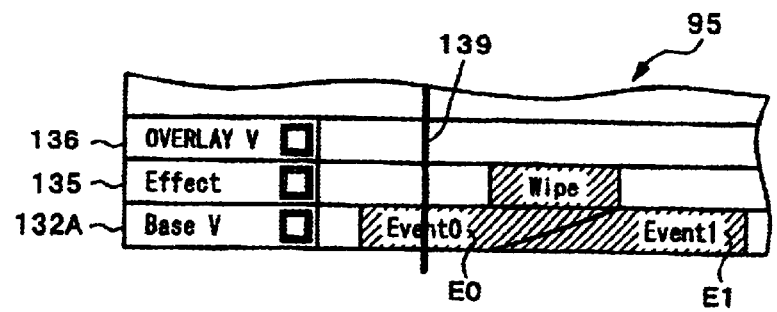
FIGS. 37A–37C are a schematic diagram for explaining the state of a now line on a time line in a preview state.
Figure 37B:
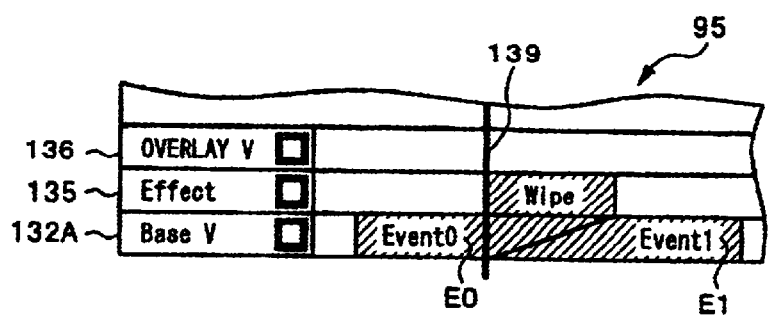
Figure 37C:
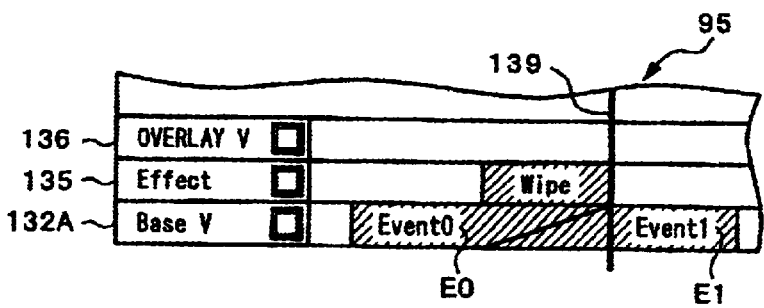

FIG. 37 shows the case that a transition effect "Wipe" is set between an event E0 and an event E1. FIGS. 37A to 37C show states on the time line at several timings in the preview process.

FIG. 37A shows a state that before the effect is executed, the event E0 is reproduced. In this state, the computer 2 controls the editing processing unit 3 so as to process the event E0 as a background event. Assuming that a signal of the event E0 is supplied as the output signal S13A received from the local storage to the input terminal IN4 of the matrix switcher portion 3B of the editing processing unit 3, the control of the editing processing unit 3 will be described in detail.

The system controlling portion 3A of the editing processing unit 3 controls the matrix switcher portion 3B so as to cause a cross point P49 that connects the input terminal IN4 and the output terminal OUT9 to be active. Thus, the video signal S13A of the event E0 supplied to the input terminal IN4 is output as the output video signal S26 to the output terminal OUT9 and supplied to the image processing portion 3C.

The output signal S26 that is output from the output terminal OUT9 is supplied to the demultiplexer 51D of the image processing portion 3C. The demultiplexer 51D extracts only a digital video signal from a payload portion of SDI format data. In the image processing portion 3C, the digital video signal is output as the output video signal S32 through the switcher block 52, the special effect block 53, and the mixer block 54.

The digital video signal S32 received from the image processing portion 3C is supplied to the input terminal IN10 of the matrix switcher portion 3B once again. The CPU 21 controls the matrix switcher portion 3B through the system controlling portion 3A of the editing processing unit 3 so as to cause a cross point P105 that connects the input terminal IN10 and the output terminal OUT5 to be active. Thus, the digital video signal S32 supplied to the input terminal IN10 is output as the digital video signal S2 to the output terminal OUT5 through the output processor 46 and then supplied to the computer 2.

The digital video signal S2 that is output from the editing processing unit 3 is supplied to the video processor 22 of the computer 2 and displayed on the viewer window 92 of the computer monitor 2B through the displaying controller 23. Thus, a video signal of the event E0 reproduced as the reproduction signal S13A from the local storage 8 is displayed on the viewer window.

FIG. 37B shows a state of which the preview process has further progressed from the state shown in FIG. 37A. In the state shown in FIG. 37B, the transition effect "Wipe" that is set between the event E0 and the event E1 is executed.

In this state, the computer 2 controls the editing processing unit 3 so as to process the event E0 as a background event and the event E1 as a foreground event. As with the state shown in FIG. 37A, assuming that a signal of the event E0 is supplied as the output signal S13A of the local storage to the input terminal IN4 of the matrix switcher portion 3B of the editing processing unit 3 and that a signal of the event E1 is supplied as the output signal S13B of the local storage to the input terminal IN5 of the matrix switcher portion 3B of the editing processing unit 3, the control of the editing processing unit 3 will be described in detail.

The matrix switcher portion 3B of the editing processing unit 3 does not need to control a cross point that causes a video signal of the event E0 to be supplied to the image processing unit 3C. This is because the computer 2 has controlled the editing processing unit 3 so as to process the event E0 as a background event. Thus, when the matrix switcher portion 3B causes a cross point P49 of the matrix switcher portion 3B to be active, the video signal S13A of the event E0 supplied to the input terminal IN4 is output as the output video signal to the output terminal OUT9 and then supplied to the image processing portion 3C.

A video signal of the event E0 supplied as the output signal S26 to the image processing portion 3C is supplied to the video signal processing circuit 52F of the switcher block 52 through the demultiplexer 51D. The video signal processing circuit 52E performs a wipe effect process for the video signal of the supplied event E0 corresponding to a wipe control signal received from the wipe signal generating circuit 52B. The video signal of the event E0 that has been processed for the wipe effect is supplied to the mixer circuit 54B.

As with the routing process by the matrix switcher portion 3B and the wipe process by the video signal processing circuit 52F for the video signal of the event E0, the routing process by the matrix switcher portion 3B and the wipe process by the key signal processing circuit 52D are performed for the key signal of the event E0.

On the other hand, the system controlling portion 3A of the editing processing unit 3 controls the matrix switcher portion 3B so as to cause a cross point P57 that connects the input terminal IN5 and the output terminal OUT7 to be active. Thus, a video signal of the event E1 reproduced from the local storage 8 is supplied to the computer 2. Consequently, the video signal S13B of the event E1 supplied to the input terminal IN5 is output as the output video signal S24 to the output terminal OUT7 and then supplied to the image processing portion 3C. The output signal S26 that is output from the output terminal OUT7 is supplied to the demultiplexer 51B of the image processing portion 3C. A video signal of the event E1 that is output from the demultiplexer 51B is supplied to the video signal processing circuit 52E of the switcher block 52. The video signal processing circuit 52E performs a wipe effect process for the video signal of the supplied event E1 corresponding to a wipe control signal received from the wipe signal generating circuit 52A. The video signal of the event E that has been processed for the wipe effect is supplied to the mixer circuit 54B.

As with the routing process by the matrix switcher portion 3B and the wipe process by the video signal processing circuit 52E for the video signal of the event E1, the routing process by the matrix switcher portion 3B and the wipe process by the key signal processing circuit 52C are performed for the key signal of the event E1.

The mixer circuit 54B mixes the video signal of the event E1 that has been processed for the wipe effect and the video signal of the event E0 that has been processed for the wide effect and outputs the resultant signal as the output signal S32.

The digital video signal S32 that is output from the image processing portion 3C is supplied to the computer 2 through the matrix switcher portion 3B once again. Thus, a wipe image produced corresponding to the image of the event E0 and the image of the event E1 reproduced from the local storage 8 is displayed on the viewer window 92.

FIG. 37C shows the state that the preview operation has further progressed from the state shown in FIG. 37B. FIG. 37C shows the state that the transition effect "Wipe" set between the event E0 and the event E1 is completed.

In the wipe mode, the computer 2 processes the event E0 as a background event and the event E1 as a foreground event. After the wipe process is completed, the computer 2 controls the editing processing process 3 so as to process the event E1 instead of the event E0 as a background event. Next, the control of the editing processing apparatus 3 in this state will be described in detail.

Since the matrix switcher portion 3B of the editing processing unit 3 does not need to supply the video signal of the event E0 to the image processing unit 3C and the computer 2, the matrix switcher portion 3B causes the cross point P49 that connects the input terminal IN4 and the output terminal OUT9 to be inactive. Thus, the video signal S13A of the event E0 supplied to the input terminal IN4 is not output to the output terminal OUT9. On the other hand, since the event E1 is processed as a background video instead of the event E0, the matrix switcher portion 3B of the editing processing unit 3 causes a cross point P59 that connects the input terminal IN5 to which the signal of the event E 1 is supplied and the output terminal OUT9 to be active. Thus, the video signal S13B of the event E1 supplied to the input terminal IN5 is output to the output terminal OUT9.

Consequently, the cross points of the matrix switcher portion 3B of the editing processing unit 3 are automatically controlled so as to output a proper signal corresponding to the state of the effect process. Thus, the editing operator can automatically produce a video program by producing only a desired program on the time line 95.

When the editing operator does not satisfy the produced program as the result of the preview process at step SP410 and should correct the produced program, the flow advances to step SP411. When the editing operator satisfies the produced program, the flow advances to step SP412.

At step SP411, the CPU 21 corrects an event and an effect placed on the time line 95 corresponding to the operation of the editing operator.

When the editing operator corrects an event, he or she double-clicks the event on the time line 95 with the mouse 2D. The CPU 21 controls the local storage 8 and the editing processing unit 3 so as to reproduce the double-clicked event from the local storage 8 and display the reproduced event on the viewer window 92. The CPU 21 displays an image reproduced from the local storage 8 on the viewer 106 of the viewer window 92. In addition, the CPU 21 displays stamp pictures at the in-point and at the out-point stored in a hard disk HDD on the in-point image displaying portion 110 and the out-point image displaying portion 120, respectively.

In the same manner as the clip producing process, if necessary, the editing operator sets the in-point and the out-point once again and re-adjusts various parameters such as video/audio levels.

After completing the correcting process, the editing operator clicks the ADD button 122A. Thus, the CPU 21 overwrites information of the old event on the time line 95 with information of the corrected event and causes the old event to be substituted with the corrected event on the time line 95.

When correcting an effect, the editing operator double-clicks the effect on the time lien 95 with the mouse 2D. Thus, the CPU 21 opens the effect setting dialog 190 on which the double-clicked effect is set.

In the same manner as the effect setting process, if necessary, the editing operator sets an effect type, a transition duration, and modify parameters once again.

After completing the correcting process, the CPU 21 closes the effect setting dialog 190. Next, the CPU 21 overwrites the information of the old effect with the information of the corrected effect and causes the old effect to be substituted with the corrected effect on the time line 95.

At step SP412, the CPU 21 produce a program list (EDL) corresponding to programs placed on the time line 95 and records the EDL as a file to an EDL folder on the hard disk HDD.

Figure 38:
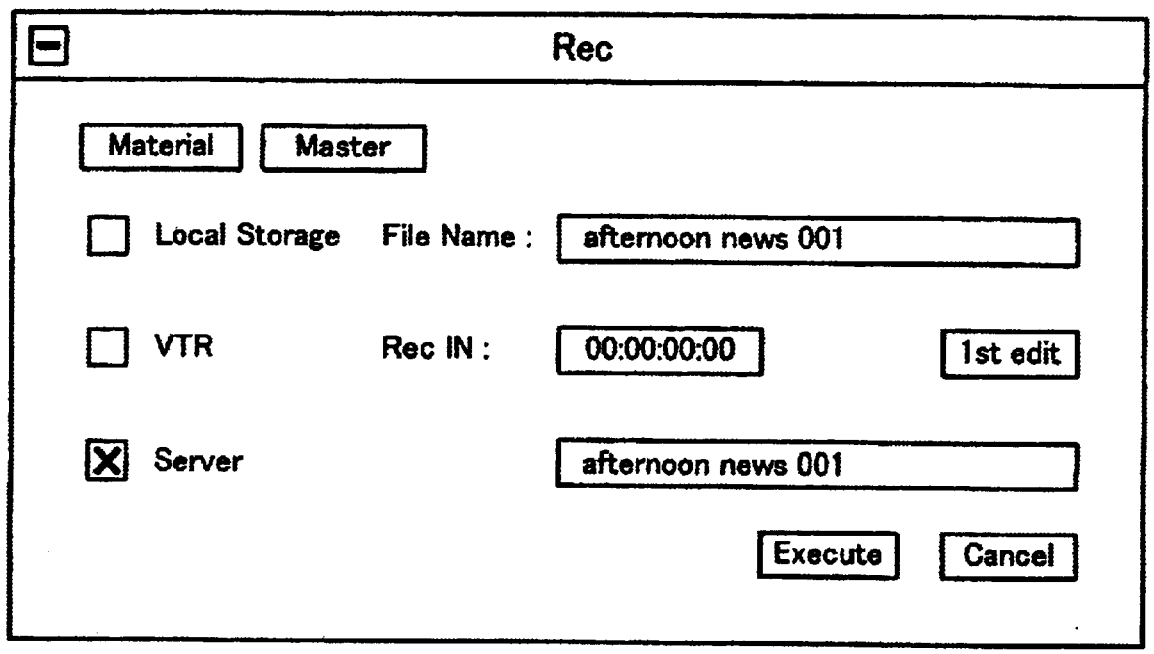
FIG. 38 is a schematic diagram for explaining a record device setting dialog.

At step SP412, the CPU 21 produces a final video program corresponding to the operation of the editing operator. When the editing operator clicks the REC button 123D, the CPU 21 opens a REC dialog as shown in FIG. 38. The editing operator selects a recording device that records the final video program from the local storage 8, the VTR 7, and the on-air server 9 and inputs a proper file name. When the editing operator clicks the execute button, the computer 2 controls the local storage 8 and the editing processing unit 3 corresponding to the program list (EDL) or the programs placed on the time line 95. Thus, the final video program is recorded to the selected device.

As described above, the editing apparatus of the present invention comprises a computer having a controlling means for displaying a viewer window, a log window, and a program window on a display of the computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, wherein the controlling means displays an icon that represents by what source device each event arranged on the time line is produced.

Thus, since the editing operator can easily and visually know by what source device each event was produced, he or she can securely perform the editing operation.

The editing apparatus of the present invention comprises a computer having a controlling means for displaying a viewer window, a log window, and a program window on a display of the computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, wherein the controlling means displays an effect setting dialog for setting an effect to each event arranged on the time line corresponding to the operation of the editing operator and places an icon corresponding to a desired effect selected on the effect setting dialog on the time line so as to produce a program list for performing the effect for the event.

Thus, with the editing apparatus according to the present invention, the editing operator can promptly and easily select an effect and set the selected effect to each event. In addition, with the editing system according to the present invention, the editing operator can browse clip images of all edit cuts, input images, a time line, and so forth on the GUI. In addition, the editing operator can decide the editing order and easily change the editing order while viewing arranged clips.

In the editing apparatus of the present invention, the controlling means displays a fader assignment dialog for allowing the editing operator to assign audio faders of a dedicated audio controller to audio tracks of individual events arranged on the time line and controls levels of the audio tracks of the events corresponding to information that is set on the fader assignment dialog.

Thus, with the editing apparatus according to the present invention, the editing operator can control individual audio tracks of individual events with the dedicated controller. In addition, the editing operator can freely change the assignment of individual tracks and fader levers for each event.

In the editing apparatus of the present invention, the controlling means has a first mode and a second mode, the first mode allowing the editing operator to drag and drop each of the plurality of events displayed as clip images on the log window to the time line, the second mode causing the plurality of events displayed as clip images on the log window to be automatically and successively arranged in a designated order on the time line without need to drag and drop the plurality of events.

In the editing apparatus of the present invention, the controlling means allows the editing operator to set an effect insertion area on the time line while viewing a plurality of events arranged on the time line and set a selected effect to the effect insertion area that is set on the time line.

In the editing apparatus of the present invention, the controlling means allows the editing operator to set an event insertion area overlaid with a plurality of events on a time line while viewing the plurality of events arranged on the time line and insert an event selected on the log window into the event insertion area that is set on the time line.

As described above, the editing method of the present invention comprises the steps of displaying a viewer window, a log window, and a program window on a display of a computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, and displaying an icon that represents by what source device each event arranged on the time line is produced.

Thus, since the editing operator can easily and visually know by what source device each event is produced, he or she can securely perform the editing operation.

The editing method of the present invention comprises the steps of displaying a viewer window, a log window, and a program window on a display of a computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, displaying an effect setting dialog for setting an effect to each event arranged on the time line corresponding to the operation of the editing operator, and placing an icon corresponding to a desired effect selected on the effect setting dialog on the time line so as to produce a program list for performing the effect for the event.

Thus, in the editing method according to the present invention, the editing operator can promptly and easily select an effect and set the selected effect to each event. In addition, with the editing system according to the present invention, the editing operator can browse clip images of all edit cuts, input images, a time line, and so forth on the GUI. In addition, the editing operator can decide the editing order and easily change the editing order while viewing arranged clips.

The editing method of the present invention comprises the steps of displaying a fader assignment dialog for allowing the editing operator to assign audio faders of a dedicated audio controller to audio tracks of individual events arranged on the time line, and controlling levels of the audio tracks of the events corresponding to information that is set on the fader assignment dialog.

Thus, in the editing apparatus according to the present invention, the editing operator can control individual audio tracks of individual events with the dedicated controller. In addition, the editing operator can freely change the assignment of individual tracks and fader levers for each event.

The editing method of the present invention comprises the steps of displaying a viewer window, a log window, and a program window on a display of a computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, and arranging the plurality of events displayed as the clip images on the log window on the time line corresponding to a first mode and a second mode, the first mode allowing the editing operator to drag and drop each of the plurality of events displayed as clip images on the log window to the time line, the second mode causing the plurality of events displayed as clip images on the log window to be automatically and successively arranged in a designated order on the time line without need to drag and drop the plurality of events.

In the editing method according to the present invention, the editing operator can set an effect insertion area on a time line and place a selected effect in the effect insertion area while viewing a plurality of events arranged on the time line.

The editing method of the present invention comprises the steps of setting an effect insertion area on the time line while viewing a plurality of events arranged on the time line, and setting a selected effect to the effect insertion area that is set on the time line.

In other words, with the editing apparatus and the editing method according to the present invention, the editing operator can promptly edit materials with a random access property that is a non-linear property to produce a news program. Thus, with the editing apparatus and the editing method according to the present invention, the editing operator can promptly and easily select an effect and set the selected effect to each event. In addition, with the editing system according to the present invention, the editing operator can browse clip images of all edit cuts, input images, a time line, and so forth on the GUI. In addition, the editing operator can decide the editing order and easily change the editing order while viewing arranged clips. In addition, with the editing apparatus and editing method according to the present invention, since the editing operator can set various effect functions, he or she can promptly produce a video program with enriched expression.

With the editing apparatus and the editing method according to the present invention, when the editing operator produces a news program or a reporting program, he or she can add a mosaic effect, change the sound tone of a speaker, and remove the background noise on site by himself or herself. In addition, with the editing apparatus and the editing method according to the present invention, to accomplish various effects, the editing operator can optically use a software process and hardware of a computer so as to edit digital image data and audio data on real time base.

What is claimed is:

1. An editing apparatus, comprising:
  an editing processing unit for processing a video signal and an audio signal supplied as source materials; wherein said editing processing unit comprises:
    an image processor for performing an effect process on said video signal;
    an audio processor for processing said audio signal;
    a matrix switcher for connecting source materials from a plurality of sources to the editing processing unit, thereby providing said video signal to said image processor and said audio signal to said audio processor; and
    a system controller for controlling the operation of said matrix switcher, said image processor, and said audio processor in response to commands from a computer and plural dedicated controllers;
  a daily server for receiving and storing source materials for editing over a network and acting as one of said plurality of sources to the editing processing unit;
  an on-air buffer for storing the processed video signal and the processed audio signal from said editing processing unit for transmission over said network; and
  said computer being connected to said network for controlling said editing processing unit, wherein said computer comprises:
    controlling means for displaying a viewer window, a log window, and a program window on a display of said computer, the viewer window allowing the editing operator to decide an edit point while viewing a video image of a source material so as to produce an event, the log window displaying a clip image corresponding to an event that is set on the viewer window, the program window allowing the editing operator to arrange a plurality of events on a time line in a desired order so as to produce a program list, and
    wherein said controlling means displays an icon that represents by what source device each event arranged on the time line is produce; and
  wherein said editing apparatus sets audio levels for respective audio tracks corresponding to the events arranged on the time line.

2. The editing apparatus as set forth in claim 1, further comprising:
  a data storage unit having a random accessible record medium for recording a source material to be edited, wherein said editing processing unit comprises:
    a switcher block for routing source data reproduced from said data storage unit;
    video signal processing block for processing a video signal that is output from said switcher block; and
    an audio processing block for processing an audio signal that is output from said switcher block, and
  wherein said controlling means of said computer is programmed by an editing software program for editing a source material recorded in said data storage.

3. The editing system as set forth in claim 2, wherein said controlling means comprises:
  memory means for storing information that represents a source supplying device that supplies a source material of the event as source information; and
  a file manager for managing the source information of each event as a file.

4. The editing system as set forth in claim 3, wherein said controlling means displays an icon that represents by what source supplying device each event registered on the log window has been produced corresponding to source information that represents the source supplying device stored in the file.

5. The editing system as set forth in claim 4, wherein the file for the event contains information of at least an event name assigned to the event and time codes of an in-point and an out-point of the event.

6. The editing system as set forth in claim 5, wherein when an event produced from a source material recorded in the source supplying device is downloaded from the source supplying device to said data storage unit, said controlling means rewrites the source information of the file for the downloaded event from information that represents the source supplying device into information that represents said data storage.

7. The editing system as set forth in claim 2, wherein said controlling means controls said video signal processing block and said switcher block so as to execute:
   a source material searching process for searching a desired source material from a plurality of source materials stored in the source supplying device;
   an event producing process for producing the plurality of events from the searched source material;
   a program list producing process for arranging a plurality of events produced by the event producing process in a desired order so as to produce the program list;
   a process for producing a final video program corresponding to the produced program list.

8. The editing system as set forth in claim 7, wherein said controlling means controls said switcher block so as to supply video data of a source material reproduced from the source supplying device to said computer through said video signal processing block and to supply audio data of a source material reproduced from the source supplying device to a speaker through said audio signal processing block.

9. The editing system as set forth in claim 7, wherein said controlling means performs a downloading process for downloading the source material recorded in the source supplying device to said data storage unit and an editing process for supplying other than the source material stored in said data storage unit to said computer through said video signal processing block and said audio signal processing block so as to edit source materials recorded in the data storage unit, said controlling means performing the downloading process and the editing process at the same time.

10. The editing system as set forth in claim 5, wherein the editing software program has a time line mode for registering an event and a log mode for registering an event on the log window, wherein said controlling means places a designated event as a video event or an audio event on the time line when the time line mode is set; and wherein said controlling means displays a designated event as a clip card on the log window when the log mode is set.

11. The editing system as set forth in claim 10, wherein display formats of a clip card on the log window are:
   a first display format for displaying a clip image at an in-point or an out-point of the event;
   a second display format for displaying clip images at an in-point and an out-point of the event; and
   a third display format for displaying a clip image at an in-point and an out-point of the event along with comment data in association with the event, and
   wherein said controlling means displays a clip card that represents the event in one of the three display formats.

12. The editing system as set forth in claim 11, wherein the editing software program has two registration modes for registering an event displayed as a clip card on the log window to the time line on the program window, the registration modes being a first mode and a second mode, wherein the first mode allows an event registered on the log window to be registered on the time line with a clicking operation of a pointing device, and wherein the second mode allows an event registered on the log window to be registered on the time line with a drag and drop operation of the pointing device.

13. The editing system as set forth in claim 12, wherein the time line includes:
   a base video line on which an video event produced from the source material is placed as a base video event;
   an audio line on which audio data corresponding to video data-contained in the base event is placed as an audio event;
   an effect line on which an effect that is set for the base video event is placed as an effect event; and
   an overlay video line on which a video event overlaid to the base video event as an overlay video event when an effect is added to the base video event with the effect event.

14. The editing system as set forth in claim 13, wherein the program list producing process includes:
   an audio level setting process for setting levels of audio data of a plurality of channels contained in an audio event placed on the audio line; and
   an effect setting process for setting a transition effect between two base video events placed on the base video line, setting an animation effect to a base video event placed on the base video line, or setting an effect between a base video event placed on the base video line and an overlay video event placed on the overlay video line.

15. The editing system as set forth in claim 14, wherein in the audio level setting process, said controlling means displays a dialog that represents a plurality of track faders for controlling audio levels of individual channels of an audio event placed on the time line and correlates the plurality of channels of the audio event with the plurality of track faders on the dialog corresponding to setting performed by the editing operator.

16. The editing system as set forth in claim 15, wherein in the audio level setting process, said controlling means correlates the plurality of track faders on the dialog with a plurality of manual fader levers disposed on a dedicated controller corresponding to setting performed by the editing operator and changes slider positions of the track faders on the dialog corresponding to the manual fader levers manually operated by the editing operator.

17. The editing system as set forth in claim 14, wherein in the effect setting process, said controlling means displays an effect setting dialog that represents icons of a plurality of effect patterns and performs the effect setting process when the editing operator selects a desired effect icon displayed on the effect setting dialog and drags and drops the selected effect icon to the effect line.

18. The editing system as set forth in claim 17, wherein the effect setting dialog has:
   a favorite pattern displaying portion that represents a plurality of effect patterns favorably used by the editing operator; and
   a duration setting portion in which the editing operator sets the duration of the selected effect.

19. The editing system as set forth in claim 18, wherein in the effect setting process, said controlling means controls said switcher block and said video processing block so as to preview the selected effect with video events assigned as a foreground video image and a background video image to said video processing block before placing the selected effect to the time line.

20. The editing system as set forth in claim 18, wherein in the effect setting process, when the transition effect is set between an event assigned as the background video image and an event assigned as the foreground video image, said controlling means updates an out-point of the event assigned as the background video image corresponding to the duration of the transition effect.

21. The editing system as set forth in claim 20, wherein in the effect setting process, when the animation effect is set between the base video event and the overlay video event, said controlling means changes the duration of the animation effect or the duration of the overlay video event corresponding to the position of the overlay video event placed on the overlay video line.

22. The editing system as set forth in claim 21, wherein said controlling means displays a video material of a video event on the viewer window, the video material being placed on the base video line, displays a now line on the time line so as to represent a chronological position of a frame of the video event displayed on the viewer window, and displays flags of an in-point and an out-point on the time line corresponding to a marking operation of an editing point by the editing operator so as to represent the line position as the editing point on the time line.

23. The editing system as set forth in claim 22, wherein when a video event, an audio event, or an effect event is inserted in a duration that is set with an in-point and an out-point on the time line, said controlling means changes the duration of the inserted event so that the duration that is set with the in-point and the out-point on the time line matches the duration of the event inserted in the duration.

24. The editing system as set forth in claim 23, wherein when a final video program of which the transition effect is set between a first video event and a second video event is previewed, said controlling means controls said switcher block so as to supply the first video event as a background video image to said video signal processing block before the transition effect is executed, controls said switcher block so as to supply the first video event as a background video image to said video signal processing block and the second video event as a foreground video image to said video signal processing block while the transition effect is being executed, and controls said switcher block so as to supply the second base video event that has been supplied as the foreground video image to said video signal processing block as a background video image to said video signal processing block after the transition effect is executed.

* * * * *

UNITED STATES PATENT AND TRADEMARK OFFICE
CERTIFICATE OF CORRECTION

PATENT NO.    : 6,674,955 B2
DATED         : January 6, 2004
INVENTOR(S)   : Matsui et al.

It is certified that error appears in the above-identified patent and that said Letters Patent is hereby corrected as shown below:

<u>Title page,</u>
Item [75], Inventors, change "Kosei Yamashita, Nakagawa (JP)" to
-- Kosei Yamashita, Kanagawa (JP) --

Signed and Sealed this

Ninth Day of March, 2004

JON W. DUDAS
*Acting Director of the United States Patent and Trademark Office*